US007336392B2

(12) United States Patent
Kakutani

(10) Patent No.: US 7,336,392 B2
(45) Date of Patent: Feb. 26, 2008

(54) METHOD OF CORRECTING COLOR IMAGE DATA ACCORDING TO CORRECTION TABLE

(75) Inventor: Toshiaki Kakutani, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 994 days.

(21) Appl. No.: 10/390,063

(22) Filed: Mar. 14, 2003

(65) Prior Publication Data

US 2004/0021882 A1 Feb. 5, 2004

(30) Foreign Application Priority Data

Mar. 20, 2002 (JP) .............................. 2002-079564

(51) Int. Cl.
*G06F 15/00* (2006.01)
*G06K 3/23* (2006.01)
*G03F 3/08* (2006.01)

(52) U.S. Cl. ....................... 358/1.9; 358/3.23; 358/518

(58) Field of Classification Search ................ 358/1.9, 358/518, 523, 3.23, 504, 535, 1.16, 1.18, 358/1.1, 1.2; 382/167, 162
See application file for complete search history.

(56) References Cited

U.S. PATENT DOCUMENTS

| | | | |
|---|---|---|---|
| 4,992,861 A | | 2/1991 | D'Errico |
| 5,504,821 A | * | 4/1996 | Kanamori et al. .......... 382/167 |
| 5,786,907 A | | 7/1998 | Lotspiech |
| 6,118,549 A | | 9/2000 | Katougi et al. |
| 6,215,561 B1 | | 4/2001 | Kakutani |
| 6,269,185 B1 | * | 7/2001 | Takai ......................... 382/167 |
| 6,304,671 B1 | * | 10/2001 | Kakutani .................... 382/167 |

(Continued)

FOREIGN PATENT DOCUMENTS

EP 0 868 075 9/1998

(Continued)

OTHER PUBLICATIONS

Abstract of Japanese Patent Publication No. JP 08-172364, Pub. Date: Jul. 2, 1996, Patent Abstracts of Japan.

(Continued)

*Primary Examiner*—Madeleine AV Nguyen
(74) *Attorney, Agent, or Firm*—Martine Penilla & Gencarella, LLP

(57) ABSTRACT

The technique of the present invention allocates a coordinate point of target image data on a color space to multiple lattice points in a color conversion table and reads data stored at the multiple lattice points. This arrangement ensures high-speed color conversion of the target image data. The procedure selects multiple lattice points and allocates a coordinate point of one target image data to the selected multiple lattice points. The procedure then specifies color-converted image data corresponding to the target image data, based on data read from the multiple lattice points. A first application allocates the target image data to the coordinate points of the multiple lattice points arbitrarily selected in the vicinity of the target image data. A second application allocates N-dimensional target image data to the coordinate points of multiple but not greater than N lattice points. A third application calculates an arithmetic mean of the data read from the multiple lattice points to specify the color-converted image data. Any of these arrangement effectively enhances the conversion accuracy without increasing the size of the color conversion table.

37 Claims, 26 Drawing Sheets

U.S. PATENT DOCUMENTS

| | | | |
|---|---|---|---|
| 6,323,969 B1* | 11/2001 | Shimizu et al. | 358/523 |
| 6,415,065 B1* | 7/2002 | Miyake | 382/300 |
| 6,590,678 B1* | 7/2003 | Nishigaki et al. | 358/501 |
| 6,657,746 B1* | 12/2003 | Fuchigami et al. | 358/1.9 |
| 6,724,935 B1* | 4/2004 | Sawada et al. | 382/167 |
| 6,825,958 B1* | 11/2004 | Fukasawa et al. | 358/523 |
| 7,136,523 B2* | 11/2006 | Fukao et al. | 382/167 |
| 2002/0008709 A1 | 1/2002 | Suzuki | |
| 2002/0021360 A1* | 2/2002 | Takemoto | 348/222 |
| 2002/0051158 A1* | 5/2002 | Ohkubo | 358/1.9 |
| 2003/0067616 A1* | 4/2003 | Toyoda et al. | 358/1.9 |
| 2003/0081831 A1* | 5/2003 | Fukao et al. | 382/167 |
| 2003/0090726 A1* | 5/2003 | Arai | 358/2.1 |
| 2004/0212647 A1* | 10/2004 | Yakura et al. | 347/13 |
| 2006/0007459 A1* | 1/2006 | Kumada et al. | 358/1.9 |
| 2006/0245016 A1* | 11/2006 | Fukao et al. | 358/518 |

FOREIGN PATENT DOCUMENTS

| | | |
|---|---|---|
| EP | 1 158 780 | 11/2001 |
| JP | 04-185075 | 7/1992 |
| JP | 08-172364 | 7/1996 |
| JP | 09-294212 | 11/1997 |

OTHER PUBLICATIONS

Abstract of Japanese Patent Publication No. 04-185075, Pub. Date: Jul. 1, 1992, Patent Abstracts of Japan.

Abstract of Japanese Patent Publication No. 09-294212, Pub. Date: Nov. 11, 1997, Patent Abstracts of Japan.

* cited by examiner

Fig.2(a)
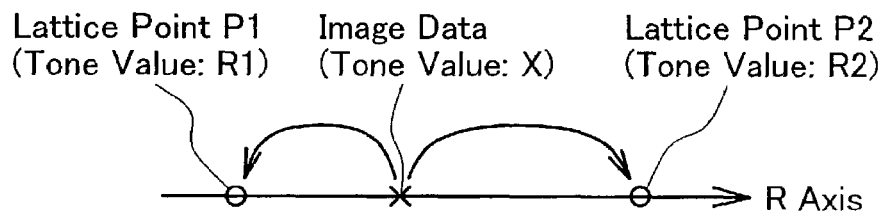
Fig.2(b)
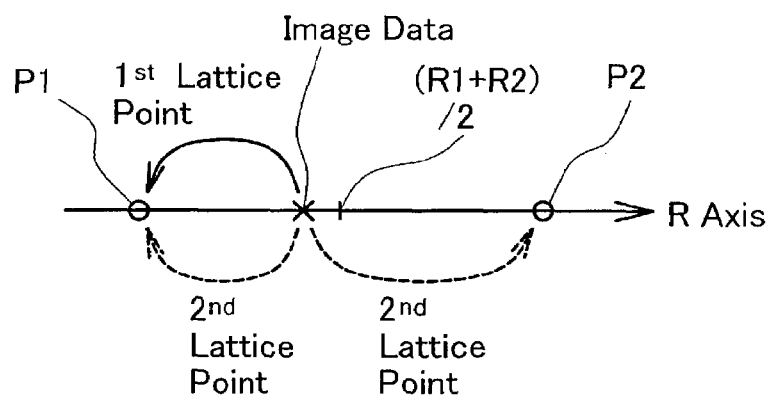
Fig.2(c)
| 1st Lattice Point | 2nd Lattice Point | Resulting Converted Value | Error |
|---|---|---|---|
| Lattice Point P1 | Lattice Point P1 | (C1+C1)/2 =C1 | Cx−C1 |
| | Lattice Point P2 | (C1+C2)/2 | (C1+C2)/2 −Cx |
Fig.2(d)
| 1st Lattice Point | 2nd Lattice Point | Resulting Converted Value | Error |
|---|---|---|---|
| Lattice Point P1 | Lattice Point P2 | (C1+C2)/2 | Cx− (C1+C2)/2 |
| Lattice Point P2 | | (C2+C2)/2 =C2 | C2−Cx |

| 1st Lattice Point | 1nd Lattice Point | Resulting Converted Value |
|---|---|---|
| Lattice Point P1(R1,G1) | Lattice Point P3(R1,G2) | (C1+C3)/2 |
| | Lattice Point P4(R2,G2) | (C1+C4)/2 |
| Lattice Point P3(R1,G2) | Lattice Point P3(R1,G2) | (C3+C3)/2 =C3 |
| | Lattice Point P4(R2,G2) | (C3+C4)/2 |

| 1st Lattice Point | 2nd Lattice Point | Resulting Converted Value |
|---|---|---|
| Lattice Point P3(R1,G2) | Lattice Point P1(R1,G1) | (C3+C1)/2 |
| | Lattice Point P2(R2,G1) | (C3+C2)/2 |
| | Lattice Point P3(R1,G2) | (C3+C3)/2 =C3 |
| | Lattice Point P4(R2,G2) | (C3+C4)/2 |

| 1st Lattice Point | | | | 2nd Lattice Point | | | |
|---|---|---|---|---|---|---|---|
| R1 | G1 | B1 | P1(R1,G1,B1) | R1 | G1 | B1 | P1(R1,G1,B1) |
| | | | | | | B2 | P5(R1,G1,B2) |
| | | | | | G2 | B1 | P4(R1,G2,B1) |
| | | | | | | B2 | P8(R1,G2,B2) |
| | | | | R2 | G1 | B1 | P2(R2,G1,B1) |
| | | | | | | B2 | P6(R2,G1,B2) |
| | | | | | G2 | B1 | P3(R2,G2,B1) |
| | | | | | | B2 | P7(R2,G2,B2) |

| 1st Lattice Point | | | | 2nd Lattice Point | | | |
|---|---|---|---|---|---|---|---|
| R1 | G1 | B1 | P1(R1,G1,B1) | R1 | G1 | B2 | P5(R1,G1,B2) |
| | | | | | G2 | | P8(R1,G2,B2) |
| | | | | R2 | G1 | | P6(R2,G1,B2) |
| | | | | | G2 | | P7(R2,G2,B2) |
| | | B2 | P5(R1,G1,B2) | R1 | G1 | | P5(R1,G1,B2) |
| | | | | | G2 | | P8(R1,G2,B2) |
| | | | | R2 | G1 | | P6(R2,G1,B2) |
| | | | | | G2 | | P7(R2,G2,B2) |

Fig.19(a)
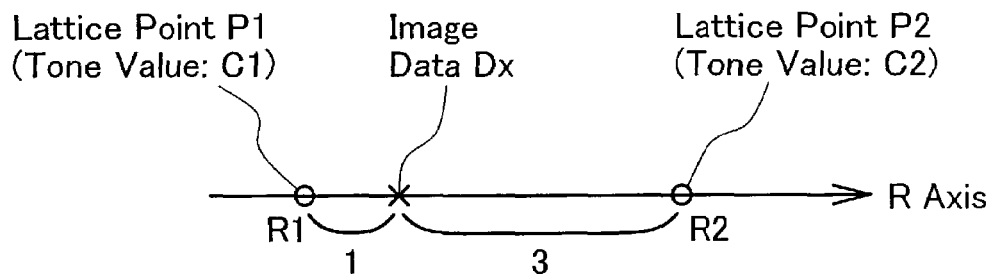
Fig.19(b)
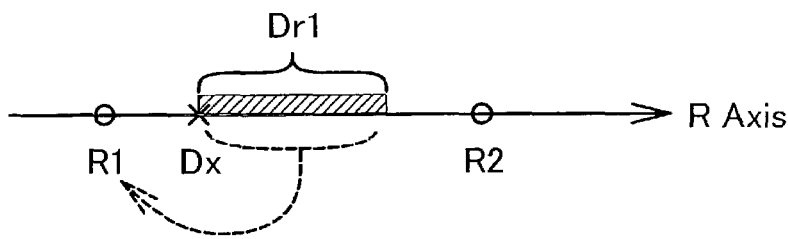
Fig.19(c)
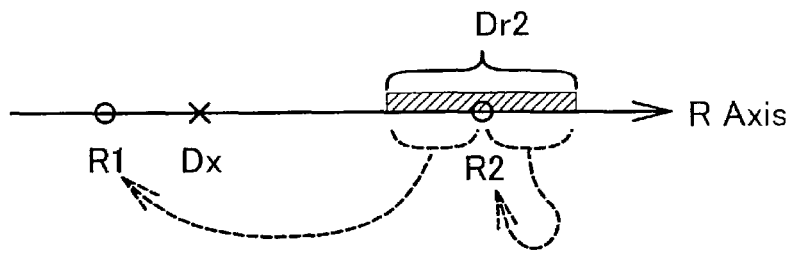
Fig.19(d)
|  | Lattice Point P1 | Lattice Point P2 |
|---|---|---|
| 1st Lattice Point | N Times | 0 Times |
| 2nd Lattice Point | N/2 Times | N/2 Times |
| Total | 3·N/2 Times | N/2 Times |

Fig.20
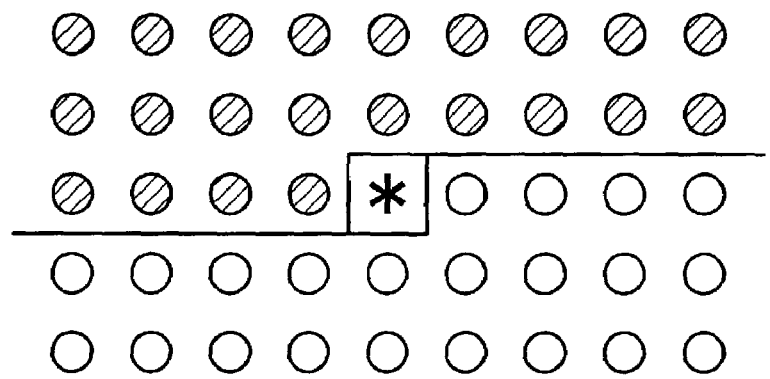
Fig.21(a)
| * | 1/2 |
|---|---|
| 1/4 | 1/4 |
Fig.21(b)
|  | * | 1/4 | 1/8 |
|---|---|---|---|
| 1/8 | 1/4 | 1/8 |  |
|  | 1/8 |  |  |
Fig.22
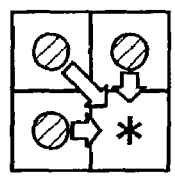

| Range Of Image Data Dx | Coordinate Value Of 1st Lattice Point | Coordinate Value Of 2nd Lattice Point | Coordinate Value Of 3rd Lattice Point |
|---|---|---|---|
| R1 ~R1+(R2-R1)/3 | R1 | R1 | R1 Or R2 |
| R1+(R2-R1)/3 ~R1+(R2-R1)·2/3 | R1 | R1 Or R2 | R2 |
| R1+(R2-R1)·2/3 ~R2 | R1 Or R2 | R2 | R2 |

| Range Of Image Data Dx | Tone Values Of Color-Converted Data | Maximum Pre-Conversion Error |
|---|---|---|
| R1 ~R1+(R2−R1)/3 | C1 | |
| | (2/3)·C1+(1/3)·C2 | |
| R1+(R2−R1)/3 ~R1+(R2−R1)·2/3 | (2/3)·C1+(1/3)·C2 | (C2−C1)/3 |
| | (1/3)·C1+(2/3)·C2 | |
| R1+(R2−R1)·2/3 ~R2 | (1/3)·C1+(2/3)·C2 | |
| | C2 | |

METHOD OF CORRECTING COLOR IMAGE DATA ACCORDING TO CORRECTION TABLE

BACKGROUND OF THE INVENTION

1. Field of the Invention

The present invention relates to an image processing method for correcting color image data. More specifically the invention pertains to a technique of quick image processing by referring to a correction table.

2. Description of the Related Art

A known image processing apparatus reads a color original with an image input unit, such as a scanner, to input color image data and reproduces the input color image data with an image output unit, such as a CRT, another display, or a color printer.

Each of the image output units like displays and color printers has intrinsic color reproduction properties. Color correction according to the color reproduction properties of each image output unit is accordingly required for favorable reproduction of the colors of a color image input with a scanner or another image input unit, regardless of the properties of the image output unit. A typical technique of color correction uses a color correction table (for example, JAPANESE PATENT LAID-OPEN GAZETTE No. 4-185075). The color correction table is a numerical table that stores a mapping of corrected color image data to target color image data, which is the object to be corrected. For example, in the case of target color image data expressible by three color components, red (hereafter referred to as R), green (hereafter referred to as G), and blue (hereafter referred to as B), the technique divides a color space defined by three orthogonal axes of these color components into lattices and creates a three-dimensional numerical table that stores corrected color image data at each of lattice points. The procedure detects a coordinate point corresponding to target color image data and peripheral lattice points in the vicinity of the coordinate point in the color space and carries out interpolation of the corrected color image data stored at the peripheral lattice points, so as to specify the corrected color image data corresponding to the target color image data.

The applicant of the present invention has developed and filed a technique of quick color correction by referring to a color correction table without such interpolation (disclosed by JAPANESE PATENT LAID-OPEN GAZETTE No. 9-294212). This technique forcibly allocates the coordinate point corresponding to target color image data to a peripheral lattice point in the vicinity of the coordinate point. The color conversion table stores corrected image data at each lattice point. Allocation of the coordinate point of the target color image data to the peripheral lattice point ensures quick conversion of the target color image data into corrected color image data without interpolation. In the description hereafter, the process of forcibly allocating the coordinate point corresponding to target color image data to the peripheral lattice point prior to referring to the color correction table is called the 'prior art pre-conversion process'. The corrected color image data obtained from the lattice points allocated by the prior art pre-conversion process is different from the original corrected color image data obtained by direct color correction of the target color image data. There is an error in individual image data. In the description hereafter, the error arising due to pre-conversion is called the 'pre-conversion error'. The preferable procedure of pre-conversion enables the pre-conversion errors arising in the individual color image data to be mutually cancelled and makes the total error in a predetermined image area within an allowable level. This desirably prevents the image quality from being worsened by the pre-conversion error.

In the case of extremely large pre-conversion errors arising in individual image data, however, even if the mutual cancellation of the pre-conversion errors causes the total pre-conversion error in a predetermined image area to be not greater than an allowable level, the individual pre-conversion errors may be highly noticeable to worsen the picture quality. In such cases, the effective measure is to make lattice point intervals sufficiently dense in the color correction table. The arrangement of making the dense lattice point intervals and setting a large number of lattice points enables some of the lattice points to be present close to the coordinate point of the target color image data and thereby reduces the pre-conversion error. In other words, it is preferable to use the color correction table having a setting of lattice points at adequate intervals, in order to prevent the occurrence of the pre-conversion error exceeding the allowable level.

With a recent improvement in display quality, the allowable level of the pre-conversion error becomes stricter. The proposed method to attain the lowered pre-conversion error uses the color correction table having a dense setting of lattice point intervals. The denser setting of lattice point intervals, however, naturally raises the total number of lattice points and thereby increases the amount of data stored in one color correction table. This leads to an increase in storage capacity required for the color correction table. The increased amount of data in the color correction table lowers the processing speed of color correction and prevents quick output of a resulting image.

The interpolation technique can reduce the pre-conversion error without the dense setting of lattice point intervals. The interpolation, however, undesirably extends the total processing time and thereby prevents the high-speed color conversion.

SUMMARY OF THE INVENTION

The object of the present invention is thus to provide a technique that reduces a pre-conversion error without increasing the storage capacity required for a color correction table and ensures high-speed output of a high-quality image.

In order to attain at least part of the above and the other related objects, the present invention is directed to an image processing apparatus that receives target color image data, which is expressed by a coordinate value in at least one-dimensional color space, makes the target color image data subjected to a preset series of correction, and outputs corrected color image data. The image processing apparatus includes: a correction table that stores corrected data, which is expressed by a coordinate value, at each of lattice points defined by division of the color space with regard to each dimension; a lattice point selection module that selects N (where N is an integer of not less than 2) lattice points in an overlap-allowable manner among lattice points that have distances of not longer than a preset value from the coordinate value of the target color image data; and a corrected data specification module that specifies corrected color image data corresponding to the target color image data, based on the corrected data stored at the selected N lattice points.

There is an image processing method corresponding to the above image processing apparatus. The present invention is thus directed to an image processing method that receives target color image data, which is expressed by a coordinate value in at least one-dimensional color space, makes the target color image data subjected to a preset series of correction, and outputs corrected color image data. The image processing method includes the steps of: (A) storing corrected data, which is expressed by a coordinate value, at each of lattice points defined by division of the color space with regard to each dimension; (B) selecting N (where N is an integer of not less than 2) lattice points in an overlap-allowable manner among lattice points that have distances of not longer than a preset value from the coordinate value of the target color image data; and (C) specifying corrected color image data corresponding to the target color image data, based on the corrected data stored at the selected N lattice points.

In the image processing apparatus and the image processing method of the invention, the procedure receives the target color image data expressed by the coordinate value in the color space and selects N (where N is an integer of not less than 2) lattice points among lattice points that have distances of not longer than a preset value from the coordinate value of the target color image data. The procedure specifies the corrected color image data corresponding to the target color image data, based on the corrected data stored at the selected N lattice points. The arrangement of specifying the corrected color image data corresponding to the target color image data based on the multiple lattice points, which are arbitrarily selected among the lattice points having the distances of not longer than the preset value from the coordinate value of the target color image data, effectively reduces the pre-conversion error, compared with the prior art arrangement of specifying the corrected color image data based on only one lattice point. The corrected data stored at the lattice points can be referred to at a high speed. An increase in number of lattice points to be referred to thus results in only slightly increasing the total processing time. Even in such cases, the technique of the invention still ensures quick correction of the target color image data. The correction of the target color image data in the above manner effectively reduces the pre-conversion error without increasing the total number of lattice points included in the correction table. The image processing apparatus and the image processing method of the invention desirably reduce the pre-conversion error and ensure quick output of a high-quality resulting image without increasing the storage capacity required for the correction table.

In a first application of the image processing apparatus of the present invention, the lattice point selection module selects the N lattice points in an undefined manner.

In a first application of the image processing method of the present invention, the step (B) selects the N lattice points in an undefined manner.

In the first application of the image processing apparatus and the image processing method of the invention, the procedure receives the target color image data expressed by the coordinate value in the color space and selects N (where N is an integer of not less than 2) lattice points in an undefined manner among lattice points that have distances of not longer than a preset value from the coordinate value of the target color image data. Here 'selection of lattice points in the undefined manner' means that the selected lattice points are not fixed to the target color image data. Namely different lattice points may be selected every time for the identical target color image data. The selection in the undefined manner includes selection in a probabilistic manner or a stochastic manner. The procedure specifies the corrected color image data corresponding to the target color image data, based on the corrected data stored at the selected N lattice points.

The arrangement of specifying the corrected color image data corresponding to the target color image data based on the multiple lattice points, which are arbitrarily selected among the lattice points having the distances of not longer than the preset value from the coordinate value of the target color image data, effectively reduces the pre-conversion error, compared with the prior art arrangement of specifying the corrected color image data based on only one lattice point. The corrected data stored at the lattice points can be referred to at a high speed. An increase in number of lattice points to be referred to thus results in only slightly increasing the total processing time. Even in such cases, the technique of the invention still ensures quick correction of the target color image data. The correction of the target color image data in the above manner effectively reduces the pre-conversion error without increasing the total number of lattice points included in the correction table. The first application of the image processing apparatus and the image processing method of the invention desirably reduce the pre-conversion error and ensure quick output of a high-quality resulting image without increasing the storage capacity required for the correction table.

The selected lattice points are not fixed according to the coordinate value of the target color image data, but the N lattice points are selected in an undefined manner. The technique of undefined selection allows to adopt a simple method and ensures the higher-speed selection of the multiple lattice points, compared with the technique of defined selection according to the coordinate value of the target color image data, thus enabling the target color image data to be corrected at a higher speed.

The number of the selected lattice points can be increased freely according to the requirements. The greater number of the lattice points to be referred to reduces the pre-conversion error to a greater extent. The less number of the lattice points, on the contrary, ensures quick conversion of the target color image data into the corrected color image data. The first application of the image processing apparatus and the image processing method of the present invention enable flexible conversion of the target color image data according to a required conversion accuracy or a required conversion rate.

In one preferable embodiment of the first application of the image processing apparatus or the image processing method of the invention, N divisional tone values, which represent tone values of dividing each dimension of the color space, are selected with regard to each dimension to specify the N lattice points. The selection of the divisional tone values is carried out in such a manner that a divisional tone value closer to the coordinate value of the target color image data is selected with a higher probability.

Using the lattice points closer to the coordinate point of the target color image data ensures the more accurate specification of the corrected color image data corresponding to the target color image data. The lattice point having a coordinate value closer to the coordinate point of the target image data on each coordinate axis of the color space may be used, instead of the lattice point having the shorter distance from the coordinate point of the target color image data in the color space. This arrangement ensures easy selection of multiple lattice points. The N divisional tone values are selected with regard to each dimension in such a manner that the divisional tone value closer to the coordinate value of the target color image data is selected with a higher probability. The procedure then specifies the corrected color image data based on the corrected data stored at the selected N lattice points. This arrangement effectively reduces the total pre-conversion error.

In another preferable embodiment of the first application of the image processing apparatus or the image processing method of the invention, the procedure calculates an arithmetic mean of the corrected data stored at the N lattice points and specifies the corrected color image data corresponding to the target color image data, based on the calculated arithmetic mean.

Calculation of the arithmetic mean does not take time. This arrangement accordingly ensures quick specification of the corrected color image data corresponding to the target color image data, based on the arithmetic mean of the corrected data stored at the selected lattice points, thereby enabling quick output of a high-quality resulting image.

The conventional interpolation technique specifies adequate weight coefficients according to the positional relationship between the coordinate value of the target color image data and respective lattice points and multiplies the corrected data stored at the respective lattice points by the specified weight coefficients. In the first application of the image processing apparatus and the image processing method of the invention, on the other hand, the procedure simply calculates the arithmetic mean of the corrected data read from the selected lattice points, and does not require multiplication of the weight coefficients specified according to the positional relationship between the coordinate value of the target color image data and the respective lattice points. This arrangement ensures quick specification of the corrected color image data corresponding to the target color image data.

The calculation of the arithmetic mean divides the sum of the corrected data stored at the respective lattice points by the number of the selected lattice points. Such division gives a round error, which may lower the accuracy of the specification of the corrected color image data. The sum of the corrected data or the value obtained by dividing the sum of the corrected data by a smaller value than the number of the selected lattice points may be used instead of the arithmetic mean. This arrangement decreases the round error and thus improves the accuracy of the specification of the corrected color image data.

In a second application of the image processing apparatus of the invention, the lattice point selection module, when the target color image data is expressed by a coordinate value in an M-dimensional color space (where M is an arbitrary positive integer), selects multiple but not greater than M lattice points as the N lattice points.

In a second application of the image processing method of the invention, the step (B), when the target color image data is expressed by a coordinate value in an M-dimensional color space (where M is an arbitrary positive integer), selects multiple but not greater than M lattice points as the N lattice points.

In the second application of the image processing apparatus and the image processing method of the invention, the procedure receives the target color image data expressed by a coordinate value in an M-dimensional color space and selects multiple but not greater than M lattice points among lattice points that have distances of not longer than a preset value from the coordinate value of the target color image data. The procedure then specifies the corrected color image data corresponding to the target color image data, based on the corrected data stored at the selected multiple lattice points.

The arrangement of specifying the corrected color image data corresponding to the target color image data based on the corrected data stored at the selected multiple lattice points desirably reduce the pre-conversion error and ensure quick output of a high-quality resulting image without increasing the storage capacity required for the correction table. In the second application of the image processing apparatus and the image processing method of the invention, the corrected color image data corresponding to the target color image data is specified by simply referring to the multiple but not greater than M lattice points. In the case of M-dimensional target color image data, the conventional procedure using the interpolation technique should refer to at least (M+1) lattice points to specify the corrected color image data. The arrangement of the invention enables the corrected color image data to be specified based on the corrected data read from the less number of lattice points. The second application of the image processing apparatus and the image processing method of the invention accordingly ensure quick specification of the corrected color image data corresponding to the target color image data and thereby enable quick output of a resulting high-quality image.

Like the first application of the image processing apparatus and the image processing method, in the second application of the image processing apparatus and the image processing method, the number of lattice points to be referred to may arbitrarily be set according to the requirements. The second application of the image processing apparatus and the image processing method of the present invention enable flexible conversion of the target color image data according to a required conversion accuracy or a required conversion rate.

In the second application of the image processing apparatus and the image processing method of the invention, the N lattice points are selected in an undefined manner. The technique of undefined selection ensures the higher-speed selection of the multiple lattice points, compared with the technique of defined selection.

In one preferable embodiment of the second application of the image processing apparatus or the image processing method of the invention, multiple but not greater than M divisional tone values, which represent tone values of dividing each dimension of the color space, are selected with regard to each dimension to specify the multiple lattice points. The selection of the divisional tone values is carried out in such a manner that a divisional tone value closer to the coordinate value of the target color image data is selected with a higher probability.

Selection of the multiple lattice points in such a manner that the divisional tone value closer to the coordinate value of the target color image data is selected with a higher probability ensures the more accurate specification of the corrected color image data corresponding to the target color image data, compared with simple arbitrary selection of the multiple lattice points among the lattice points having the distances of not greater than the preset value from the coordinate value of the target color image data. The lattice point having a coordinate value closer to the coordinate point of the target image data on each coordinate axis of the color space may be used, instead of the lattice point having the shorter distance from the coordinate point of the target color image data in the color space. This arrangement ensures easy selection of multiple lattice points. The multiple divisional tone values are selected with regard to each dimension in such a manner that the divisional tone value closer to the coordinate value of the target color image data is selected with a higher probability. The procedure then specifies the corrected color image data based on the corrected data stored at the selected multiple lattice points. This arrangement effectively reduces the total pre-conversion error and thus ensures output of a high-quality resulting image.

In another preferable embodiment of the second application of the image processing apparatus or the image processing method of the invention, the procedure calculates an arithmetic mean of the corrected data stored at the multiple lattice points and specifies the corrected color image data corresponding to the target color image data, based on the calculated arithmetic mean.

Calculation of the arithmetic mean does not take time. This arrangement accordingly ensures quick specification of the corrected color image data corresponding to the target color image data, based on the arithmetic mean of the corrected data stored at the selected multiple lattice points.

In the second application of the image processing apparatus and the image processing method of the invention, the procedure simply calculates the arithmetic mean of the corrected data read from the selected lattice points to specify the corrected color image data corresponding to the target color image data, and does not require any interpolation of the corrected data or multiplication of the weight coefficients specified according to the positional relationship between the coordinate value of the target color image data and the respective lattice points. This arrangement ensures quick specification of the corrected color image data corresponding to the target color image data. Like the first application of the image processing apparatus and the image processing method, in the second application of the image processing apparatus and the image processing method, the sum of the corrected data or the value obtained by dividing the sum of the corrected data by a smaller value than the number of the selected lattice points may be used instead of the arithmetic mean.

In a third application of the image processing apparatus of the invention, the corrected data specification module reads the corrected data stored at the selected N lattice points from the correction table and calculates an arithmetic mean of the corrected data read from the selected N lattice points, so as to specify corrected color image data corresponding to the target color image data.

In a third application of the image processing method of the invention, the step (C) reads the corrected data stored at the selected N lattice points from the correction table and calculates an arithmetic mean of the corrected data read from the selected N lattice points, so as to specify corrected color image data corresponding to the target color image data.

In the third application of the image processing apparatus and the image processing method of the invention, the procedure receives the target color image data and selects multiple lattice points among lattice points that have distances of not longer than a preset value from the coordinate value of the target color image data on the color space. The procedure then reads the corrected data stored at the selected multiple lattice points, calculates the arithmetic mean of the corrected data, and specifies the arithmetic mean as the corrected color image data corresponding to the target color image data.

Compared with the prior art arrangement of specifying the corrected color image data corresponding to the target color image data based on the corrected data read from only one lattice point, the arrangement of specifying the corrected color image data corresponding based on the arithmetic mean of the corrected data read from the multiple lattice points effectively reduces the pre-conversion error and thereby ensures output of a high-quality resulting image. The third application of the image processing apparatus and the image processing method of the invention do not increase the total number of the lattice points included in the correction table nor raise the storage capacity required for the correction table. The corrected data stored at the lattice points can be referred to at a high speed. An increase in number of lattice points to be referred to thus results in only slightly increasing the total processing time. The conventional interpolation technique specifies adequate weight coefficients according to the positional relationship between the coordinate value of the target color image data and respective lattice points and multiplies the corrected data stored at the respective lattice points by the specified weight coefficients. The arrangement of the invention, on the other hand, does not require such multiplication and thereby ensures the higher-speed processing than the interpolation technique. The arrangement specifies the arithmetic mean of the corrected data read from the multiple lattice points as the corrected color image data corresponding to the target color image data. The third application of the image processing apparatus and the image processing method of the invention desirably reduce the pre-conversion error and ensure quick output of a high-quality resulting image without increasing the storage capacity required for the correction table.

Like the applications of the image processing apparatus and the image processing method discussed above, in the third application of the image processing apparatus and the image processing method, the number of lattice points to be referred to may arbitrarily be set according to the requirements. The third application of the image processing apparatus and the image processing method of the present invention enable flexible conversion of the target color image data according to a required conversion accuracy or a required conversion rate.

Like the applications of the image processing apparatus and the image processing method discussed above, in the third application of the image processing apparatus and the image processing method, the sum of the corrected data or the value obtained by dividing the sum of the corrected data by a smaller value than the number of the selected lattice points may be used instead of the arithmetic mean.

In the third application of the image processing apparatus and the image processing method of the invention, the N lattice points are selected in an undefined manner. The technique of undefined selection ensures the higher-speed selection of the multiple lattice points, compared with the technique of defined selection.

In one preferable embodiment of the third application of the image processing apparatus or the image processing method of the invention, multiple divisional tone values, which represent tone values of dividing each dimension of the color space, are selected with regard to each dimension to specify the multiple lattice points. The selection of the divisional tone values is carried out in such a manner that a divisional tone value closer to the coordinate value of the target color image data is selected with a higher probability.

Selection of the multiple lattice points in such a manner that the divisional tone value closer to the coordinate value of the target color image data is selected with a higher probability ensures the more accurate specification of the corrected color image data corresponding to the target color image data, compared with simple arbitrary selection of the multiple lattice points among the lattice points having the distances of not greater than the preset value from the coordinate value of the target color image data. The lattice point having a coordinate value closer to the coordinate point of the target image data on each coordinate axis of the color space may be used, instead of the lattice point having the shorter distance from the coordinate point of the target color image data in the color space. This arrangement ensures easy selection of multiple lattice points. The multiple divisional tone values are selected with regard to each dimension in such a manner that the divisional tone value closer to the coordinate value of the target color image data is selected with a higher probability. The procedure then specifies the corrected color image data based on the corrected data stored at the selected multiple lattice points. This arrangement effectively reduces the total pre-conversion error and thus ensures output of a high-quality resulting image.

In any of the first through the third applications of the image processing apparatus and the image processing method, multiple lattice points are selected, such that a difference between an expected probabilistic value of each of the K lattice points and the coordinate value of the target color image data is not greater than a preset level. Here 'the expected probabilistic value' represents a coordinate value on the center of a distribution of the lattice points when selection of multiple lattice points with regard to certain target color image data is carried out many times.

Selection of the multiple lattice points for the target color image data in this manner effectively restricts the total correction error arising in the process of correcting a large number of target color image data to be not greater than a preset level. This arrangement desirably prevents a color shift due to the correction of the target color image data and thereby ensures output of a high-quality resulting image.

In the image processing apparatus or the corresponding image processing method of this application, K divisional tone values, which represent tone values of dividing each dimension of the color space, may be selected with regard to each dimension and combined to specify the K lattice points.

Selection of the multiple divisional tone values with regard to each dimension results in selecting the multiple lattice points. This arrangement enables the multiple lattice points to be selected for the target color image data by the simple technique.

In the image processing apparatus or the corresponding image processing method of this application, one preferable procedure adds a noise to the coordinate value of the target color image data to generate decision data with regard to each dimension, and compares the decision data of each dimension with a predetermined threshold value, so as to select the K divisional tone values with regard to each dimension.

The noise is selectable from a predetermined range. The threshold value is determined in advance to allow for mutual cancellation of the differences between the respective noises and the threshold value and to cause the total difference to be not greater than an allowable level. In this application, the multiple lattice points are selected, based on the result of comparison between the decision data and the predetermined threshold value. This arrangement effectively restricts the total correction error arising in the process of correcting a large number of target color image data to be not greater than a preset level and thereby ensures output of a high-quality resulting image.

One preferable application generates the decision data according to the following procedure. The procedure first specifies a first divisional tone value and a second divisional tone value with regard to each dimension, out of the K divisional tone values. The first divisional tone value is closest to the coordinate value of the target color image data among smaller divisional tone values than the coordinate value of the target color image data. The second divisional tone value is closest to the coordinate value of the target color image data among greater divisional tone values than the coordinate value of the target color image data. The procedure subsequently calculates an inter-lattice tone value difference between the first divisional tone value and the second divisional tone value and generates K noises of different expected values in a range from a tone value '0' to the inter-lattice tone value difference, with regard to each dimension. Here the 'expected value of the noise' represents the mean value of a large number of noises that allow for significant statistics. The procedure adds the K noises to the coordinate value of the target color image data, so as to generate K decision data with regard to each dimension.

The procedure then selects either of the first divisional tone value and the second divisional tone value based on a result of the comparison between each of the K decision data and the predetermined threshold value, so as to select the K divisional tone values. In the arrangement of applying the noises of different expected values for generation of the K decision data, the first divisional tone value and the second divisional tone value are selected at a suitable ratio according to the coordinate value of the target color image data. This arrangement enables adequate selection of the multiple lattice points, thereby further reducing the pre-conversion error and preferably ensuring output of a higher-quality resulting image.

The K noises having different expected values may be generated according to the following procedure. The procedure first calculates a tone value that is 1/K of the inter-lattice tone value difference as a shift quantity with regard to each dimension, and generates noise in a range from a tone value '0' to the calculated shift quantity as a reference noise with regard to each dimension. The procedure subsequently shifts the reference noise by the calculated shift quantity (K−1) times, so as to generate the K noises of different expected values.

This arrangement generates the K noises having the expected values of identical intervals. Application of these noises ensures adequate selection of the multiple lattice points.

The decision data and the threshold value may be set in the following manner for selection of the multiple lattice points. The procedure first specifies a first divisional tone value and a second divisional tone value with regard to each dimension, out of the K divisional tone values. The first divisional tone value is closest to the coordinate value of the target color image data among smaller divisional tone values than the coordinate value of the target color image data. The second divisional tone value is closest to the coordinate value of the target color image data among greater divisional tone values than the coordinate value of the target color image data. The procedure subsequently sets the second divisional tone value and (K−1) tone values, which equally divide an interval between the first divisional tone value and the second divisional tone value, as K threshold values. The procedure adds a noise corresponding to a tone value difference between the first divisional tone value and the second divisional tone value to the coordinate value of the target color image data, so as to generate the decision data with regard to each dimension. The procedure selects either of the first divisional tone value and the second divisional tone value based on a result of the comparison between the generated decision data and each of the K threshold values, so as to select the K divisional tone values.

The first divisional tone value and the second divisional tone value can be selected at a suitable ratio according to the coordinate value of the target color image data. This arrangement enables adequate selection of the multiple lattice points, thereby further reducing the pre-conversion error and preferably ensuring output of a higher-quality resulting image.

In the image processing apparatus or the corresponding image processing method of the above application, one preferable procedure selects two lattice points for the target color image data and specifies the corrected color image data corresponding to the target color image data based on the corrected data read from the selected two lattice points.

The arrangement of selecting two lattice points for the target color image data and specifying the corrected color image data effectively reduces the pre-conversion error as discussed later in detail. This arrangement desirably decreases the pre-conversion error and ensures output of a high-quality resulting image without increasing the storage capacity required for the correction table. Especially in the case of two lattice points, the general bit shifting operation in the computer can be used to implement the quick calculation of the arithmetic mean and thereby ensure high-speed correction of the target color image data.

An adequate number of lattice points may be selected for the target color image data according to image processing conditions. For example, the procedure may detect setting of a processing mode, which gives a priority to at least either of an execution speed of the preset series of correction and a correction accuracy of the target color image data, and select a specified number of the lattice points according to the detected processing mode. The execution speed of the preset series of correction or the correction accuracy of the target color image data may be set in an explicit manner or may be specified based on the settings of the image processing conditions.

Setting the suitable number of lattice points according to the processing mode ensures adequate correction of the target color image data.

One preferable arrangement of the above application selects a greater number of the lattice points in a certain setting of the processing mode that gives the priority to the correction accuracy over the execution speed than a number of lattice points in another setting of the processing mode that gives the priority to the execution speed over the correction accuracy.

The larger number of lattice points selected for the target color image data results in reducing the pre-conversion error to a greater extent and thereby enhances the correction accuracy of the target color image data. The less number of lattice points, on the other hand, ensures higher-speed correction of the target color image data. The number of lattice points selected in the processing mode that gives the priority to the correction accuracy of the target color image data over the execution speed is greater than the number of lattice points selected in the different processing mode that gives the priority to the execution speed over the correction accuracy. This arrangement selects the suitable number of lattice points according to the processing mode and ensures adequate correction of the target color image data.

In any of the image processing apparatuses discussed above, the target color image data may be RGB image data expressed by coordinate values in a color space defined by a red (R) axis, a green (G) axis, and a blue (B) axis. The correction table may store tone values of at least cyan, magenta, and yellow as the corrected data.

In many cases, conversion of the RGB image data into image data defined by tone values of various colors including at least cyan, magenta, and yellow is required to print a color image. The image processing apparatus of the above application ensures high-speed conversion of the target color image data while reducing the pre-conversion error.

The principle of the image processing apparatus or any of its first through third applications of the present invention is preferably applicable to a printing apparatus. The image processing apparatus of the invention having any arrangement makes the input target color image data subjected to a preset series of correction at a high speed, while significantly reducing the pre-conversion error arising due to correction of the target color image data. Application of the image processing apparatus or any of its first through third applications of the present invention to the printing apparatus ensures quick correction of the target color image data and enables a high-quality resulting image to be printed at a high speed.

In one preferable application of the printing apparatus of the invention, the procedure selects K (where K is an integer of not less than 2) lattice points, such that a difference between an expected probabilistic value of each of the K lattice points and the coordinate value of the target color image data is not greater than a preset level.

Selection of the multiple lattice points for the target color image data in this manner effectively restricts the total correction error arising in the process of correcting a large number of target color image data to be not greater than a preset level. This arrangement desirably prevents a color shift due to the correction of the target color image data and thereby enables the printing apparatus to print a high-quality color image without any color shift.

The image processing method of the invention discussed above may be actualized by the functions of a computer that reads a computer program corresponding to the image processing method. Another application of the present invention is accordingly a computer program product.

There is a computer program product corresponding to the image processing apparatus. The present invention is thus directed to a computer program product for actualizing an image processing method that receives target color image data, which is expressed by a coordinate value in at least one-dimensional color space, makes the target color image data subjected to a preset series of correction, and outputs corrected color image data. The computer program product has: a computer readable recording medium; and a computer program stored in the recording medium. The computer program causes a computer to attain the functions of: (A) storing corrected data, which is expressed by a coordinate value, at each of lattice points defined by division of the color space with regard to each dimension; (B) selecting N (where N is an integer of not less than 2) lattice points in an overlap-allowable manner among lattice points that have distances of not longer than a preset value from the coordinate value of the target color image data; and (C) specifying corrected color image data corresponding to the target color image data, based on the corrected data stored at the selected N lattice points.

In a first application of the computer program product, the function (B) selects the N lattice points in an undefined manner.

In a second application of the computer program product, the function (B), when the target color image data is expressed by a coordinate value in an M-dimensional color space (where M is an arbitrary positive integer), selects multiple but not greater than M lattice points as the N lattice points.

In a third application of the computer program product, the function (C) reads the corrected data stored at the selected N lattice points from the correction table and calculates an arithmetic mean of the corrected data read from the selected N lattice points, so as to specify corrected color image data corresponding to the target color image data.

The computer reads the computer program stored in the computer program product and executes the respective functions discussed above to reduce the pre-conversion error arising in the process of correcting the color image data, thus ensuring high-speed output of high-quality image data.

The above and other objects, features, aspects, and advantages of the present invention will become more apparent from the following detailed description of the preferred embodiments with the accompanying drawings.

BRIEF DESCRIPTION OF THE DRAWINGS

FIG. 2 shows the principle of reducing a pre-conversion error by allocation of image data to multiple lattice points;

FIG. 19 shows the principle of causing pre-conversion errors arising in individual image data to be mutually cancelled;

FIG. 20 shows a mid state of the pre-conversion/color conversion process with regard to image data of one image plane in a modified example of the first embodiment;

FIG. 21 shows examples of weight coefficients used for diffusion of a pre-conversion error arising in each target pixel to peripheral non-processed pixels according to the error diffusion method;

FIG. 22 shows diffusion of pre-conversion errors arising in peripheral processed pixels to a target pixel;

DESCRIPTION OF THE PREFERRED EMBODIMENTS

Figure 1:
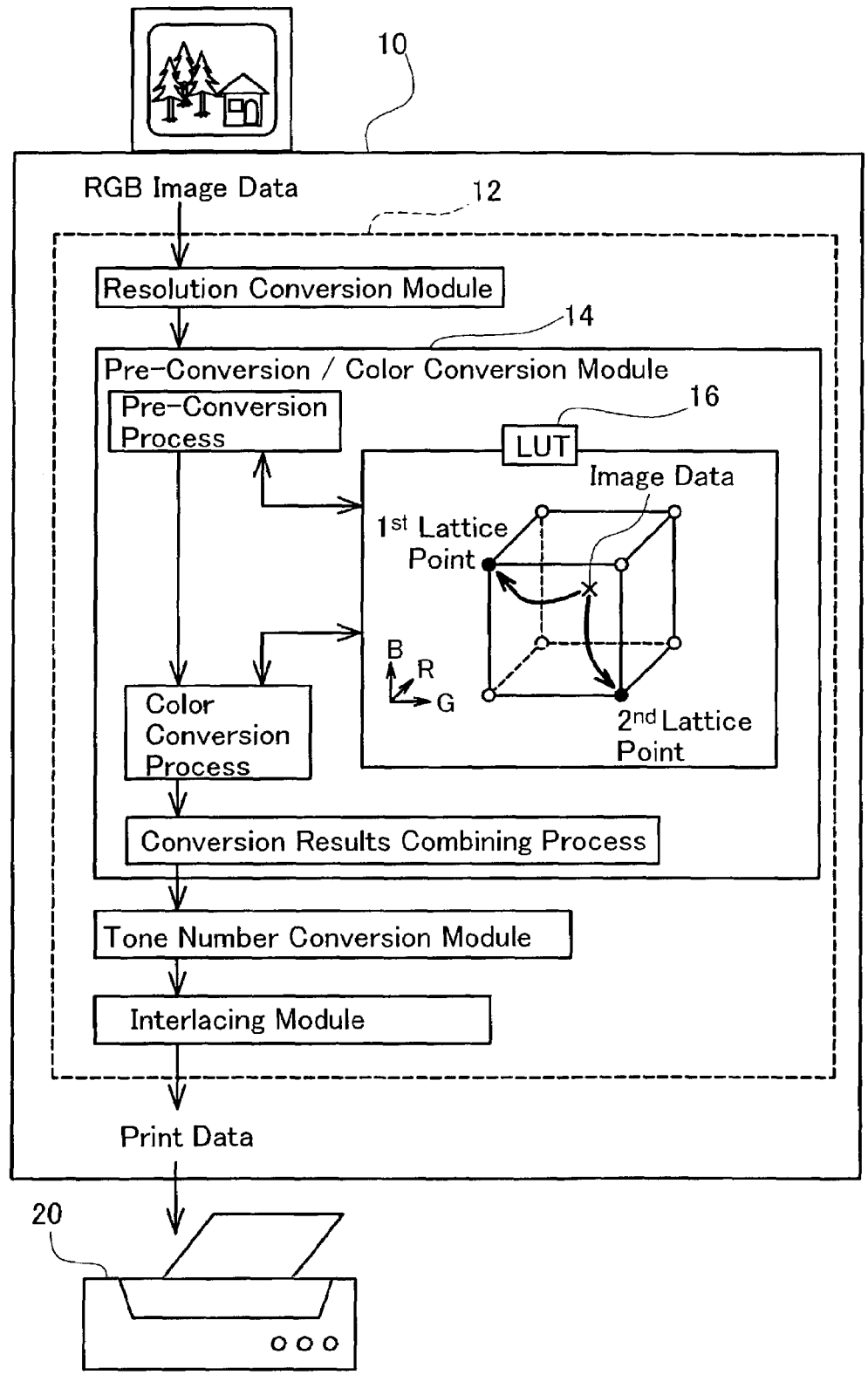
FIG. 1 shows a printing system to conceptually explain a common behavior of embodiments of the present invention.

Some modes of carrying out the invention are discussed below as preferred embodiments in the following sequence:
A. Outline of Embodiments
B. Principle of Reducing Pre-Conversion Error
C. First Embodiment
   C-1. Construction of System
   C-2. Outline of Image Processing
   C-3. Pre-Conversion/Color Conversion Process of First Embodiment C-4. Pre-Conversion Process
C-5. Color Conversion Process
C-6. Modification
D. Second Embodiment
  D-1. Pre-Conversion Process of Second Embodiment
  D-2. Color Conversion Process of Second Embodiment
E. Third Embodiment
  E-1. Pre-Conversion Process of Third Embodiment
  E-2. Modification A. Outline of Embodiments For better understanding, the outline of following embodiments of the present invention is discussed with reference to FIG. 1, prior to description of embodiments. FIG. 1 shows a printing system to conceptually explain the outline of the present invention. The printing system has a computer 10 as an image processing apparatus and a color printer 20. The computer 10 receives color image data expressed by RGB color tone values from an imaging device, such as a digital camera or a color scanner, and converts the input color image data into print data expressed by the presence or absence of respective color dots printable by the color printer 20. Such conversion of the color image data is carried out according to a special program called a printer driver 12. The computer 10 may create the color image data expressed by the RGB color tone values according to a diversity of application programs.

The printer driver 12 has multiple modules including a resolution conversion module, a pre-conversion/color conversion module 14, a tone number conversion module, and an interlacing module. The printer driver 12 receives the color image data and successively activates these modules to carry out image processing and thereby convert the input color image data into print data.

As shown in FIG. 1, the pre-conversion/color conversion module 14 sequentially carries out a pre-conversion process, a color conversion process, and a conversion results combining process with regard to the RGB image data transmitted from the resolution conversion module. For convenience of explanation, the color conversion process will be discussed prior to the pre-conversion process, although the color conversion process is actually carried out after completion of the pre-conversion process. The color conversion process refers to a color conversion look-up table LUT 16 to convert image data expressed by tone values of respective R, G, and B colors into image data expressed by tone values of colors printable by the color printer 20, that is, cyan (C), magenta (M), and yellow (Y). The color conversion table LUT 16 stores tone values of the CMY colors mapped to the RGB image data at respective lattice points, which are defined by dividing an RGB color space into lattices. For the simplicity of explanation, the following description is on the assumption that the color printer 20 uses inks of only the C, M, and Y colors. The explanation is, however, applicable to any color printer with additional color inks, for example, black (K), light cyan (LC), and light magenta (LM).

Prior to the color conversion process, the pre-conversion process allocates each coordinate point specified by the RGB color image data in the RGB color space to lattice points in the color conversion table LUT 16 in the vicinity of the coordinate point. The pre-conversion process of the invention selects multiple lattice points, which are to be mapped to one coordinate point, and allocates the coordinate point of the RGB color image data to the selected multiple lattice points. Allocation of the coordinate point of image data to multiple lattice points is conceptually shown in the LUT 16 of FIG. 1. The illustrated example in the LUT 16 is part of the RGB color space. The symbol 'x' (cross) denotes the coordinate point of the RGB image data, and the symbols '•' (closed circle) and 'o' (open circle) denote the lattice points in the LUT 16 in the vicinity of the coordinate point. The two arrows from the symbol 'x' to the symbol '•' schematically show allocation of the coordinate point of the RGB image data to two lattice points, that is, a first lattice point and a second lattice point.

For the simplicity of illustration, the coordinate point of the image data is allocated to the two lattice points in the illustrated example. The number of the lattice points to be allocated is not restricted to 2, but the coordinate point may be allocated to a greater number of lattice points. Alternatively the coordinate point may be allocated to one identical lattice point in an overlapping manner. Namely the first lattice point and the second lattice point in the illustrated example may be an identical lattice point.

In the description above, the color image data subjected to the image processing is the RGB color image data, and the color space is the three-dimensional color space of the R, G, and B colors. This is, however, not restrictive at all. For example, the image data subjected to the image processing may be the CMY color image data or the higher order of color image data including black (K) and other colors. The technique of the present invention is applicable to such higher-order of image data. The technique of the present invention is also applicable to the lower-order of image data, that is, one-dimensional image data and two-dimensional image data. The details of the pre-conversion process to allocate the color image data to the lattice points will be discussed later.

As discussed above, in the procedure of the invention, the pre-conversion process generates multiple lattice points from one coordinate point of the color image data. After generation of the multiple lattice points, the subsequent color conversion process refers to the color conversion table LUT to convert RGB color image data at the respective lattice points into CYM color image data.

The conversion results combining process, which follows the color conversion process, calculates CMY image data corresponding to RGB image data, based on the CMY image data read from the respective lattice points. The tone number conversion module and the interlacing module are then activated to make the CMY image data corresponding to the RGB image data subjected to a preset series of processing and thereby convert the RGB image data into resulting print data.

A first application of the present invention selects multiple lattice points in the LUT in the vicinity of each coordinate point of the RGB color image data in the RGB color space and allocates the coordinate point of the RGB image data to the selected lattice points. The procedure then reads the CMY image data stored at the multiple lattice points and calculates the CMY image data corresponding to the RGB image data based on the CMY image data read from the respective lattice points. Compared with the prior art pre-conversion technique that allocates one coordinate point to only one lattice point, this procedure of the invention desirably reduces the pre-conversion error. The reason of such reduction will be discussed later in detail. This method requires specification of the CMY image data at the multiple lattice points and accordingly increases the time required for conversion. The CMY image data at the respective lattice points have been stored in advance in the LUT. The actual process of specifying the CMY image data at the lattice points is thus carried out at an extremely high speed. The increase in processing time with an increase in number of lattice points referred to is accordingly negligible.

In the procedure of the present invention, the number of lattice points, to which one coordinate point is allocated, is an arbitrary integer of not less than 2. The increase in number of lattice points to be allocated desirably decreases the pre-conversion error. A necessary and sufficient number of lattice points is specified according to the allowable level of pre-conversion error. This arrangement also ensures the high-speed processing. This arrangement is explained, in contrast to the prior art process of carrying out interpolation from multiple lattice points for color conversion. Here the LUT is a three-dimensional LUT of the RGB colors, and each coordinate point of the color image data is subjected to color conversion by the interpolation technique. Even tetrahedral interpolation, which has the less number of lattice points to be referred to, among various interpolation techniques should refer to data at four lattice points. The procedure of the present invention, on the other hand, should refer to data at only two lattice points for color conversion. Although the pre-conversion error arising by the procedure of the present invention is greater than the pre-conversion error arising by the prior art interpolation technique, the pre-conversion error within the allowable range does not significantly affect the picture quality. In most cases, referring to data at only two lattice points sufficiently reduces the pre-conversion error.

A second application of the present invention selects M or less multiple lattice points in the LUT in the vicinity of each coordinate point of M-dimensional color image data and allocates the coordinate point of the M-dimensional color image data to the selected multiple lattice points. The procedure then reads the CMY image data stored at the multiple lattice points and calculates the CMY image data corresponding to the RGB image data, based on the CMY image data read from the lattice points. Because of the similar reason to that discussed in the first application of the present invention, this arrangement desirably reduces the pre-conversion error, compared with the prior art pre-conversion technique that allocates one coordinate point to one lattice point. In the second application of the invention, the number of lattice points, to which the M-dimensional image data is allocated, is not greater than M. This ensures the higher-speed color conversion. The prior art interpolation method should refer to at least (M+1) lattice points for color conversion of the M-dimensional image data. Compared with this prior art method, the pre-conversion/color conversion process of the second application according to the present invention significantly shortens the total time required for color conversion.

A third application of the present invention reads the CMY image data from multiple lattice points, to which the image data is allocated, calculates an arithmetic mean of the CMY image data read from the multiple lattice points, and calculates CMY image data corresponding to the RGB image data based on the calculated arithmetic mean. Because of the similar reason to that discussed in the first application of the present invention, the process of color conversion of the RGB image data based on the arithmetic mean of the CMY image data read from the multiple lattice points, to which one coordinate point is allocated, desirably reduces the pre-conversion error, compared with the prior art pre-conversion technique. Among the various methods of calculating the CMY image data corresponding to the RGB image data based on the CMY image data read from the multiple lattice points, this method using the arithmetic mean does not require specification of the distance between the coordinate point and each lattice point, which is required in the prior art interpolation method. This accordingly shortens the total time required for color conversion. Namely the calculation of the CMY image data based on the arithmetic mean ensures the high-speed pre-conversion/color conversion process.

In the respective applications of the present invention discussed above, the procedure may select each of the multiple lattice points in such a manner that the difference between an expected probabilistic coordinate value at the lattice point (that is, a coordinate value on the center of a distribution of lattice points when allocation of color image data to multiple lattice points is performed a large number of times) and an actual coordinate value of the RGB image data is equal to or less than a preset level. Color conversion of the RGB image data into the CMY image data based on the lattice points selected in this manner desirably limits the difference in color expressed by the color image data before and after the color conversion to an allowable range and thus enables accurate color conversion.

The following describes the principle of reducing the pre-conversion error by the method of allocating one coordinate point to multiple lattice points and calculating the CMY image data based on the CMY image data read from the multiple lattice points. The description then regards multiple embodiments as applications of this principle.

B. Principle of Reducing Pre-Conversion Error

FIG. 2 shows the principle of reducing the pre-conversion error by allocation of image data to multiple lattice points. For the clarity of explanation, it is here assumed that the target image data to be processed and the color conversion table LUT are respectively one-dimensional image data and a one-dimensional table. The printer driver 12 generally deals with the three-dimensional image data expressed by a combination of three tone values of the respective R, G, and B color components. The color conversion table LUT is typically a three-dimensional table that stores color converted image data mapped to each image data expressed by the combination of the tone values of the R, G, and B color components. In the example of FIG. 2, however, the image data is one-dimensional data expressed by a tone value on an R axis.

Preparatory to explanation of the principle of reducing the pre-conversion error, the prior art pre-conversion technique is described briefly with reference to FIG. 2(a). In response to input of image data having a tone value X, the prior art pre-conversion technique allocates the input image data to a neighboring lattice point in the LUT. In the illustrated example of FIG. 2, the LUT is one-dimensional and the input image data is allocated to either one of a lattice point P1 having a tone value R1 and a lattice point P2 having a tone value R2. The subsequent color conversion process reads the tone values of the respective C, M, and Y colors stored at the lattice point, to which the image data is allocated, and specifies the combination of the tone values as color-converted image data. For the simplicity of explanation, the following description focuses on the tone value of the color component C. The description is naturally applicable to the tone values of the other color components. Tone values C1 and C2 are stored at the lattice points P1 and P2 in the LUT. In the case of allocation of the image data to the lattice point P1, the tone value C1 is obtained as the color-converted image data. In the case of allocation of the image data to the lattice point P2, on the other hand, the tone value C2 is obtained as the color-converted image data.

The pre-conversion error arising by allocation of the image data to one of the lattice points is either an error due to the allocation of the image data having the tone value X to the lattice point having the tone value R1 or an error due to the allocation of the image data having the tone value X to the lattice point having the tone value R2. The pre-conversion error is maximized in the case of allocation of the image data having the tone value R1 to the lattice point P2 or in the case of allocation of the image data having the tone value R2 to the lattice point P1. The tone value C1 is stored at the lattice point P1 in the LUT, whereas the tone value C2 is stored at the lattice point P2 in the LUT. In either case, the maximum pre-conversion error is accordingly equal to a tone value difference (C2−C1). Based on this preparatory explanation, the following describes the principle of reducing the pre-conversion error by allocation of image data to multiple lattice points in the LUT.

FIG. 2(b) shows a process of allocating image data to two lattice points. Allocation of image data to a greater number of lattice points is allowable. This arrangement will be discussed later as a modified example. For convenience of explanation, the two lattice points, to which the image data is allocated, are differentiated as a first lattice point and a second lattice point.

As in the case of FIG. 2(a), the coordinate value of the image data is the tone value X, the coordinate value of the lattice point P1 is the tone value R1, and the coordinate value of the lattice point P2 is the tone value R2. When the coordinate value of the image data is closer to the lattice point P1 than the lattice point P2, that is, when the tone value X satisfies a relation of:

$X < (R1+R2)/2$, the image data is always allocated to the lattice point P1 as the first lattice point. The arrow of solid line extending from the symbol 'x' representing the image data to the symbol '○' representing the lattice point P1 in FIG. 2(b) schematically shows allocation of the image data to the lattice point P1 as the first lattice point. The image data is also allocated to either one of the lattice points P1 and P2 as the second lattice point. The arrows of broken line extending from the symbol 'x' representing the image data to the symbols '○' representing the lattice points P1 and P2 in FIG. 2(b) schematically show allocation of the image data to either of the lattice points P1 and P2 as the second lattice point. When the coordinate value of the image data is closer to the lattice point P1 than the lattice point P2, the image data may be allocated to the one identical lattice point P1 in an overlapping manner or may alternatively be allocated to the two lattice points P1 and P2.

The subsequent color conversion process reads the tone values stored at the first lattice point and the second lattice point, to which the image data has been allocated, calculates an arithmetic mean of these tone values, and specifies the calculated mean tone value as color-converted image data. FIG. 2(c) shows a process of calculating color-converted image data from the tone values stored at the two lattice points. In the first case, the image data is allocated to the identical lattice point P1 as both the first lattice point and the second lattice point (see the upper row of FIG. 2(c)). The tone value C1 is stored at the lattice point P1 in the LUT. In this case, the tone value C1 is obtained from both of the first lattice point and the second lattice point. The tone value of the color-converted image data is accordingly equal to the tone value C1 as the arithmetic mean of the obtained tone values. The arithmetic mean is not restrictive at all, but the tone value of the color-converted image data may be equal to an internally dividing point of the obtained tone values at an arbitrary ratio.

There is a pre-conversion error equal to a tone value difference (Cx−C1), where Cx denotes a tone value of color-converted image data obtained without pre-conversion (for example, by the known interpolation method). The pre-conversion error is maximized in the case of allocation of the image data to the identical lattice point P1 as both of the first lattice point and the second lattice point, when the image data has an intermediate tone value between the tone values of the lattice points P1 and P2. This error is equal to an error arising due to allocation of the image data corresponding to the midpoint of the lattice points P1 and P2 to the lattice point P1 in the prior art pre-conversion technique shown in FIG. 2(a). The maximum pre-conversion error is thus significantly reduced.

In the second case, the image data is allocated to the two lattice points P1 and P2 respectively as the first lattice point and the second lattice point (see the lower row of FIG. 2(c)). In this case, the tone value C1 is obtained from the first lattice point, whereas the tone value C2 is obtained from the second lattice point. The tone value of the color-converted image data is accordingly equal to a tone value (C1+C2)/2 calculated as the arithmetic mean. There is a pre-conversion error equal to a result of subtraction of the tone value Cx from the mean tone value (C1+C2)/2. The pre-conversion error is maximized in the case of allocation of the image data to the lattice point P1 as the first lattice point and to the lattice point P2 as the second lattice point, when the tone value of the image data is coincident with the tone value of the lattice point P1. This error is equal to an error arising due to allocation of the image data corresponding to the lattice point P1 to a substantial midpoint of the lattice points P1 and P2 in the prior art pre-conversion technique shown in FIG. 2(a). The maximum pre-conversion error is thus significantly reduced.

In the above cases, the tone value X of the image data is closer to the tone value R1 of the lattice point P1 than the tone value R2 of the lattice point P2. The similar principle is held when the tone value X of the image data is closer to the tone value R2 of the lattice point P2. In such cases, as shown in FIG. 2(d), the image data is always allocated to the lattice point P2 as the second lattice point. The image data is also allocated to either one of the lattice points P1 and P2 as the first lattice point. Namely the image data may be allocated to the two lattice points P1 and P2, or may alternatively be allocated to the one identical lattice point P2 in an overlapping manner. In either case, the procedure of the invention significantly reduces the maximum pre-conversion error, compared with the prior art pre-conversion technique.

Figure 3A:
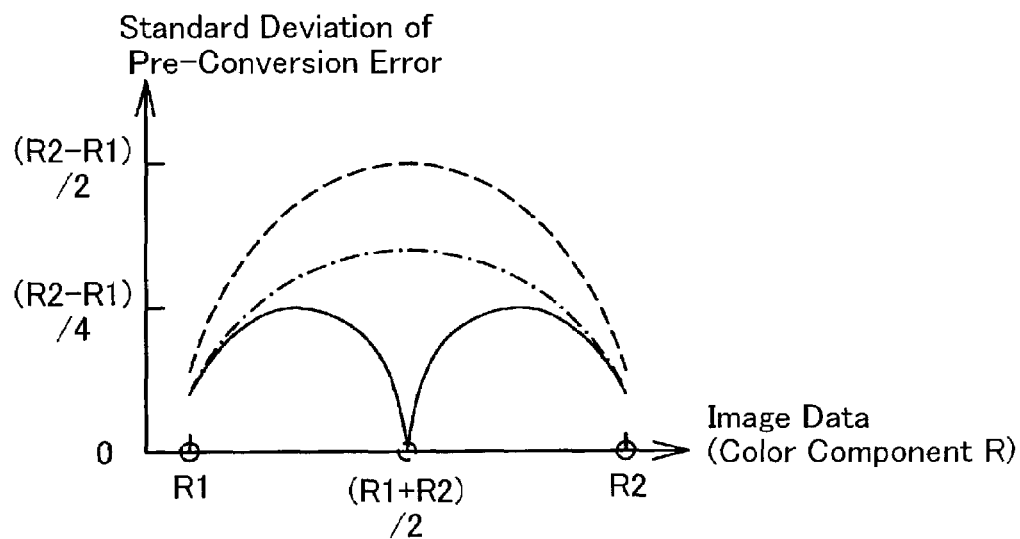
FIG. 3 shows the effects of allocation of image data to multiple lattice points on reduction of the pre-conversion error, which are confirmed by a statistic technique.

As discussed above, the arrangement of allocating one image data to multiple lattice points significantly reduces the pre-conversion error. This is confirmed by a statistical technique. FIG. 3(a) shows calculated standard deviations of the pre-conversion errors arising due to the actual pre-conversion process of multiple image data. The graph of FIG. 3(a) gives the comparison of the results between the prior art pre-conversion technique that allocates one image data to one lattice point and the pre-conversion process of the invention that allocates one image data to two lattice points.

For convenience of explanation, like the example of FIG. 2, here it is assumed that the image data is one-dimensional data of only the color component R. The image data has a tone value X, which is in a range of a tone value R1 to a tone value R2. This image data is subjected to the prior art pre-conversion technique and the pre-conversion process of the present invention. Standard deviations of the pre-conversion errors arising in the respective cases are then calculated.

Figure 3B:
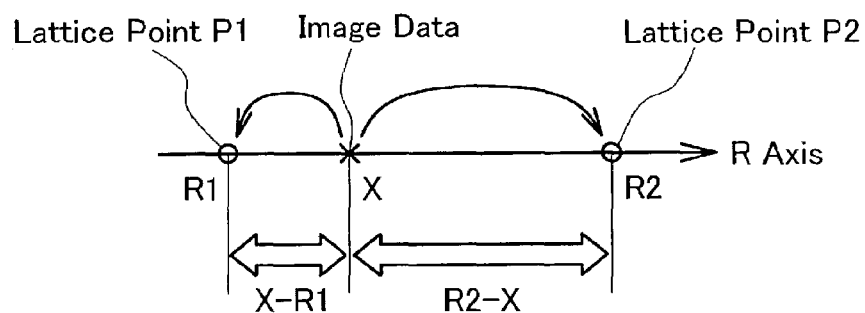

FIG. 3(b) conceptually shows an example of the prior art pre-conversion technique. The prior art pre-conversion technique allocates the image data having the tone value X to either one of a lattice point P1 having the tone value R1 and a lattice point P2 having the tone value R2. The pre-conversion error arising by allocation of the image data having the tone value X is accordingly equal to either a tone value difference 'X−R1' or a tone value difference 'R2−X'. The procedure makes the image data having the tone value X subjected to the prior art pre-conversion technique multiple times to obtain multiple pre-conversion errors, and calculates the standard deviation of the pre-conversion error. This calculation gives the standard deviation of the pre-conversion error with regard to the image data having the tone value X. In this manner, the standard deviation of the pre-conversion error is obtained with regard to any image data having a tone value in the range of the tone value R1 to the tone value R2.

The curve of broken line in FIG. 3(a) shows the standard deviation arising by making the image data subjected to the prior art pre-conversion technique, that is, by allocation of one image data to either one of the lattice points P1 and P2. For example, allocation of image data having a tone value (R1+R2)/2 to either the lattice point P1 or the lattice point P2 gives an identical pre-conversion error (R2−R1)/2 and thereby a standard deviation (R2−R1)/2. The curve of broken line in FIG. 3(a) is obtained by dividing the range from the tone value R1 to the tone value R2 into 50 equal parts, carrying out pre-conversion of image data corresponding to respective divisional points multiple times (about thousand times), and connecting calculated standard deviations of pre-conversion errors at the respective divisional points.

Figure 3C:
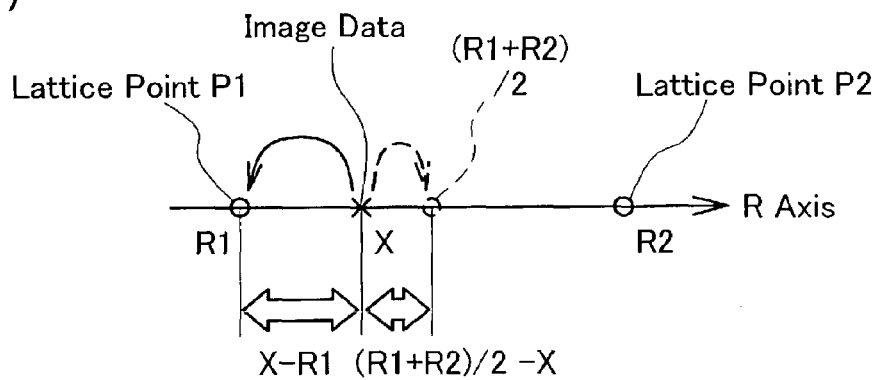

FIG. 3(c) conceptually shows an example of the pre-conversion process of the invention that allocates one image data to two lattice points. In this illustrated example, the tone value X of the image data is smaller than the tone value of the midpoint between the two lattice points, that is, the mean tone value (R1+R2)/2. As discussed above with reference to FIG. 2, the pre-conversion error arising by making such image data subjected to the pre-conversion process of the invention is equal to either a tone value difference (X−R1) or a tone value difference ((R1+R2)/2)−X. The procedure makes the image data having the tone value X subjected to the pre-conversion process of the invention multiple times and calculates the standard deviation of the pre-conversion error.

The curve of solid line in FIG. 3(a) shows the standard deviation of the pre-conversion error arising by making the image data having the tone value in the range between the tone values R1 and R2 subjected to the pre-conversion process of the invention. The image data used for calculation of the pre-conversion error in the pre-conversion process of the invention is identical with the image data used for the calculation of the pre-conversion error in the prior art pre-conversion technique shown by the curve of broken line. As clearly shown by the comparison between the curve of solid line and the curve of broken line in FIG. 3(a), the pre-conversion process of the invention significantly reduces the pre-conversion error, compared with the prior art pre-conversion technique.

This drastic effect is ascribed to superposition of the following two factors. The first factor is allocation of one image data to multiple (two in the illustrated example) lattice points. The second factor is adequate selection of these multiple lattice points. These factors are discussed more in detail.

The curve of one-dot chain line in FIG. 3(a) shows the standard deviation of the pre-conversion error arising by simple allocation of one image data to two lattice points as a comparative example. The pre-conversion process of this comparative example carries out the prior art pre-conversion technique twice to allocate the image data to two lattice points, repeats this series of processing multiple times, and calculates the standard deviation of the pre-conversion process on the assumption that the image data is allocated to the middle point of these two lattice points. The procedure calculates the mean of coordinate values of the multiple lattice points, to which the image data is allocated, and calculates the pre-conversion error on the assumption that the image data is allocated to the coordinate point of the mean values. As clearly shown by the comparison between the curve of broken line and the curve of one-dot chain line in FIG. 3(a), the pre-conversion error arising by the pre-conversion process of the comparative example is smaller than the pre-conversion error arising by the prior art pre-conversion technique. Since the difference between the pre-conversion process of the comparative example and the prior art pre-conversion technique is only the number of lattice points, to which the image data is allocated, the difference between the curve of broken line and the curve of one-dot chain line in FIG. 3(a) can be ascribed to the effect of the first factor, that is, the simple increase in number of lattice points.

The difference between the curve of one-dot chain line and the curve of solid line in FIG. 3(a) can be ascribed to the effect of the second factor. Both the curve of one-dot chain line and the curve of solid line are the results obtained by allocation of one image data to two lattice points. As mentioned above, however, the pre-conversion process of the invention (the curve of solid line) adequately selects the two lattice points, to which the image data is allocated, according to the tone value of the image data. When the tone value X of the image data satisfies the relation of:

$$X<(R1+R2)/2,$$

the procedure always selects the lattice point P1 as the first lattice point while selecting either one of the lattice points P1 and P2 as the second lattice point. When the tone value X of the image data does not satisfy the above relation, on the contrary, the procedure always selects the lattice point P2 as the second lattice point while selecting either one of the lattice points P1 and P2 as the first lattice point. The difference between the curve of one-dot chain line and the curve of solid line in FIG. 3(a) is thus ascribed to the effect of the second factor, that is, the effect of adequate selection of the two lattice points in this manner. The superposition of the effects of the two factors significantly reduces the pre-conversion error. Although the superposition of the two factors results in the greater effects, the effect of only the first factor makes the pre-conversion error smaller than the pre-conversion error by the prior art pre-conversion technique. The procedure of the invention may thus be modified to carry out the prior art pre-conversion technique multiple times and allocate one image data to multiple lattice points.

As discussed above, the prior art pre-conversion technique that allocates one image data to one lattice point gives the maximum pre-conversion error by allocation of the image data equivalent to the lattice point P2 to the lattice point P1. The pre-conversion process of the present invention that allocates one image data to two lattice points, on the other hand, significantly reduces the maximum pre-conversion error. Several methods are applicable for allocation of one image data to two lattice points. These methods will be described later in detail as embodiments of the present invention.

The above description is on the assumption that both the target image data and the LUT are one-dimensional, for the better understanding. The principle of the present invention is readily expandable to the case where both the target image data and the LUT are multi-dimensional. The following describes application of the invention to two-dimensional image data and two-dimensional LUT as an example of the expansion of the invention to multiple dimensions.

FIG. 4 conceptually shows color conversion by applying the pre-conversion process of the invention to two-dimensional image data. In this example, the image data is two-dimensional image data expressed by a combination of a tone value Rx and a tone value of Gx. The image data is expressible as a coordinate point on a two-dimensional color space (color plane) defined by axes R and G. Four lattice points in the vicinity of the coordinate point include a lattice point P1 (R1,G1), a lattice point P2 (R2,G1), a lattice point P3 (R1,G2), and a lattice point P4 (R2,G2). Namely in the neighborhood of the coordinate point corresponding to the image data, the R axis is divided by the tone values R1 and R2, whereas the G axis is divided by the tone values G1 and G2.

The processing is carried out individually with regard to each dimension of the multi-dimensional image data. The R component of the image data (a tone value Rx) is allocated to either the tone value R1 or the tone value R2. In the example of FIG. 4, the tone value Rx is closer to the tone value R1 than the tone value R2. The R component of the first lattice point is thus always allocated to the tone value R1, whereas the R component of the second lattice point is allocated to either the tone value R1 or the tone value R2. The G component of the image data (a tone value Gx) is closer to the tone value G2 than the tone value G1 in the example of FIG. 4. The G component of the second lattice point is thus always allocated to the tone value G2, whereas the G component of the first lattice point is allocated to either the tone value G1 or the tone value G2.

Figures 4A, 4B:
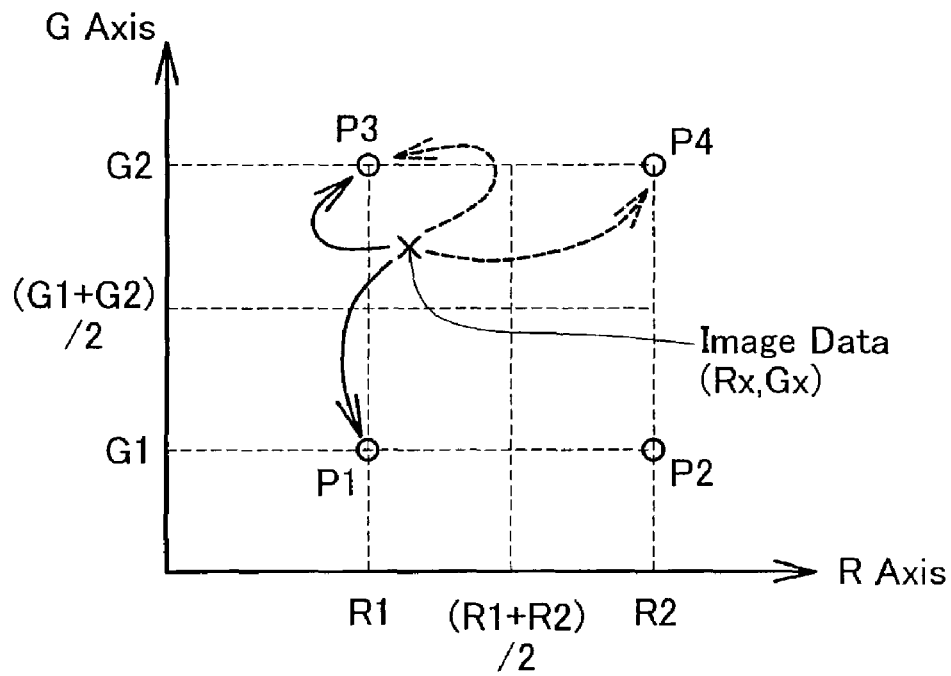
FIG. 4 conceptually shows one method of applying the principle of the invention to two-dimensional image data.

FIG. 4(a) schematically shows allocation of image data to the peripheral lattice points as the first lattice point and the second lattice point. The R component of the first lattice point is always set equal to the tone value R1, while the G component of the first lattice point is set equal to either the tone value G1 or the tone value G2. The first lattice point is accordingly allocated to either the lattice point P1 or the lattice point P3. The arrows of solid line extending from the symbol 'x' representing the coordinate point of the image data to the lattice points P1 and P3 in FIG. 4(a) schematically show allocation of the first lattice point to either one of the lattice points P1 and P3. The G component of the second lattice point is always set equal to the tone value G2, while the R component of the second lattice point is set equal to either the tone value R1 or the tone value R2. The second lattice point is accordingly allocated to either the lattice point P3 or the lattice point P4. The arrows of broken line extending from the symbol 'x' representing the coordinate point of the image data to the lattice points P3 and P4 in FIG. 4(a) schematically show allocation of the second lattice point to either one of the lattice points P3 and P4.

FIG. 4(b) shows the resulting tone values of the color-converted image data calculated from the tone values stored at the first lattice point and the second lattice point allocated as discussed above. With regard to the C (cyan) color component, tone values C1, C2, C3, and C4 are stored at the lattice points P1, P2, P3, and P4 in the LUT. As shown in the upper-most row of FIG. 4(b), in the case of allocation of the first lattice point and the second lattice point respectively to the lattice point P1 and the lattice point P3, the tone value C1 is read from the first lattice point and the tone value C3 is read from the second lattice point. The resulting tone value of the color-converted image data is the arithmetic mean of these tone values, that is, a tone value (C1+C3)/2. This calculated tone value is substantially equivalent to the tone value obtained by color conversion of image data at the midpoint between the lattice points P1 and P3. In the case of allocation of the multi-dimensional image data to the two lattice points, the simple arithmetic mean is not restrictive at all. The tone value of the color-converted image data may be equal to an internally dividing point of the obtained tone values, the tone values C1 and C3 in this example, at an arbitrary ratio or at a predetermined ratio according to the distances between the coordinate point of the image data and the lattice points P1 and P3.

As shown in the second upper row of FIG. 4(b), in the case of allocation of the first lattice point and the second lattice point respectively to the lattice point P1 and the lattice point P4, the tone value C1 is read from the first lattice point and the tone value C4 is read from the second lattice point. The resulting tone value of the color-converted image data is the arithmetic mean of these tone values, that is, a tone value (C1+C4)/2. This calculated tone value is substantially equivalent to the tone value obtained by color conversion of image data at the midpoint between the lattice points P1 and P4. As shown in the second lower row of FIG. 4(b), in the case of allocation of both the first lattice point and the second lattice point to the lattice point P3, the resulting tone value of the color-converted image data is equal to the tone value C3. As shown in the lower-most row of FIG. 4(b), in the case of allocation of the first lattice point and the second lattice point respectively to the lattice point P3 and the lattice point P4, the resulting tone value of the color-converted image data is equal to a tone value (C3+C4)/2. This calculated tone value is substantially equivalent to the tone value obtained by color conversion of image data at the midpoint between the lattice points P3 and P4.

The allocation of one image data to multiple (two in the above example) lattice points significantly reduces the pre-conversion error in the process of color conversion. In the example of FIG. 4, the pre-conversion process of the present invention allocates the image data to one of the following coordinate points: (1) the coordinate point in the vicinity of the midpoint between the lattice points P1 and P3; (2) the coordinate point in the vicinity of the midpoint between the lattice points P1 and P4; (3) the lattice point P3; and (4) the coordinate point in the vicinity of the midpoint between the lattice points P3 and P4. The prior art pre-conversion technique, on the other hand, allocates the image data to one of the lattice points P1, P2, P3, and P4. Compared with the procedure of simply allocating the image data to one of these lattice points, the arrangement of allocating the image data to one of the lattice point close to the image data and the coordinate points in the vicinity of the midpoints between the respective pairs of the lattice points remarkably reduces the pre-conversion error. Such effects are also exerted in the case of internally dividing the two lattice points at an arbitrary ratio or at a predetermined ratio. As clearly understood from the above description, allocation of the image data to multiple (two in the above example) lattice points significantly reduces the pre-conversion error.

Figures 5A, 5B:
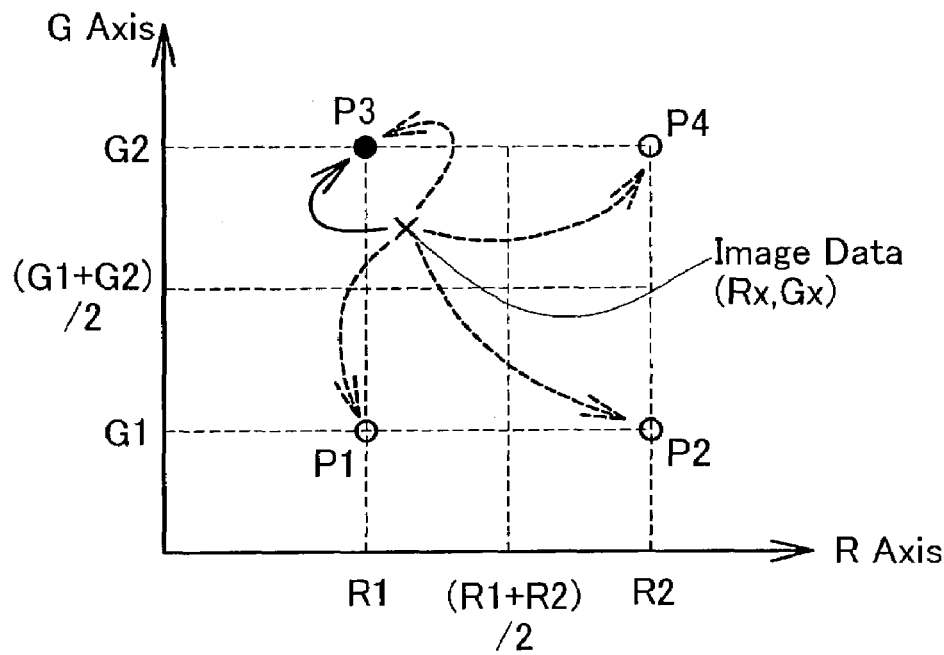
FIG. 5 conceptually shows another method of applying the principle of the invention to two-dimensional image data.

Prior to description of individual embodiments of the present invention, possible modification in expansion of the invention to the multiple dimensions is described briefly. FIG. 5 shows expansion of the present invention to multiple dimensions in a modified example. The R component of the image data is closer to the tone value R1 than the tone value R2. The R component of at least one of the first lattice point and the second lattice point is accordingly set equal to the tone value R1. The G component of the image data is closer to the tone value G2 than the tone value G1. The G component of at least one of the first lattice point and the second lattice point is accordingly set equal to the tone value G2. In the case of combining these settings for the expansion to the two dimensions, the procedure of the modified example specifies a lattice point having defined tone values of the respective components as the first lattice point and a lattice point having undefined tone values of the respective components as the second lattice point. The tone value R1 of the R component and the tone value G2 of the G component are defined. The first lattice point is accordingly allocated to the lattice point P3 having the coordinate values (R1,G2), which are the combination of the defined tone values of the respective components. The arrow of solid line extending from the symbol 'x' representing the coordinate point of the image data to the lattice point P3 in FIG. 5(a) schematically shows allocation of the first lattice point to the lattice point P3.

The second lattice point is, on the other hand, allocated to a lattice point specified by a combination of undefined tone values of the respective components. The tone value of the R component is undefined to be either of the tone values R1 and R2, and the tone value of the G component is undefined to be either of the tone values G1 and G2. The second lattice point is accordingly allocated to one of the lattice points P1, P2, P3, and P4, which are the combinations of these undefined tone values of the respective components. The arrows of broken line extending from the symbol 'x' representing the coordinate point of the image data to the lattice points P1, P2, P3, and P4 in FIG. 5(a) schematically show allocation of the second lattice point to one of these lattice points P1, P2, P3, and P4.

FIG. 5(b) shows the resulting tone values of the color-converted image data in the respective combinations of the first lattice point and the second lattice point. In the example of FIG. 5(b), the tone value of the color-converted image data is calculated as the arithmetic mean. This modified procedure is applicable for the expansion of the present invention to the multiple dimensions. As clearly shown by the comparison between FIG. 4(b) and FIG. 5(b), these two methods are practically similar to each other with some difference.

The following describes several embodiments, to which the principle of the invention described above is applied simultaneously with the quick image processing to reduce the pre-conversion error and ensure quick display of a high-quality image.

C. First Embodiment

C-1. Construction of System

Figure 6:
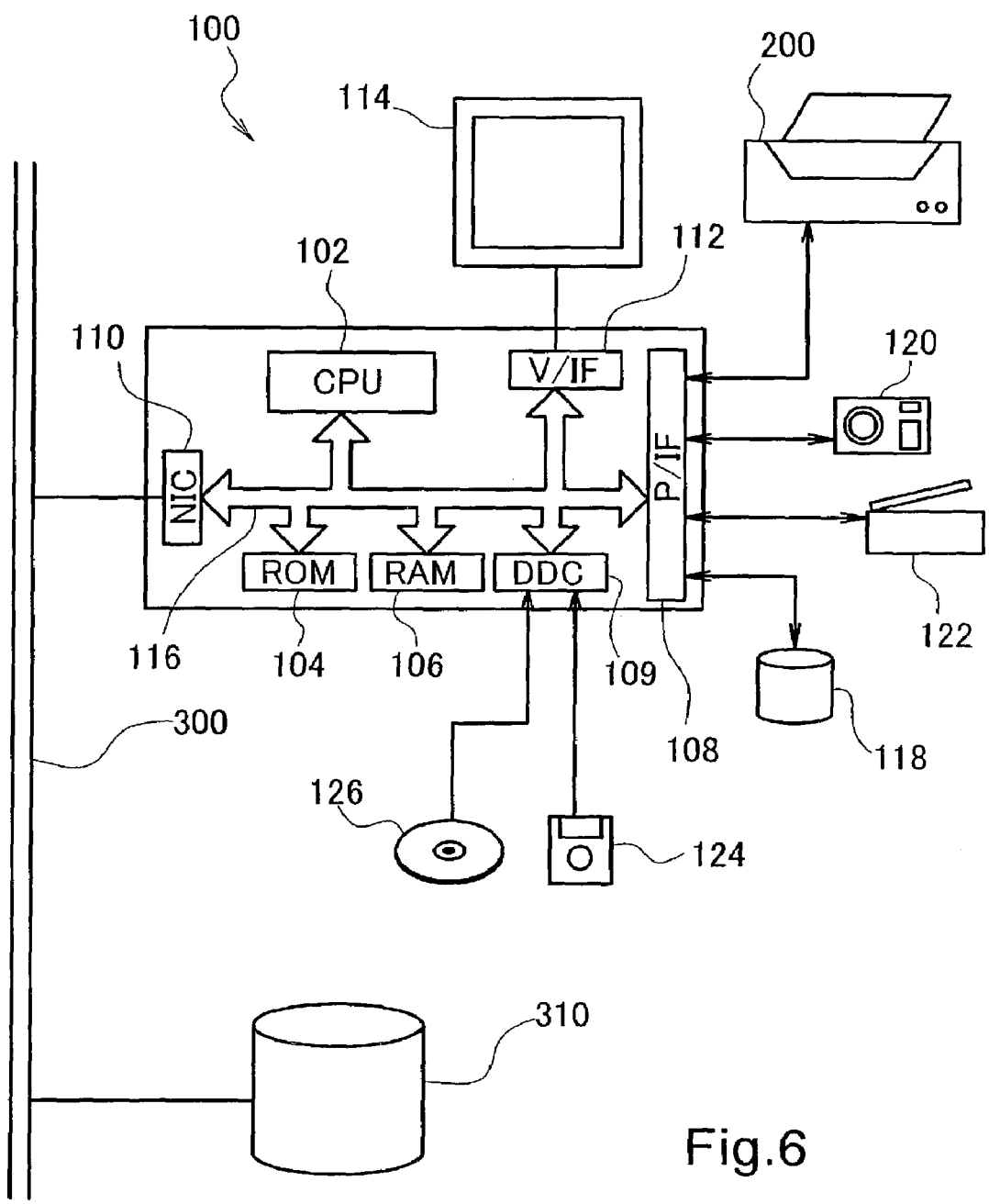
FIG. 6 schematically illustrates the construction of a computer used as an image processing apparatus in a printing system of an embodiment according to the invention.

FIG. 6 schematically illustrates the construction of a computer 100 as an image processing apparatus of a first embodiment according to the present invention. The computer 100 corresponds to the computer 10 shown in FIG. 1 and is constructed as a known computer including a CPU 102, a ROM 104, and a RAM 106, which are mutually connected via a bus 116.

The computer 100 also includes a disk controller DDC 109 for reading data from a flexible disk 124 or a compact disc 126, a peripheral equipment interface P/IF 112 for transmission of data to and from peripheral equipment, and a video interface V/IF 112 for actuating a CRT 114. A color printer 200 (discussed later), which corresponds to the color printer 20 shown in FIG. 1, and a hard disk 118 are linked with the P/IF 108. Connection of a digital camera 120 or a color scanner 122 to the P/IF 108 enables images transmitted from the digital camera 120 and those read by the color scanner 122 to be printed. Attachment of a network interface card NIC 110 connects the computer 100 with a communication line 300 to fetch data stored in a storage device 310 connected to the communication line 300.

Figure 7:
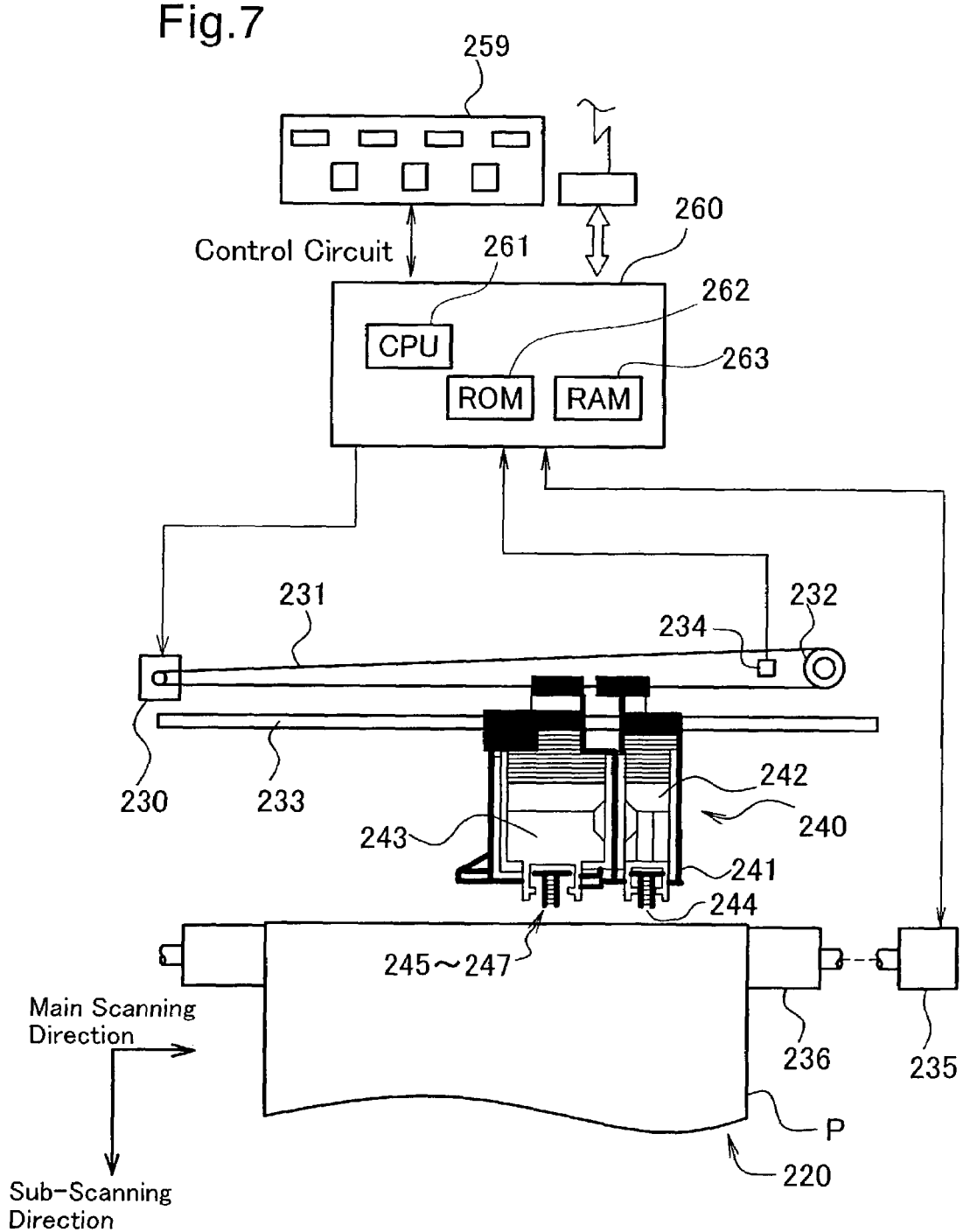
FIG. 7 schematically illustrates the structure of a color printer used as a printing apparatus in the printing system of the embodiment.

FIG. 7 schematically illustrates the structure of the color printer 200 of the embodiment. The color printer 200 is an ink jet printer that creates dots of four color inks, that is, cyan, magenta, yellow, and black. The ink jet printer may create ink dots of six color inks, that is, light cyan ink having the lower cyan dye density and light magenta ink having the lower magenta dye density in addition to the above four color inks. In the description below, the cyan ink, the magenta ink, the yellow ink, the black ink, the light cyan ink, and the light magenta ink may respectively be referred to as the C ink, the M ink, the Y ink, the K ink, the LC ink, and the LM ink.

The color printer 200 has a mechanism of actuating a print head 241 mounted on a carriage 240 to implement ink ejection and dot creation, a mechanism of driving a carriage motor 230 to move the carriage 240 back and forth along an axis of a platen 236, a mechanism of driving a sheet feed motor 235 to feed a sheet of printing paper P, and a control circuit 260 that controls the dot creation, the movement of the carriage 240, and the feed of the printing paper P.

An ink cartridge 242 where the K ink is kept and an ink cartridge 243 where the C ink, the M ink, and the Y ink are kept are attached to the carriage 240. Attachment of the ink cartridges 242 and 243 to the carriage 240 causes the respective color inks in the ink cartridges 242 and 243 to be led to ink ejection heads 244 through 247 of the respective colors disposed below the print head 241 via ink conduits (not shown) and to be ejected from the corresponding ink ejection heads 244 through 247 in the form of ink droplets.

The control circuit 260 includes a CPU 261, a ROM 262, and a RAM 263. The control circuit 260 controls the operations of the carriage motor 230 and the sheet feed motor 235 to regulate main scans and sub-scans of the carriage 240 and to make ink droplets ejected from respective nozzles at adequate timings based on the print data supplied from the computer 100. Under the control of the control circuit 260, ink dots of the respective colors are created at adequate positions on the printing paper P. The color printer 200 prints color images based on this principle.

A diversity of methods are applicable for the ejection of ink droplets from the ink ejection heads of the respective colors. One applicable method uses piezoelectric elements for ink ejection. Another applicable method uses a heater located in each ink conduit to generate bubbles in the ink conduit for ejection of ink droplets. The color printer 200 is not restricted to the ink jet printer, but may be a printer that utilizes heat transfer to create ink dots on the printing paper or a printer that utilizes static electricity to make toner powder of each color adhere to a printing medium.

The color printer 200 may be a variable dot printer that regulates the size of the ejected ink droplets or regulates the number of ink droplets ejected at once, so as to adjust the size of ink dots created on the printing paper.

Figure 8:
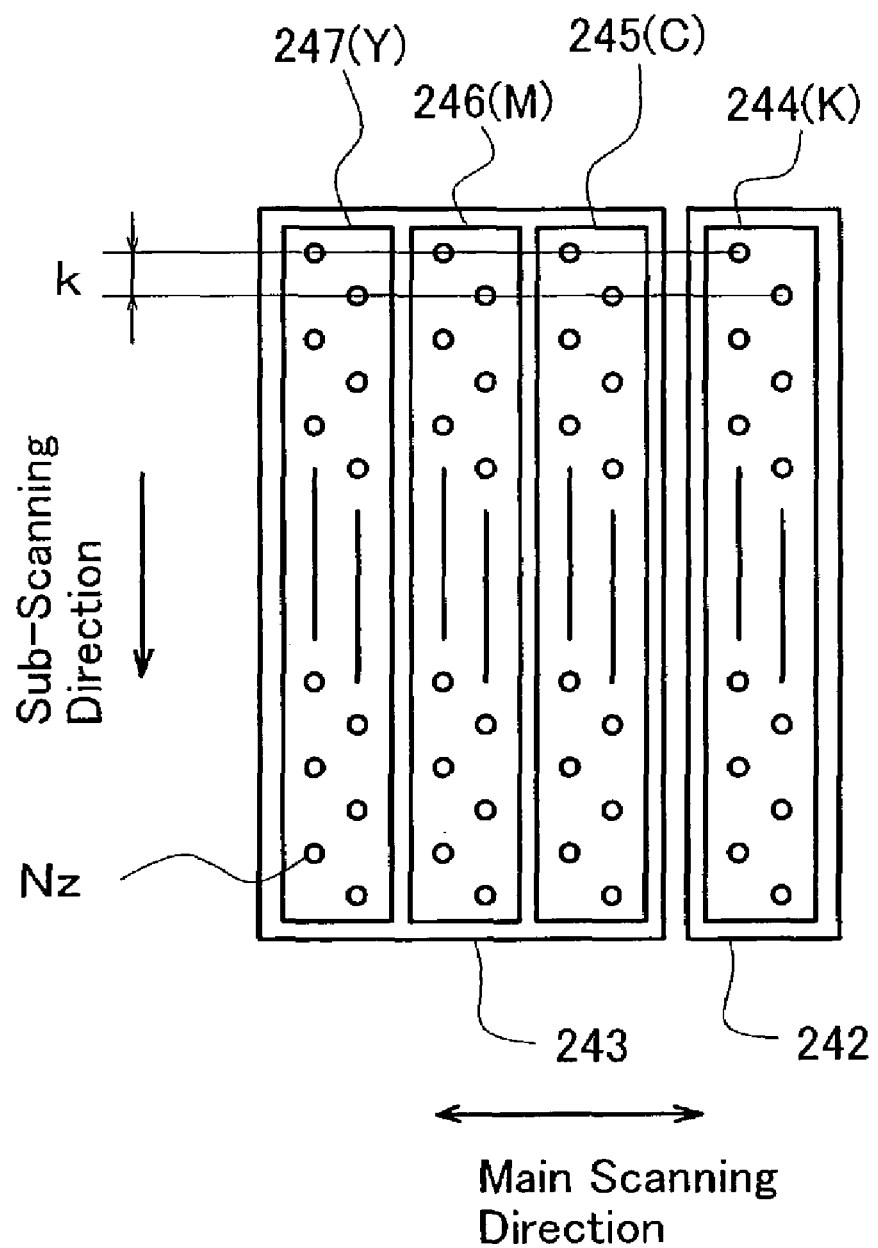
FIG. 8 shows an arrangement of ink jet nozzles Nz in the color printer of the embodiment.

FIG. 8 shows an arrangement of ink jet nozzles Nz on the ink ejection heads 244 through 247. As illustrated, there are four nozzle arrays formed on the bottom of the respective ink ejection heads 244 through 247 for ejection of ink droplets of the respective color inks. Each nozzle array includes multiple nozzles Nz at a fixed nozzle pitch k in a zigzag configuration. The zigzag configuration of the nozzles Nz desirably facilitates the setting of a small value to the nozzle pitch k, although the nozzles may be arranged in alignment.

In the color printer 200 of the hardware construction discussed above, the carriage motor 230 is driven to move the ink ejection heads 244 through 247 of the respective color inks relative to the printing paper P in a main scanning direction, while the sheet feed motor 235 is driven to move the printing paper P in a sub-scanning direction. The control circuit 260 repeats the main scans and sub-scans of the carriage 240 according to the print data and actuates the nozzles at adequate timings for ejection of ink droplets. The color printer 200 accordingly prints a color image on the printing paper P.

C-2. Outline of Image Processing

Figure 9:
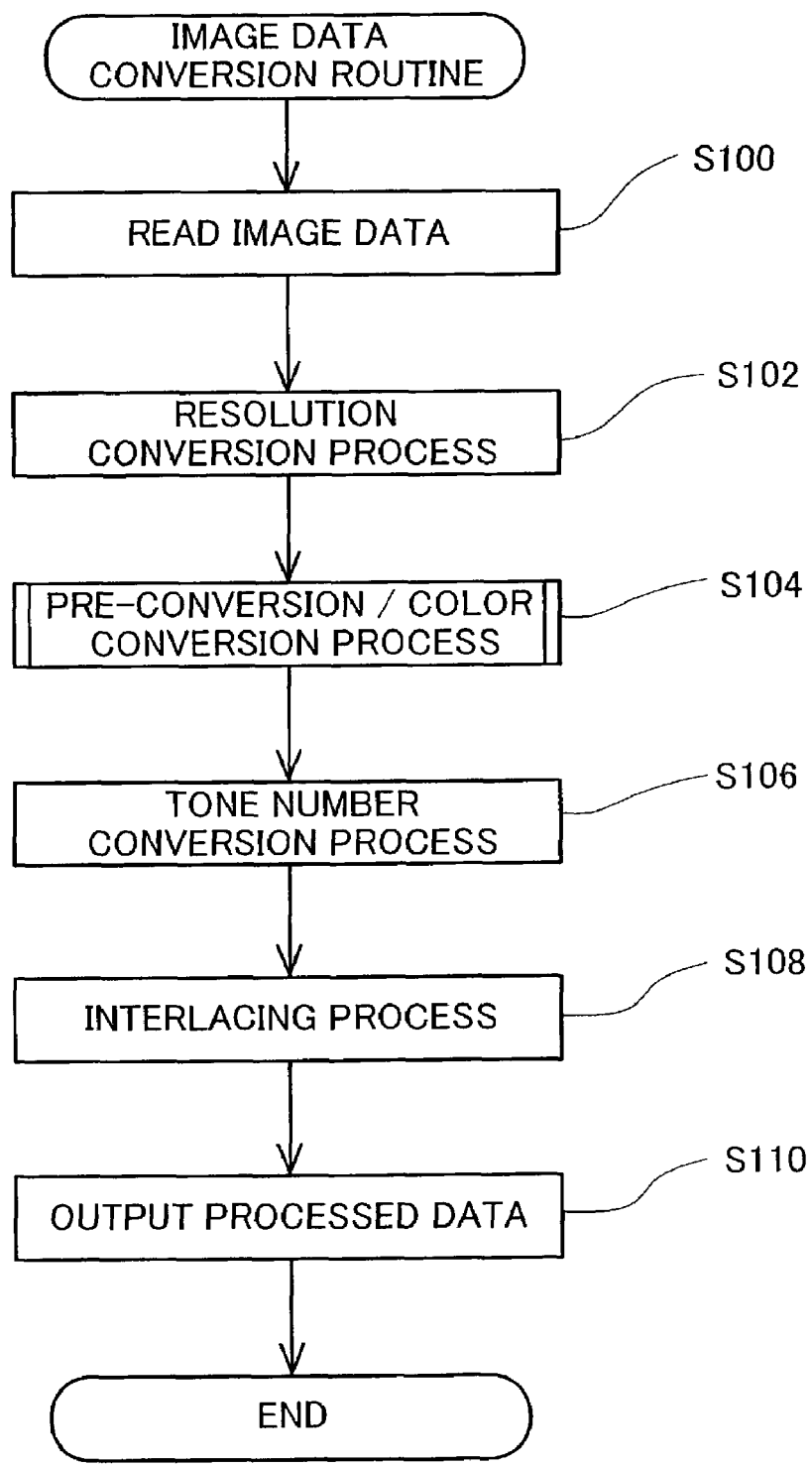
FIG. 9 is a flowchart showing a processing routine of converting image data into print data, which is executed in the image processing apparatus of the embodiment.

FIG. 9 is a flowchart showing a preset series of image processing to convert input image data into print data, which is executed in the computer 100 as the image processing apparatus of the embodiment. This processing routine starts when the operating system of the computer 100 activates the printer driver 12 (see FIG. 1). The image data conversion routine of the embodiment is briefly described with reference to the flowchart of FIG. 9.

When the program enters the image data conversion routine, the printer driver 12 first reads target RGB color image data, which is the object of data conversion (step S100), and converts the resolution of the input color image data into a printing resolution suitable for printing by the color printer 200 (step S102). When the resolution of the input color image data is lower than the printing resolution, linear interpolation is carried out to generate new data between the adjacent existing image data and thereby convert the resolution of the image data into the printing resolution. When the resolution of the input color image data is higher than the printing resolution, on the other hand, the existing data are skipped at a predetermined rate for conversion of the resolution of the image data into the printing resolution.

Subsequent to the resolution conversion process, the printer driver 12 carries out a pre-conversion/color conversion process (step S104). The procedure of step S104 makes the target RGB image data having the converted printing resolution subjected to the pre-conversion process discussed previously and a subsequent color conversion process (discussed later), so as to convert the RGB image data into CMY image data expressed by tone values of the C, M, and Y colors. The pre-conversion process converts the image data having the printing resolution converted by the resolution conversion process into data of the lattice points in the LUT (color conversion table). The conversion of the image data into the data of the lattice points causes pre-conversion errors. The pre-conversion process of the embodiment, however, carries out the conversion of the image data into the data of the lattice points in such a manner that the pre-conversion errors are mutually cancelled to make the total error in a predetermined range of the image not greater than an allowable value. The pre-conversion process of the embodiment converts one image data into data of multiple lattice points and thereby significantly reduces the level of each pre-conversion error. The details of the pre-conversion process will be discussed later.

The image data converted into the data of the lattice points in the LUT by the pre-conversion process are then subjected to the color conversion process. The color conversion process converts the color image data expressed by a combination of the tone values of the colors R, G, and B into image data expressed by a combination of the tone values of the colors used in the color printer 200, for example, C, M, Y, and K. The color conversion process has extreme non-linearity and is thus implemented with reference to the LUT (color conversion table). In the case of color conversion of non-existing image data in the LUT, the conventional method carries out interpolation to specify color-converted image data based on the existing data in the LUT. In the procedure of the embodiment, however, the image data have already been converted into the data of the lattice points in the LUT in the pre-conversion process. The color conversion process of the embodiment is thus required to simply read the data stored at the lattice points. This arrangement ensures the extremely high-speed color conversion. The pre-conversion process of the embodiment converts one image data into data of multiple lattice points. The color conversion process of the embodiment accordingly reads the data of the multiple lattice points and calculates color-converted image data based on the data of the multiple lattice points. Both the process of reading the data stored at the lattice points and the process of calculating the color-converted image data based on the read data are implemented quickly. Compared with the conventional interpolation method, the color conversion process of the embodiment implements the processing at an extremely higher speed. The details of the color conversion process of the embodiment will be discussed later.

The printer driver 12 carries out a tone number conversion process subsequent to the color conversion process (step S106). The RGB image data have been converted to the tone data of the C, M, Y, and K colors by the color conversion process. The tone data of each color has a range of 256 tones, that is, from a tone value 0 to a tone value 255. The color printer 200 of the embodiment is, however, capable of taking only either one of the two states 'dot creation state' and 'dot non-creation state'. It is accordingly required to convert the tone data of each color having the range of 256 tones into image data of 2 tones expressible by the color printer 200. Such conversion of the tone number is called the tone number conversion process.

After the tone number conversion process, the printer driver 12 carries out an interlacing process (step S108). The interlacing process rearranges the image data of 2 tones corresponding to the dot creation state and the dot non-creation state in a specific order to be transferred to the color printer 200 by taking into account the order of dot creation. The printer driver 12 outputs the resulting image data, which have undergone the interlacing process, as print data to the color printer 200 (step S110). The color printer 200 creates ink dots of the respective colors on a printing medium according to the print data, thus printing a color image corresponding to the image data on the printing medium.

C-3. Pre-Conversion/Color Conversion Process of First Embodiment

Figure 10:
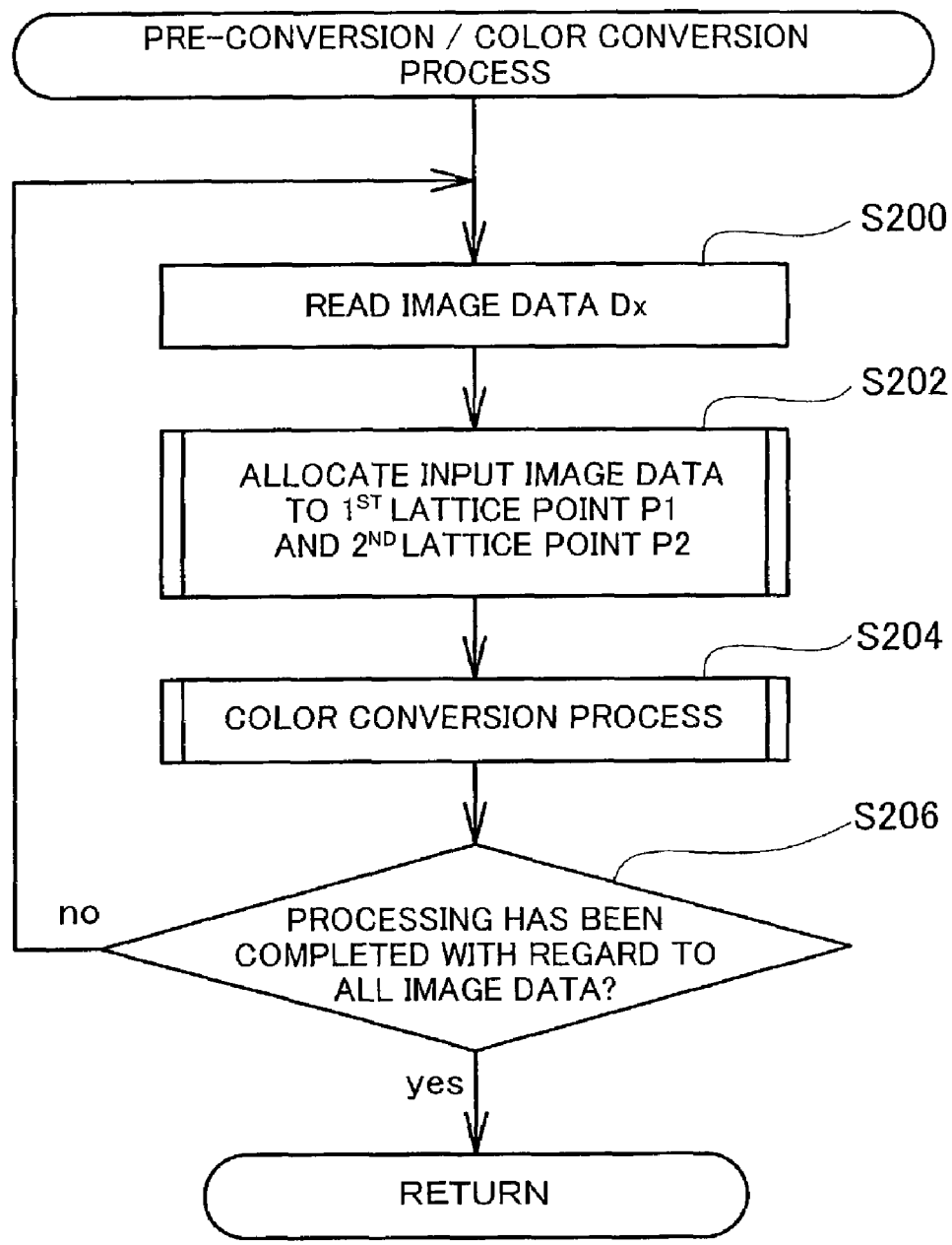
FIG. 10 is a flowchart showing a processing routine of pre-conversion/color conversion process in a first embodiment.

The following describes the pre-conversion/color conversion process of the first embodiment, which is part of the image data conversion routine. FIG. 10 is a flowchart showing the pre-conversion/color conversion process of the first embodiment. This routine is executed by the printer driver 12 that utilizes the functions of the CPU 102 in the computer 100.

When the program enters the pre-conversion/color conversion process, the printer driver 12 first reads image data Dx of one target pixel, which is the object of the processing (step S200). This image data Dx is the RGB image data having the printing resolution converted by the resolution conversion process in the image data conversion routine of FIG. 9.

The printer driver 12 then allocates the input image data to the first lattice point and the second lattice point (step S202). In the specification hereof, the 'pre-conversion process' may be referred to as the process of allocating the image data to the lattice points. The number of the lattice points, to which the image data is allocated, is not restricted to 2, but the image data may be allocated to a greater number of lattice points. The details of the pre-conversion process will be discussed later with reference to other drawings. The details of the process of allocating the image data into a greater number of lattice points will also be discussed later as a modified example.

After allocation of the image data to the first lattice point and the second lattice point, the procedure reads the tone values of the C, M, and Y colors stored at the first lattice point and the second lattice point in the LUT, thereby implementing color conversion of the RGB image data into the CMY image data (step S204). The details of this process will be discussed later.

It is then determined whether or not the processing has been completed with regard to all the input RGB image data (step S206). When there is any non-converted RGB image data, the program returns to step S200 to carry out the series of processing. When all the RGB image data have been converted to the CMY image data, the program exits from the pre-conversion/color conversion process shown in the flowchart of FIG. 10 and returns to the image data conversion routine shown in the flowchart of FIG. 9.

C-4. Pre-Conversion Process

Figure 11:
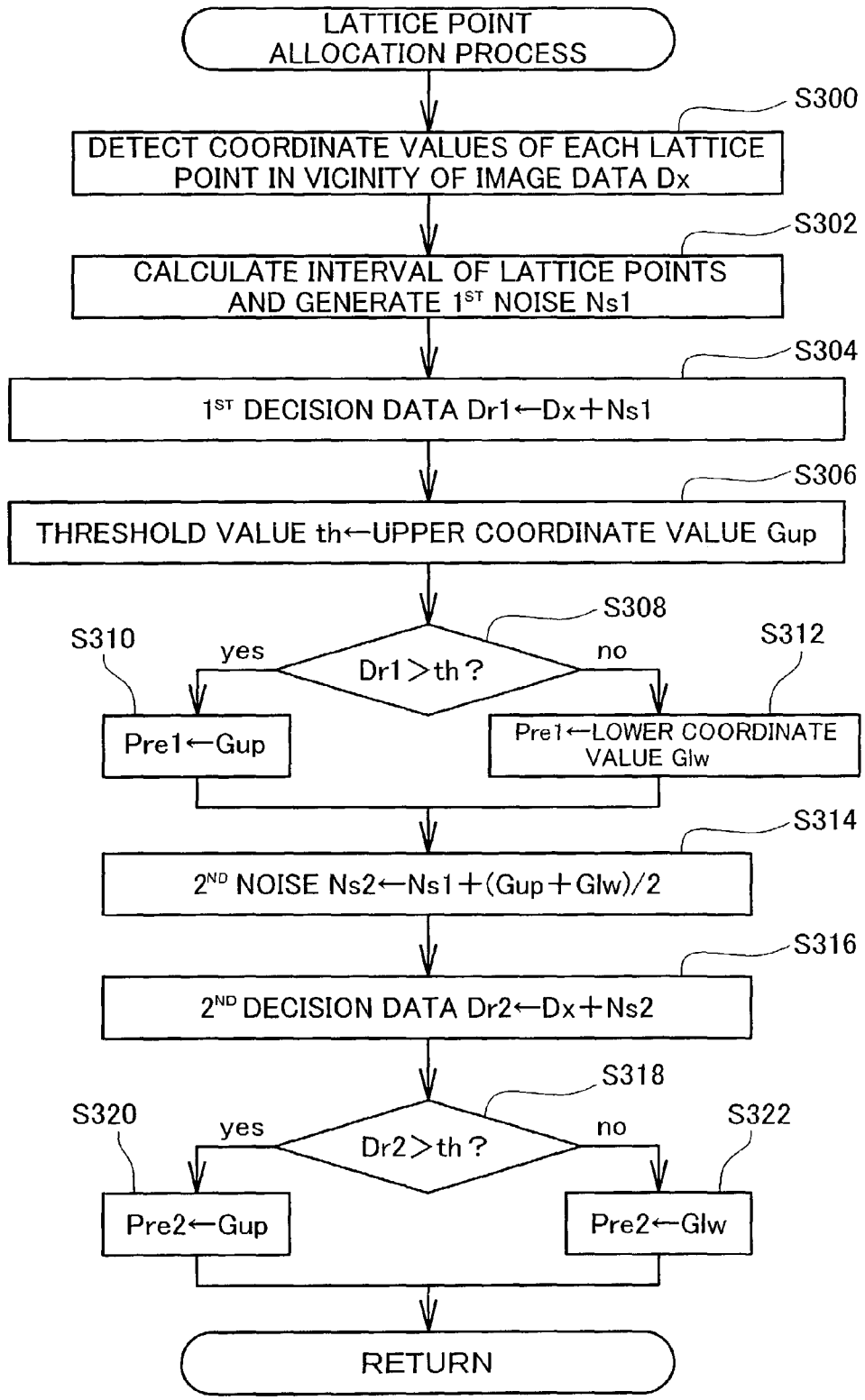
FIG. 11 is a flowchart showing a processing routine of allocating image data to lattice points, which is executed in the pre-conversion/color conversion process of the first embodiment.

FIG. 11 is a flowchart showing the process of allocating the image data to the lattice points (the pre-conversion process) in the pre-conversion/color conversion process. The processing at step S202 in the flowchart of FIG. 10 is described in detail with reference to the flowchart of FIG. 11.

Figure 12:
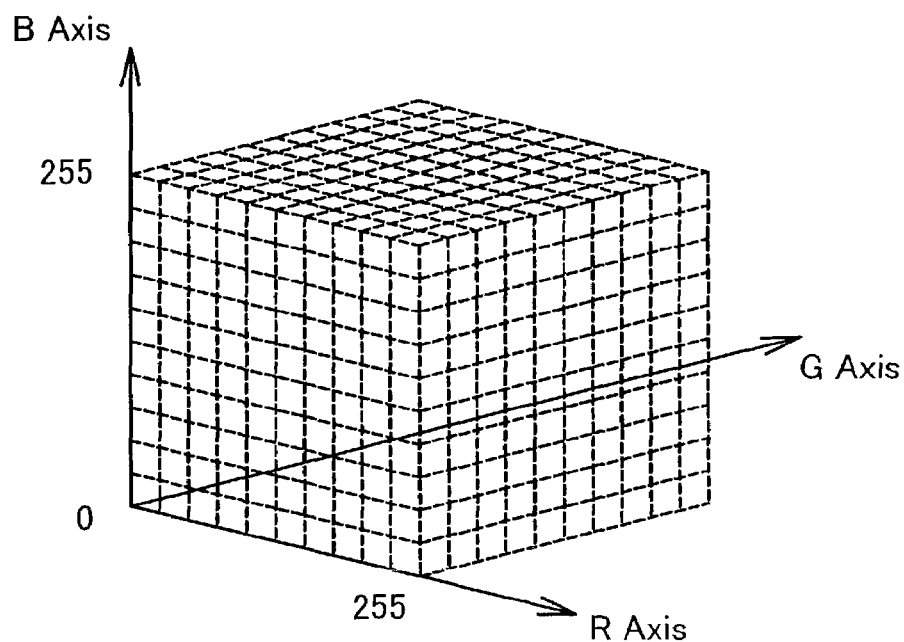
FIG. 12 shows a color conversion table.

When the program enters the pre-conversion process, the printer driver 12 first detects the coordinate values of each lattice point in the vicinity of target image data Dx on the color space (step S300). FIG. 12 shows division of the color space into multiple small cubes or rectangular parallelepipeds by separation of the R, G, and B axes by multiple coordinate values. The LUT (color conversion table) is a numerical table including the tone values of the C, M, and Y colors mapped to the coordinate values of the lattice points and stored at the respective lattice points obtained by such division of the color space. A coordinate point corresponding to the input target RGB image data Dx is included in one of the multiple rectangular parallelepipeds in the RGB color space.

Figure 13:
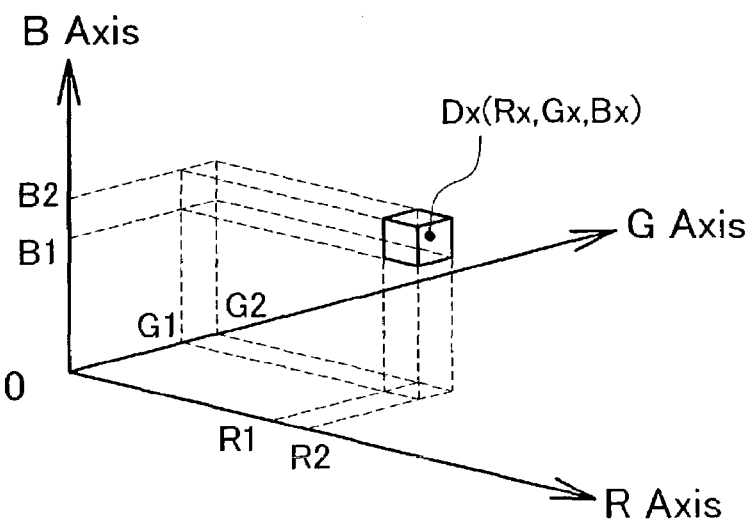
FIG. 13 shows a process of specifying a lattice point, which includes a coordinate point corresponding to image data, among lattice points constituting the color conversion table.

FIG. 13 shows a coordinate point corresponding to the target image data Dx included in one specific rectangular parallelepiped. In the illustrated example, the specific rectangular parallelepiped is defined by dividing the RGB color space by tone values R1 and R2 on the axis R, by tone values G1 and G2 on the axis G, and by tone values B1 an B2 on the axis B. With regard to the axis R, the target image data Dx is included in the range of the tone values R1 and R2. With regard to the axis G, the target image data Dx is included in the range of the tone values G1 and G2. With regard to the axis B, the target image data Dx is included in the range of the tone values B1 and B2. In the flowchart of FIG. 11, the processing of step S300 detects the coordinate values of the respective color components at the lattice points including the image data Dx (that is, the coordinate values of the adjoining lattice points on both sides of the target image data Dx with regard to each color component). The following description mainly regards the R component, since the respective color components R, G, and B are subjected to practically the same series of processing.

After detecting the coordinate values including the target image data Dx (that is, the coordinate values of the adjoining lattice points on both sides of the target image data Dx) with regard to each component, the program calculates the interval of the coordinate values and generates a first noise Ns1 (step S302). This processing is discussed with an example of the component R. As shown in FIG. 13, with regard to the component R, the target image data Dx is included in the range of the tone values R1 and R2, and the interval of the coordinate values is equal to a tone value (R2−R1). The generated first noise Ns1 has an amplitude that is half the interval of the coordinate values. The first noise Ns1 may be generated by any of diverse methods, and is calculated according to the following equation including a random digit in this embodiment:

$$Ns1=(R2-R1)\cdot RD[0,1]/2$$

where RD[0,1] represents a function of generating a random digit in a division [0,1]. The first noise Ns1 is calculated with regard to each of the R, G, and B color components, while the random digit generated by the function RD[0,1] may be an identical value for all the components R, G, and B.

In the case where the rectangular parallelepiped including the coordinate point of the target image data is a cube, the respective components have an identical interval of the coordinate values. The first noise Ns1 may thus have an identical setting for all the components R, G, and B. Sharing the identical random digit and the identical setting of the first noise Ns1 desirably reduces the total processing time.

After generation of the first noise Ns1, the program adds the first noise Ns1 to each component of the image data Dx to calculate first decision data Dr1 with regard to each component (step S304). For example, the procedure adds the first noise Ns1 of the component R generated at step S302 to the R component Rx of the target image data Dx, so as to calculate the first decision data Dr1 of the component R.

The program subsequently sets an upper coordinate value Gup (the coordinate value corresponding to the greater tone value between the coordinate values of the adjoining lattice points on both sides of the target image data Dx) to a threshold value th (step S306), and compares the calculated first decision data Dr1 with the setting of the threshold value th with regard to each component (step S308). When the first decision data Dr1 is greater than the threshold value th (in the case of an affirmative answer at step S308) with regard to a certain component, the upper coordinate value Gup is set to a coordinate value Pre1 of the first lattice point with regard to the certain component (step S310). When the first decision data Dr1 is smaller than the threshold value th (in the case of a negative answer at step S308), on the other hand, a lower coordinate value Glw (the coordinate value corresponding to the smaller tone value between the coordinate values of the adjoining lattice points on both sides of the target image data Dx) is set to the coordinate value Pre1 of the first lattice point with regard to the certain component (step S312). An example of the processing to set the coordinate value of the R component of the first lattice point is discussed in detail with reference to FIGS. 14 and 15.

Figure 14A:
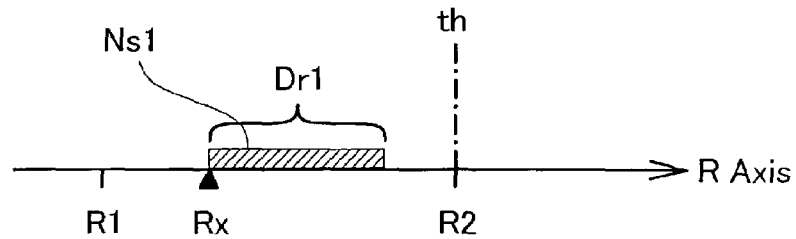
FIG. 14 shows settings of a first lattice point and a second lattice point in the pre-conversion process of the first embodiment.

FIG. 14(a) shows a process of setting the tone value of the first lattice point with regard to the component R. The symbol 'closed triangle' represents the position of the R component Rx of the image data Dx. The upper coordinate value Gup and the lower coordinate value Glw adjoining to the image data Dx are respectively equal to the tone value R2 and the tone value R1. The first noise Ns1 takes an arbitrary tone value in the range from the tone value '0' to the tone value (R2−R1)/2. The first decision data Dr1 obtained by adding the first noise Ns1 to the R component Rx of the image data Dx accordingly takes an arbitrary value in a hatched range shown in FIG. 14(a). The threshold value th is set equal to the tone value R2.

Figure 14B:
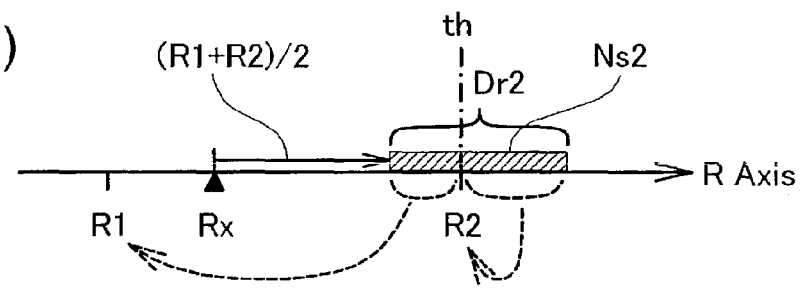

When the R component Rx of the image data Dx is smaller than the mean value of the two adjoining coordinate values R1 and R2 as shown in FIG. 14(a), the first decision data Dr1 does not exceed the threshold value th. In such cases, the lower coordinate value Glw (the tone value R1) is always set to the R component of the first lattice point. The arrow of broken line extending from the hatched range to the coordinate value R1 in FIG. 14(b) schematically shows the fixed setting of the tone value R1 to the R component of the first lattice point, regardless of the setting of the first decision data Dr1. When the R component Rx of the image data Dx is greater than the mean value of the two adjoining coordinate values R1 and R2, on the other hand, either one of the upper coordinate value Gup and the lower coordinate value Glw is set to the R component of the first lattice point. This case is described with reference to FIG. 15(a).

Figure 15A:
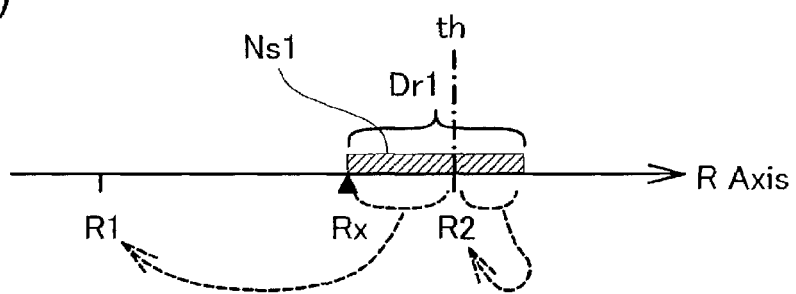
FIG. 15 shows settings of the first lattice point and the second lattice point in the pre-conversion process of the first embodiment.
Figure 15B:
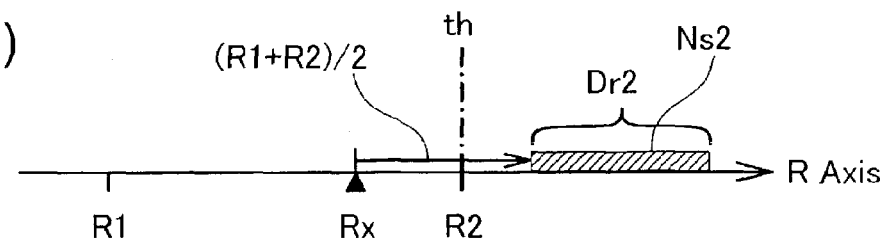

FIG. 15(a) shows a process of setting the R component of the first lattice point when the R component Rx of the target image data Dx is greater than the mean value of the two adjoining coordinate values R1 and R2. The first decision data Dr1 obtained by adding the first noise Ns1 to the R component Rx of the image data Dx takes an arbitrary value in a hatched range of FIG. 15(a). As described previously, the first noise Ns1 takes an arbitrary value in the range from the tone value '0' to the tone value (R2−R1)/2. The first decision data Dr1 obtained by adding the first noise Ns1 to the R component Rx of the image data Dx may thus be greater than or smaller than the threshold value th. In the case where the first decision data Dr1 is smaller than the threshold value th, the lower coordinate value Glw (the tone value R1) is set to the R component of the first lattice point. In the case where the first decision data Dr1 is greater than the threshold value th, on the other hand, the upper coordinate value Gup (the tone value R2) is set to the R component of the first lattice point. The arrow of broken line extending from a left side of the threshold value th in the hatched range toward the coordinate value R1 in FIG. 15(a) schematically shows setting of the tone value R1 to the R component of the first lattice point, when the first decision data Dr1 is smaller than the threshold value th. The arrow of broken line extending from a right side of the threshold value th in the hatched range toward the coordinate value R2 in FIG. 15(a) schematically shows setting of the tone value R2 to the R component of the first lattice point, when the first decision data Dr1 is greater than the threshold value th. The processing of steps S308 through S312 in the flowchart of FIG. 11 sets the tone values of the respective components of the first lattice point in this manner, thereby selecting the first lattice point.

After selection of the first lattice point according to the above procedure, the program carries out selection of the second lattice point. The process of selecting the second lattice point first calculate a second noise Ns2 (step S314 in the flowchart of FIG. 11). The second noise Ns2 is the sum of the first noise Ns1 and half of the tone difference between the upper coordinate value Gup and the lower coordinate value Glw adjoining to the image data Dx. Like the first noise Ns1, the second noise Ns2 is calculated with regard to each component. In the case where the rectangular parallelepiped including the coordinate point of the target image data is a cube, an identical value may be set to the second noise Ns2 for all the components.

The program adds the second noise Ns2 to each component of the target image data Dx to calculate second decision data Dr2 (step S316) and compares the calculated second decision data Dr2 with the setting of the threshold value th with regard to each component (step S318). When the second decision data Dr2 is greater than the threshold value th (in the case of an affirmative answer at step S318) with regard to a certain component, the upper coordinate value Gup is set to a coordinate value Pre2 of the second lattice point with regard to the certain component (step S320). When the second decision data Dr2 is smaller than the threshold value th (in the case of a negative answer at step S318), on the other hand, the lower coordinate value Glw is set to the coordinate value Pre2 of the second lattice point with regard to the certain component(step S312). An example of the processing to set the coordinate value of the R component of the second lattice point is discussed in detail with reference to FIGS. 14 and 15.

FIG. 14(b) shows a process of setting the coordinate value of the R component of the second lattice point, when the R component Rx of the image data Dx is smaller than the mean value (R1+R2)/2 of the upper coordinate value Gup (=the tone value R2) and the lower coordinate value Glw (=the tone value R1). As in the case of the first lattice point, the threshold value th is set equal to the tone value R2. As mentioned previously, the second noise Ns2 used for setting the coordinate value of the second lattice point is greater than the first noise Ns1 by the mean value (R1+R2)/2 of the tone values R1 and R2. The first noise Ns1 takes an arbitrary value in the hatched range of FIG. 14(a). The second decision data Dr2 obtained by adding the second noise Ns2 to the R component Rx of the image data Dx accordingly takes an arbitrary value in a hatched range of FIG. 14(b).

In the case where the second decision data Dr2 is smaller than the threshold value th, that is, when the second decision data Dr2 is on the left side of the threshold value th in the hatched range of FIG. 14(b), the tone value R1 is set to the R component of the second lattice point. In the case where the second decision data Dr2 is greater than the threshold value th, that is, when the second decision data Dr2 is on the right side of the threshold value th in the hatched range of FIG. 14(b), on the other hand, the tone value R2 is set to the R component of the second lattice point. The arrow of broken line extending from the left side of the threshold value th in the hatched range toward the coordinate value R1 in FIG. 14(b) schematically shows setting of the tone value R1 to the R component of the second lattice point, when the second decision data Dr2 is smaller than the threshold value th.

When the R component Rx of the image data Dx is greater than the mean value (R1+R2)/2 of the tone values R1 and R2 adjoining to the image data Dx, the upper coordinate value Gup is always set to the R component of the second lattice point. The second decision data Dr2 obtained by adding the second noise Ns2 to the R component Rx of the image data Dx takes an arbitrary value in a hatched range of FIG. 15(b), when the R component Rx of the image data Dx is greater than the mean value (R1+R2)/2. As clearly understood from FIG. 15(b), the second decision data Dr2 is always greater than the threshold value th, regardless of the image data Dx. The tone value R2 is thus always set to the R component of the second lattice point.

The above description regards the process of setting the tone value of the second lattice point with regard to the R component. The tone values of the other components G and B are set according to the similar procedure. The processing of steps S318 through S322 in the flowchart of FIG. 11 sets the tone values of the respective components of the second lattice point in this manner, thus selecting the second lattice point.

Figures 16A, 16B:
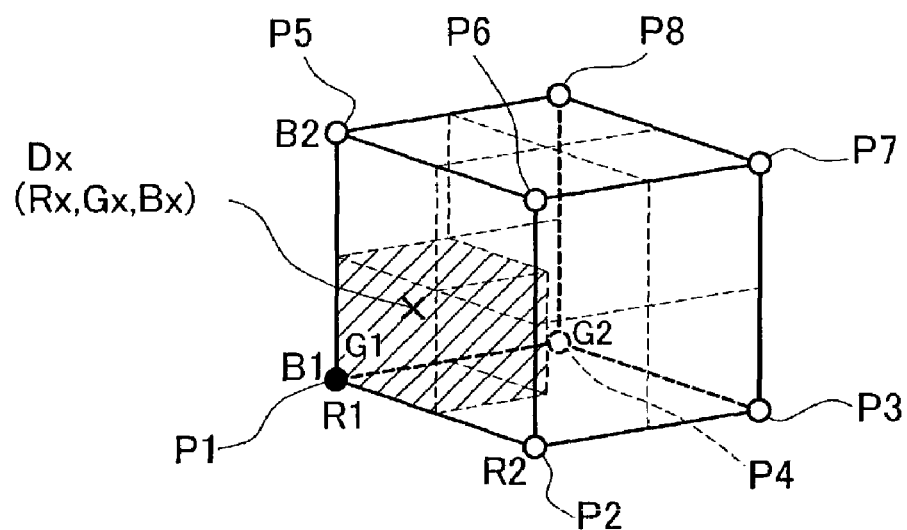
FIG. 16 shows allocation of image data to the first lattice point and the second lattice point according to the coordinate value of the image data in the pre-conversion process of the first embodiment.

Selection of the first lattice point and the second lattice point according to the coordinate values (Rx,Gx,Bx) of the image data Dx is discussed with reference to FIG. 16. FIG. 16 shows allocation of the image data Dx to the first lattice point and the second lattice point when the respective components Rx, Gx, and Bx of the image data Dx are closer to the corresponding lower coordinate values than the corresponding upper coordinate values, that is, when the image data Dx is in a hatched range of FIG. 16(a).

The tone values Rx, Gx, and Bx of the R, G, and B components of the image data Dx are closer to the lower coordinate values R1, G1, and B1, respectively. This case corresponds to the example of FIG. 14. The lower coordinate values R1, G1, and B1 are thus always set to the respective components of the first lattice point, as discussed previously with reference to FIG. 14(a). The respective components of the second lattice point may be set equal to the lower coordinate values R1, G1, and B1 or equal to the upper coordinate values R2, G2, and B2 according to the setting of the second noise Ns2, as discussed previously with reference to FIG. 14(b).

FIG. 16(b) shows the tone values of the respective components in the possible combinations of the first lattice point and the second lattice point. As mentioned above, the tone values R1, G1, and B1 corresponding to the lower coordinate values are set to the R, G, and B components of the first lattice point. Namely a lattice point P1 (R1,G1,B1) is allocated to the first lattice point. The R component of the second lattice point is set equal to either the tone value R1 (corresponding to the lower coordinate value) or the tone value R2 (corresponding to the upper coordinate value). The G component of the second lattice point is set equal to either the tone value G1 (corresponding to the lower coordinate value) or the tone value G2 (corresponding to the upper coordinate value). The B component of the second lattice point is set equal to either the tone value B1 (corresponding to the lower coordinate value) or the tone value B2 (corresponding to the upper coordinate value). Namely one of the lattice point P1 (R1,G1,B1), a lattice point P2 (R2,G1,B1), a lattice point P3 (R2,G2,B1), a lattice point P4 (R1,G2,B1), a lattice point P5 (R1,G1,B2), a lattice point P6 (R2,G1,B2), a lattice point P7 (R2,G2,B2), and a lattice point P8 (R1, G2,B2) is allocated to the second lattice point. The symbol 'closed circle' in FIG. 16(a) represents allocation of the lattice point P1 to the first lattice point. The symbols 'open circle' in FIG. 16(a) represent allocation of one of these lattice points P1 through P8 to the second lattice point.

Figures 17A, 17B:
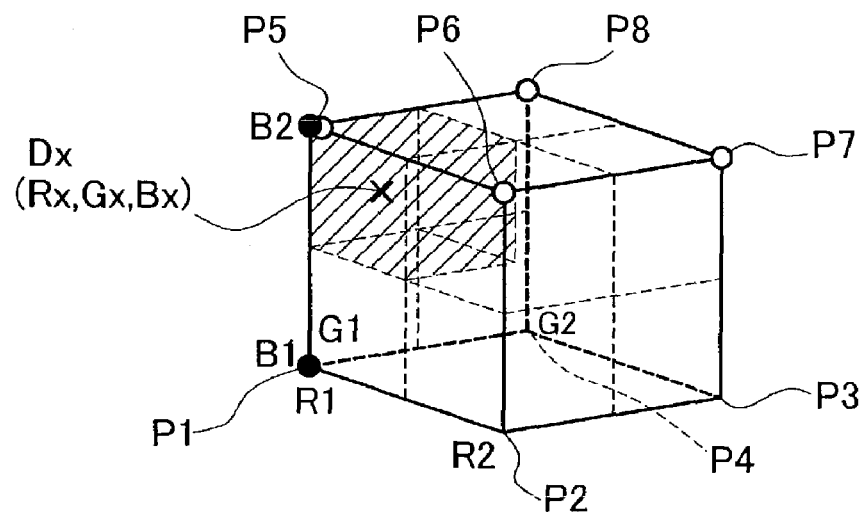
FIG. 17 shows allocation of image data to the first lattice point and the second lattice point according to the coordinate value of the image data in the pre-conversion process of the first embodiment.

FIG. 17 shows allocation of the image data Dx to the first lattice point and the second lattice point, when the R component Rx and the G component Gx of the image data Dx are closer to the corresponding lower coordinate values but the B component Bx is closer to the corresponding upper coordinate value, that is, when the image data Dx is in a hatched range of FIG. 17(a).

The R and G components Rx and Gx of the image data Dx are closer to the tone values R1 and G1 corresponding to the lower coordinate values, whereas the B component Bx is closer to the tone value B2 corresponding to the upper coordinate value. The tone values R1 and G1 are accordingly set to the R and G components of the first lattice point (see FIG. 14(a)), while the B component of the first lattice point is set equal to either one of the tone values B1 and B2. With regard to the second lattice point, the tone value B2 is set to the B component, while the R component is set equal to either one of the tone values R1 and R2 and the G component is set equal to either one of the tone values G1 and G2.

FIG. 17(b) shows the tone values of the respective components in the possible combinations of the first lattice point and the second lattice point. Either one of the lattice point P1 (R1,G1,B1) and the lattice point P5 (R1,G1,B2) is allocated to the first lattice point, whereas one of the lattice point P5 (R1,G1, B2), the lattice point P8 (R1,G2,B2), the lattice point P6 (R2,G1,B2), and the lattice point P7 (R2,G2,B2) is allocated to the second lattice point. The symbols 'closed circle' in FIG. 17(a) represent allocation of either one of the lattice points P1 and P5 to the first lattice point. The symbols 'open circle' in FIG. 17(a) represent allocation of one of the lattice points P5, P6, P7, and P8 to the second lattice point.

The lattice point allocation process (the pre-conversion process) shown in the flowchart of FIG. 11 selects the first lattice point and the second lattice point according to the coordinate values of the target image data Dx. An identical lattice point may be selected in an overlapping manner as the first lattice point and the second lattice point. After selection of the two lattice points, the program exits from the routine of the pre-conversion process shown in the flowchart of FIG. 11 and returns to the routine of the pre-conversion/color conversion process shown in the flowchart of FIG. 10.

C-4. Color Conversion Process

Subsequent to the pre-conversion process discussed above, the program carries out the color conversion process (step S204 in the flowchart of FIG. 10). The pre-conversion process allocates the image data Dx expressed by the tone values of the R, G, and B color components to the first lattice point and the second lattice point. Each of these lattice points is also expressed by a combination of the coordinate values of the R, G, and B components. The subsequent color conversion process converts the coordinate values of the R, G, and B components into CMY image data expressed by the tone values of the color inks used in the color printer 200, that is, the C, M, and Y color inks.

Figure 18:
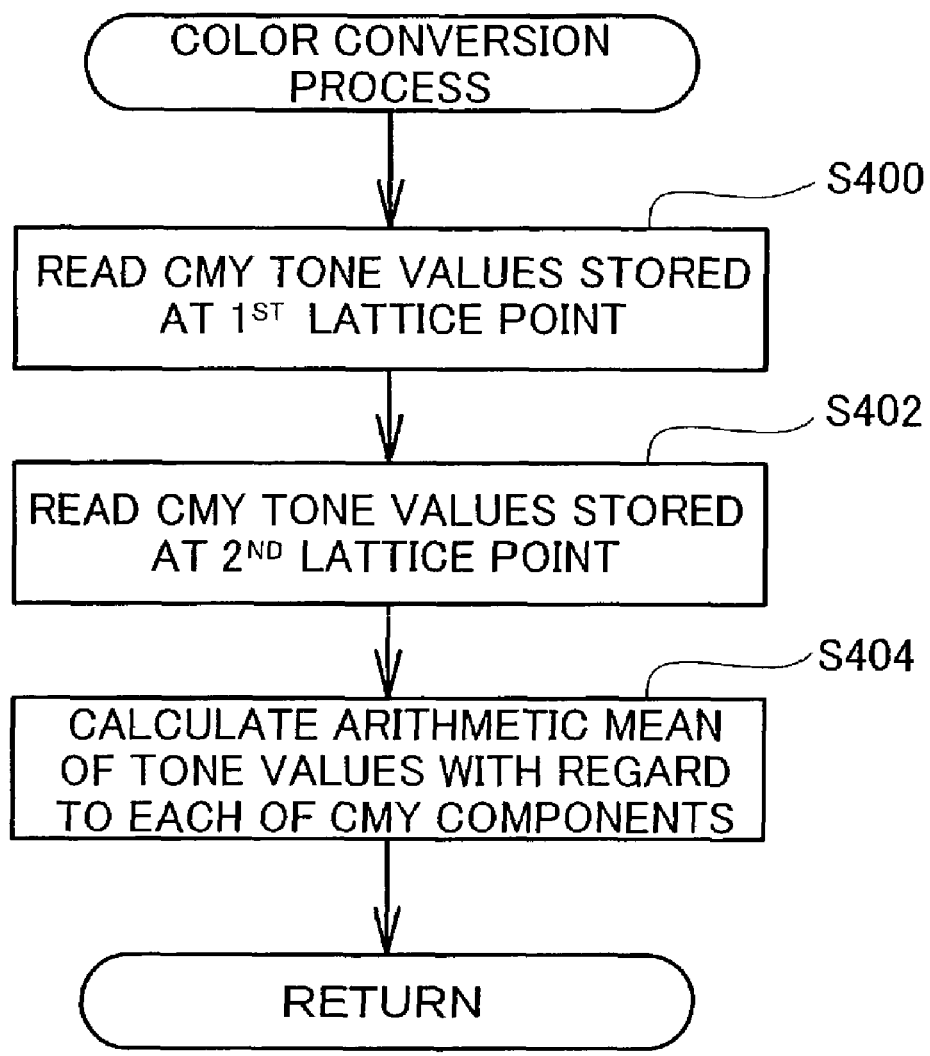
FIG. 18 is a flowchart showing a processing routine of reading tone values from allocated lattice points and specifying color-converted image data in the color conversion process of the first embodiment.

FIG. 18 is a flowchart showing a processing routine of the color conversion process carried out subsequent to the pre-conversion process. Like the pre-conversion process discussed above, the printer driver 12 executes the color conversion process by utilizing the functions of the CPU 102 in the computer 100. The details of the color conversion process are discussed with reference to the flowchart of FIG. 18.

When the program enters the routine of the color conversion process, the printer driver 12 first reads the tone values of the respective color components stored at the first lattice point in the LUT (color conversion table) (step S400). As described previously, a combination of the tone values of the respective color inks used in the color printer 200, for example, the C, M, and Y color inks, is stored at each lattice point in the LUT. The processing of step S400 reads the tone values of the respective color components stored at the first lattice point, so as to convert the coordinate values of the R, G, and B components representing the first lattice point into the tone values of the C, M, and Y components. For the simplicity of explanation, the following description is on the assumption that the tone values of only the C, M, and Y color components are stored at each lattice point in the LUT. In the actual application, however, the tone values of additional color inks used in the color printer 200, for example, K (black) ink, may also be stored at each lattice point in the LUT.

The printer driver 12 subsequently reads the tone values of the C, M, and Y components stored at the second lattice point in the LUT, so as to convert the coordinate values of the R, G, and B components representing the second lattice point into the tone values of the C, M, and Y components (step S402).

After reading the tone values of the C, M, and Y components stored at the first lattice point and the second lattice point, the printer driver 12 calculates an arithmetic mean of the tone values of the first lattice point and the second lattice point with regard to each component and thereby specifies CMY image data Dcx corresponding to the target RGB image data Dx (step S404). In one example, C1, M1, and Y1 represent the tone values of the C, M, and Y components read from the first lattice point, and C2, M2, and Y2 represent the tone values of the C, M, and Y components read from the second lattice point. The C component Cx, the M component Mx, and the Y component Yx of the CMY image data Dcx corresponding to the target RGB image data Dx are calculated as:

$Cx=(C1+C2)/2$ $Mx=(M1+M2)/2$ $Yx=(Y1+Y2)/2$

After the calculation of the tone values of the C, M, and Y components of the CMY image data Dcx, the program exits from the processing routine of the color conversion process shown in the flowchart of FIG. 18 and returns to the processing routine of the pre-conversion/color conversion process shown in the flowchart of FIG. 10. The RGB image data read at step S200 in the flowchart of FIG. 10 has been converted to the CMY image data Dcx expressed by the tone values of the C, M, and Y components via the first lattice point and the second lattice point. In this embodiment, the tone value of each component of the CMY image data Dcx is the mean of the tone values read from the first lattice point and the second lattice point with regard to the component. The tone value of each component of the CMY image data Dcx may be a value that internally divides the tone values read from the two lattice points at a predetermined ratio or at an arbitrary ratio. When the color conversion of all the RGB image data Dx into the CMY image data Dcx has been completed, the program exits from the processing routine of the pre-conversion/color conversion process shown in the flowchart of FIG. 10 and returns to the image data conversion routine shown in the flowchart of FIG. 9.

In the pre-conversion/color conversion process of the embodiment discussed above, the pre-conversion errors still occur due to allocation of the image data Dx to the lattice points in the LUT. The procedure of the embodiment, however, uses the first noise Ns1 and the second noise Ns2 to set the first lattice point and the second lattice point, and calculates the arithmetic mean of the tone values stored at these lattice points to specify the CMY image data. This arrangement enables the pre-conversion errors arising in the respective image data to be mutually cancelled. The following describes the reason of such cancellation. For convenience of explanation, it is assumed that the target image data Dx and the LUT (color conversion table) are respectively one-dimensional image data and a one-dimensional numerical table.

The target image data Dx internally divides lattice points P1 and P2 at a ratio of 1 to 3, where the lattice points P1 and P2 include the image data Dx. Tone values C1 and C2 are respectively stored at the lattice points P1 and P2 in the LUT. FIG. 19(a) shows the positional relation among the image data Dx and the lattice points P1 and P2.

When the interpolation technique is applied for color conversion of the image data Dx, the resulting color-converted image data Dcx is specified by internally dividing the tone value C1 stored at the lattice point P1 and the tone value C2 stored at the lattice point P2 at an inverse ratio of the distance. In the example of FIG. 19(a), the resulting image data Dcx obtained by color conversion of the image data Dx is calculated as:

$Dcx=(3/4) \cdot C1+(1/4) \cdot C2$

The procedure of this embodiment, on the other hand, sets the first lattice point and the second lattice point in the pre-conversion process and subsequently carries out the color conversion. FIG. 19(b) shows setting of the first lattice point. As described previously, the first lattice point is set according to the result of the comparison between the first decision data Dr1 and the threshold value th (for example, see FIG. 14). The first decision data Dr1 is obtained by adding the first noise Ns1 to the image data Dx. Here the threshold value th is set equal to the tone value R2. The image data Dx has the tone value that internally divides the lattice points P1 and P2 at the ratio of 1 to 3. The first decision data Dr1 is thus constantly smaller than the threshold value th, so that the lattice point P1 is always allocated to the first lattice point.

FIG. 19(c) shows setting of the second lattice point. As described previously, the second lattice point is set according to the result of the comparison between the second decision data Dr2 and the threshold value th. When the second decision data Dr2 is smaller than the threshold value th, the lattice point P1 is allocated to the second lattice point. When the second decision data Dr2 is greater than the threshold value th, on the contrary, the lattice point P2 is allocated to the second lattice point. The second decision data Dr2 is obtained by adding the first noise Ns1 and the tone value (R2−R1)/2 to the image data Dx, where the first noise Ns1 takes an arbitrary value in a range of 0 to (R2−R1)/2. The image data Dx has the tone value that internally divides the two lattice points at the ratio of 1 to 3 and is specified as:

$Dx=(3/4) \cdot R1+(1/4) \cdot R2$

The second decision data Dr2 obtained by adding the first noise Ns1 and the tone value (R2−R1)/2 to the tone value Dx takes an arbitrary value in a range of a tone value {R2−(R2−R1)/4} to a tone value {R2+(R2−R1)/4} with a substantially equal probability.

The possible range of the second decision data Dr2 is shown as a hatched area in FIG. 19(c). When the second decision data Dr2 is smaller than the threshold value th (=the tone value R2) in (that is, on the left side of) the hatched range of FIG. 19(c), the image data Dx is allocated to the lattice point P1. When the second decision data Dr2 is greater than the threshold value th in (that is, on the right side of) the hatched range of FIG. 19(c), on the contrary, the image data Dx is allocated to the lattice point P2. As clearly understood from the above explanation and FIG. 19(c), when the image data Dx has the tone value that internally divides the lattice points P1 and P2 at the ratio of 1 to 3, the second lattice point is set either at the lattice point P1 or at the lattice point P2 with substantially the same probability.

FIG. 19(d) shows the frequencies of allocation of the lattice points P1 and P2 to the first lattice point and the second lattice point, when the above series of processing is carried out some sizable number of times (for example, N times). Since the first lattice point is always set at the lattice point P1, the frequency of allocation of the lattice point P1 to the first lattice point is N times. The frequency of allocation of the lattice point P1 to the second lattice point is identical with the frequency of allocation of the lattice point P2 to the second lattice point and is equal to N/2 times. In the total of the first lattice point and the second lattice point, the image data Dx is allocated to either one of the lattice points P1 and P2 to make the ratio of the lattice point P1 to the lattice point P2 equal to 3 to 1. When a large number of image data are subjected to the pre-conversion/color conversion process, the image data Dx is converted to the tone value C1 or the tone value C2 at the ratio of 3 to 1. The resulting color-converted data Dcx obtained as the arithmetic mean is thus specified as:

$$Dcx = (3/4) \cdot C1 + (1/4) \cdot C2$$

This result coincides with the tone value calculated by the interpolation technique.

In the exampled discussed above, the image data Dx has the tone value that internally divides the lattice points P1 and P2 at the ratio of 1 to 3. As long as some sizable number of image data are processed, the resulting tone value of the color-converted image data specified by the procedure of the embodiment coincides with the tone value calculated by the interpolation technique, regardless of the ratio of internal division of two lattice points. Individual image data has a pre-conversion error due to allocation of the image data to either one of the lattice points P1 and P2. In the case of processing a large number of image data, however, the pre-conversion errors arising in the respective image data are cancelled mutually. This gives the result coincident with the calculation by the interpolation technique.

As described above, the pre-conversion/color conversion procedure of the embodiment first carries out the pre-conversion process to allocate target image data to multiple lattice points in the LUT. The procedure subsequently reads the tone values of each color component stored at the multiple lattice points and combines the read tone values with regard to the color component to specify the color-converted image data corresponding to the target image data. The arrangement of allocating the image data to multiple lattice points prior to color conversion significantly reduces the resultant pre-conversion error, compared with the prior art pre-conversion technique that allocates the image data to only one lattice point, based on the principle discussed previously.

The advantages of the pre-conversion process of the embodiment are described in detail, with comparison to the prior art pre-conversion technique. For example, the pre-conversion process of the embodiment may allocate the image data to two lattice points. This significantly reduces the resulting pre-conversion error, compared with the prior art pre-conversion technique that allocates the image data to only one lattice point. The prior art pre-conversion technique can reduce the resulting pre-conversion error by increasing the number of lattice points in the LUT to be referred to. For reduction of the pre-conversion error in the prior art pre-conversion technique, however, it is required to double the number of divisions on each axis in the LUT. In the case of three-dimensional LUT, the number of lattice points in the whole LUT should accordingly be increased to 8 times. This remarkably increases the storage capacity required for the LUT. The pre-conversion process of the embodiment, on the other hand, simply increases the number of allocated lattice points and effectively reduces the resulting pre-conversion error without causing any such problems.

Even when the number of lattice points in the LUT referred to by the prior art pre-conversion technique is increased to 8 times, the pre-conversion process of the embodiment that allocates the image data to the two lattice points ensures the higher accuracy of subsequent color conversion. This is ascribed to the following reason. The tone value rounded to an integer is stored at each lattice point in the LUT. The resulting image data obtained by color conversion subsequent to the prior art pre-conversion is accordingly an integral value including a round error. The resulting image data obtained by color conversion subsequent to the pre-conversion of the embodiment is, on the other had, calculated from the tone values (integers) stored at the two lattice points and may thus take a decimal value. The color conversion subsequent to the pre-conversion of the embodiment accordingly makes the resulting image data free from the round error. This arrangement thus ensures the higher accuracy of color conversion.

The pre-conversion/color conversion procedure of the embodiment may calculate the arithmetic mean of the tone values read from the multiple lattice points to specify the resulting color-converted CMY image data Dcx corresponding to the target RGB image data Dx. The arithmetic mean is calculated at a high speed. Compared with the color conversion by the interpolation technique, the arrangement of the embodiment ensures the extremely higher speed color conversion. Especially when the number of the multiple lattice points is a multiple number of 2 (for example, 2 or 4), the arithmetic mean is calculated very quickly by utilizing the bit shifting technique in the CPU.

In the case of a three-dimensional LUT of the R, G, and B color components, even tetrahedral interpolation, which has the less number of lattice points to be referred to, among various interpolation techniques should refer to data at four lattice points. The procedure of this embodiment, on the other hand, should refer to data at only two lattice points at the minimum for color conversion. This also ensures the high-speed color conversion.

The pre-conversion/color conversion procedure of the embodiment reads the tone values stored at multiple lattice points and thus naturally increases the total processing time, compared with the prior art pre-conversion technique. The process of reading the tone values stored at the lattice points is, however, implemented at an extremely high speed. The increase in number of lattice points, from which the tone values are read, thus only slightly extends the total processing time. The processing speed of the pre-conversion/color conversion procedure of the embodiment is thus comparable to that of the prior art pre-conversion technique.

The procedure of the above embodiment calculates the arithmetic mean of the tone values stored at the first lattice point and the second lattice point to specify the color-converted image data Dcx. When a large number of image data are processed, this arrangement enables the pre-conversion errors arising in the individual image data to be mutually cancelled. The resulting color-converted image data is thus equivalent to the result by the conventional interpolation technique. As long as the deviation from the result by the known interpolation technique is within an allowable range, the method of calculating the arithmetic mean of the tone values read from the multiple lattice points is not restrictive at all, but the color converted image data may be specified by another technique.

C-6. Modification

The procedure of the first embodiment utilizes the random noises based on random digits as the first noise Ns1 and the second noise Ns2. The error diffusion technique may be applied, instead of utilizing such random noises. The error diffusion technique diffuses an error arising in a certain pixel to peripheral non-processed pixels in the course of processing. The processing based on the error diffusion technique is described briefly as one possible modification of the first embodiment.

The pre-conversion/color conversion procedure shown in the flowchart of FIG. 10 generally starts the processing in a pixel at the upper left corner of an image as a starting pixel and sequentially carries out the processing from the left-end pixel to the right-end pixel on each line. After the right-end pixel on a certain line, the processing shifts to a new line immediately below the certain line and proceeds from the left-end pixel to the right-end pixel on the new line. This series of processing is repeated until the processing of all the pixels in one image plane has been completed. FIG. 20 shows a mid state of the pre-conversion/color conversion process with regard to image data of one image plane. The symbol '*' shown on the center of FIG. 20 represents a target pixel, which is currently being processed. The hatched circles in an area above and on the left of the target pixel represent processed pixels, whereas the open circles in the residual area below and on the right of the target pixel represent non-processed pixels.

The image data of the target pixel shown in FIG. 20 is allocated to two lattice points in the LUT. In this case, an error due to such allocation arises in the target pixel. The method of calculating the error will be discussed later. The error diffusion method diffuses the error arising in the target pixel to peripheral non-processed pixels with preset weights. FIGS. 21(a) and 21(b) show examples of weight coefficients applied to the error, which is to be diffused to the peripheral non-processed pixels. In the example of FIG. 21(a), ½ of the error arising in the target pixel '*' is diffused to a right pixel of the target pixel, and ¼ of the error is diffused respectively to a lower pixel and a lower right pixel of the target pixel.

After diffusion of the error arising in the target pixel to the peripheral non-processed pixels, the procedure shifts the target pixel rightward by one pixel, specifies the right adjacent pixel as a new target pixel, and allocates the image data of the new target pixel to two lattice points in the LUT. As described previously with reference to the flowchart of FIG. 11, the allocation is carried out by comparing the first decision data Dr1 as the sum of the first noise Ns1 and the image data Dx and the second decision data Dr2 as the sum of the second noise Ns2 and the image data Dx with the threshold value th. The procedure of the first embodiment uses a random digit to set the first noise Ns1. The modified example utilizing the error diffusion method, however, uses the total of divisions of errors diffused from peripheral processed pixels to the target pixel as the first noise Ns1.

FIG. 22 conceptually shows diffusion of divisions of errors arising in peripheral processed pixels to a target pixel. The weight coefficients shown in FIG. 21(a) are used for the error diffusion. The rectangle with '*' represents the target pixel, and the rectangles with hatched circles represent the processed pixels. The arrows extending from the processed pixels to the target pixel schematically show diffusion of error divisions. The procedure of this modified example specifies the sum of the error divisions diffused from these peripheral pixels as the first noise Ns1 and the sum of the first noise and the mean of the tone values read from the lattice points as the second noise Ns2.

The error arising by allocation of the image data Dx to the two lattice points is determined by calculating the arithmetic mean of the coordinate values at the two lattice points with regard to each color component and subtracting the calculated arithmetic mean from the corresponding color component of the image data Dx. After calculation of the error arising by allocation of the image data Dx to the two lattice points, the calculated error is diffused to peripheral non-processed pixels with preset weight coefficients, for example, with those shown in FIG. 21(a) or FIG. 21(b). The processing then shifts to a right pixel of the target pixel and specifies the right pixel as a new target pixel. The above series of processing is repeatedly executed until the processing has been completed for all the pixels.

As described above, the modified example based on the error diffusion technique specifies the total of the error divisions diffused from the peripheral non-processed pixels as the first noise Ns1 and exerts the similar effects to those of the first embodiment. This is described briefly.

In the case where each component of the image data Dx in a target pixel is smaller than the mean of the coordinate values read from the two lattice points including the image data Dx, the image data Dx may be allocated twice to an identical lower lattice point (that is, a lattice point having the smaller coordinate value) or may otherwise be allocated to an upper lattice point (that is, the lattice point having the greater coordinate value) and the lower lattice point. The initial value of the first noise Ns1 is set equal to '0'. As discussed previously with reference to FIG. 14, in this case, both the first lattice point and the second lattice point are allocated to the lower lattice point. This causes an error in the target pixel. Since the image data Dx is smaller than the mean of the coordinate values read from the two lattice points including the image data Dx, the error arising in the target pixel is smaller than half the tone value difference between the upper lattice point and the lower lattice point. A next target pixel adjacent to the current target pixel has divisions of errors that arise in peripheral processed pixels in this manner and are diffused from the processed pixels. The first noise Ns1 in the next target pixel is accordingly smaller than half the tone value difference between the upper lattice point and the lower lattice point. Namely the maximum error arising in each target pixel is the tone value that is half the interval between the two lattice points.

In the case where each component of the image data Dx in a target pixel is greater than the mean of the coordinate values read from the two lattice points including the image data Dx, on the other hand, the image data Dx may be allocated to the upper lattice point and the lower lattice point or may otherwise be allocated twice to the identical upper lattice point. The initial value of the first noise Ns1 is set equal to '0'. As discussed previously with reference to FIG.

15, in this case, the first lattice point is allocated to the lower lattice point and the second lattice point is allocated to the upper lattice point. Since the image data Dx is greater than the mean of the coordinate values read from the two lattice points including the image data Dx, the error arising in the target pixel is smaller than half the tone value difference between the upper lattice point and the lower lattice point. A next target pixel adjacent to the current target pixel has divisions of errors that arise in peripheral processed pixels in this manner and are diffused from the processed pixels. The first noise Ns1 in the next target pixel is accordingly smaller than half the tone value difference between the upper lattice point and the lower lattice point. Namely the maximum error arising in each target pixel is the tone value that is half the interval between the two lattice points. In the modified example based on the error diffusion technique, the total error of the two lattice points takes an arbitrary value in the range from the tone value '0' to the tone value that is half the interval between the two lattice points including the image data Dx, regardless of the value of the image data Dx. Divisions of such errors are diffused from peripheral processed pixels to each target pixel. The first noise Ns1 in each target pixel takes an arbitrary value in the range from the tone value '0' to the tone value that is half the interval between the two lattice points including the image data Dx. The first noise Ns1 in the procedure of utilizing the errors by the error diffusion technique is equivalent to the first noise Ns1 in the procedure of generating the errors based on random digits. The procedure of the modified example accordingly has the similar effects to those of the first embodiment discussed above.

As is known in the art, the error diffusion method has the function of canceling the errors arising in the peripheral pixels. The procedure of the modified example based on the error diffusion technique accordingly enables effective cancellation of the pre-conversion errors arising in the respective pixels and advantageously ensures printing of the higher-quality image.

D. Second Embodiment

The procedure of the first embodiment allocates the image data Dx to the two lattice points, the first lattice point and the second lattice point. The number of lattice points, to which the image data Dx is allocated, is not restricted to 2, but may be greater than 2. The following describes such a case as a pre-conversion/color conversion procedure of a second embodiment.

D-1. Pre-Conversion Process of Second Embodiment

Figure 23:
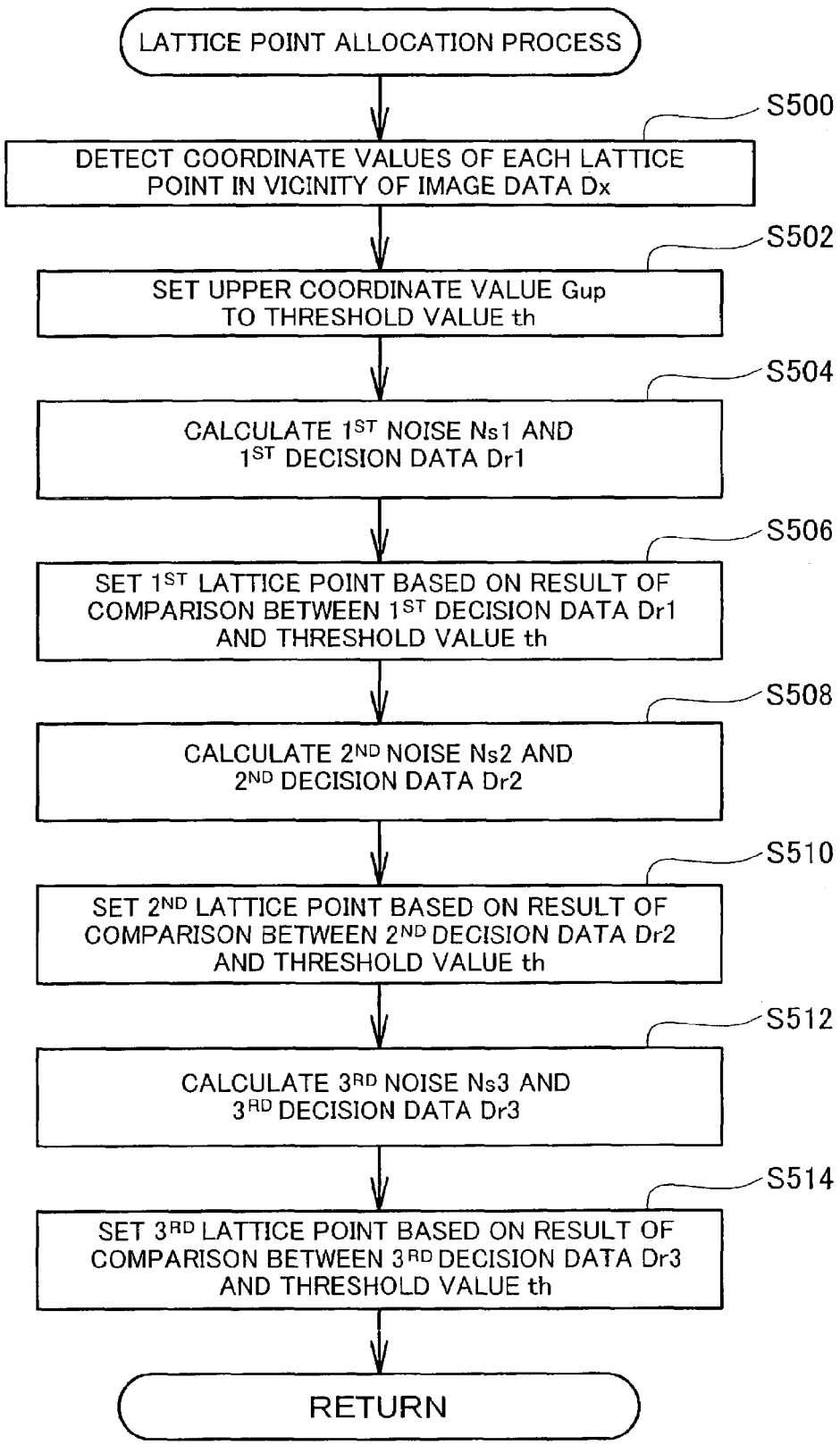
FIG. 23 is a flowchart showing a processing routine of allocating image data to three lattice points in a pre-conversion process of a second embodiment.

FIG. 23 is a flowchart showing a processing routine of allocating image data to multiple lattice points (pre-conversion process) carried out in the second embodiment. This process is executed after the step of reading image data in the pre-conversion/color conversion process shown in the flowchart of FIG. 10. The primary difference from the pre-conversion process of the first embodiment discussed previously with reference to the flowchart of FIG. 11 is an increase in number of the lattice points, to which the image data is allocated, to 3. The process of allocating the image data to the three lattice points is readily expandable to the process of allocating the image data to a greater number of lattice points. The following describes the process of allocating the image data to the three lattice points in the second embodiment with reference to the flowchart of FIG. 23.

Like the pre-conversion process of the first embodiment, when the program enters the pre-conversion process of the second embodiment, the printer driver 12 first detects the coordinate values of each lattice point in the vicinity of target image data Dx on the color space (step S500). As shown in FIG. 13, the procedure of step S500 selects a rectangular parallelepiped including the coordinate point of the target image data Dx among a large number of small rectangular parallelepipeds constituting the LUT (color conversion table) and specifies the coordinate values of the respective vertexes of the selected rectangular parallelepiped with regard to each color component.

The printer driver 12 subsequently sets an upper coordinate value Gup to the threshold value th with regard to each color component (step S502). The upper coordinate value Gup corresponds to the greater tone value when the coordinate values of the lattice points detected at step S500 are grouped into the respective color components. In the example of FIG. 13, the upper coordinate values Gup of the R component, the G component, and the B component are respectively equal to the tone value R2, the tone value G2, and the tone value B2.

After setting the threshold value th, the printer driver 12 calculates a first noise Ns1 and first decision data Dr1 with regard to each color component (step S504). The first noise Ns1 of the R component is calculated according to an equation of:

$$Ns1=(R2-R1) \cdot RD[0,1]/3$$

where RD[0,1] represents a function of generating a random digit in a division [0,1]. The function RD[0,1] is divided by 3, since the image data Dx is allocated to three lattice points in the second embodiment. In general, when the image data Dx is allocated to a number (N) of lattice points, the function RD[0,1] is divided by N. The first decision data Dr1 is calculated according to an equation of:

$$Dr1=Dx+Ns1$$

The printer driver 12 then sets a first lattice point based on the result of comparison between the calculated first decision data Dr1 and the preset threshold value th (step S506). The setting of the first lattice point is carried out with regard to each color component, like the procedure of the first embodiment discussed previously with reference to the flowchart of FIG. 11. When a certain color component of the first decision data Dr1 is greater than the threshold value th, the upper coordinate value Gup is set to the coordinate value of the first lattice point with regard to the certain color component. Otherwise a lower coordinate value Glw is set to the coordinate value of the first lattice point. The lower coordinate value Glw corresponds to the smaller tone value when the coordinate values of the lattice points detected at step S500 are grouped into the respective color components. In the example of FIG. 13, the lower coordinate values Glw of the R component, the G component, and the B component are respectively equal to the tone value R1, the tone value G1, and the tone value B1. This series of processing is carried out with regard to the respective color components to specify the first lattice point.

After setting the first lattice point, the printer driver 12 calculates a second noise Ns2 and second decision data Dr2 for setting a second lattice point (step S508). The second noise Ns2 is the sum of the first noise Ns1 and a tone value that internally divides the lower coordinate value Glw and the upper coordinate value Gup adjoining to the image data Dx at a ratio of 1 to 3. Addition of the tone value that internally divides the coordinate values Glw and Gup at the ratio of 1 to 3 is ascribed to allocation of the image data Dx to the three lattice points. In general, the second noise Ns2 is the sum of the first noise Ns1 and a tone value that internally divides the lower coordinate value Glw and the upper coordinate value Gup at a ratio of 1 to N.

The printer driver 12 subsequently sets a second lattice point based on the result of comparison between the calculated second decision data Dr2 and the preset threshold value th (step S510). When a certain color component of the second decision data Dr2 is greater than the threshold value th, the upper coordinate value Gup is set to the coordinate value of the second lattice point with regard to the certain color component. Otherwise the lower coordinate value Glw is set to the coordinate value of the second lattice point. This series of processing is carried out with regard to the respective color components to specify the second lattice point.

The program then sets a third lattice point in a similar manner to that of the first lattice point and the second lattice point. The printer driver 12 calculates a third noise Ns3 and third decision data Dr3 (step S512), and sets the third lattice point based on the result of comparison between the calculated third decision data Dr3 and the preset threshold value th (step S514). The third noise Ns3 is the sum of the first noise Ns1 and a tone value that internally divides the lower coordinate value Glw and the upper coordinate value Gup adjoining to the image data Dx at a ratio of 2 to 3. The third decision data Dr3 is obtained by adding the third noise Ns3 to the image data Dx. When a certain color component of the third decision data Dr3 is greater than the threshold value th, the upper coordinate value Gup is set to the coordinate value of the third lattice point with regard to the certain color component. Otherwise the lower coordinate value Glw is set to the coordinate value of the third lattice point. This series of processing is carried out with regard to the respective color components to specify the third lattice point.

On completion of the setting of the first lattice point, the second lattice point, and the third lattice point in the above manner, the program exits from the processing routine of the pre-conversion process in the second embodiment shown in the flowchart of FIG. 23 and returns to the processing routine of the pre-conversion/color conversion process shown in the flowchart of FIG. 10.

Figure 24A:
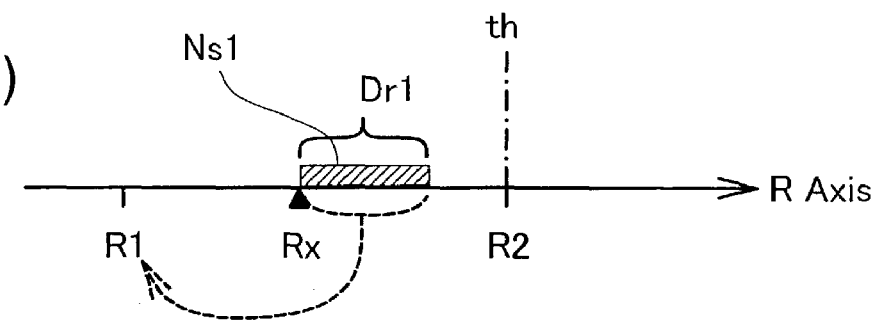
FIG. 24 shows allocation of image data to three lattice points in the pre-conversion process of the second embodiment.
Figure 24B:
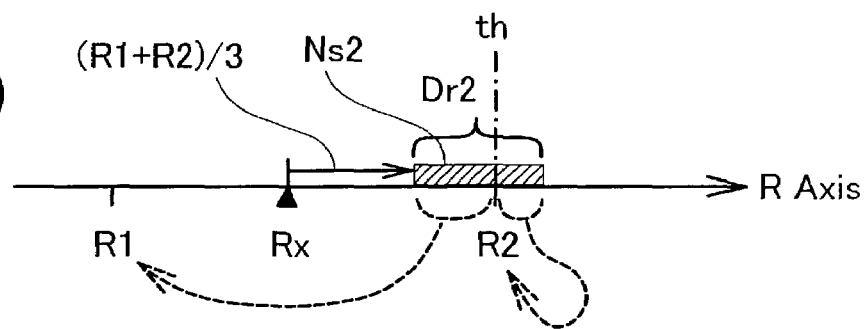
Figure 24C:
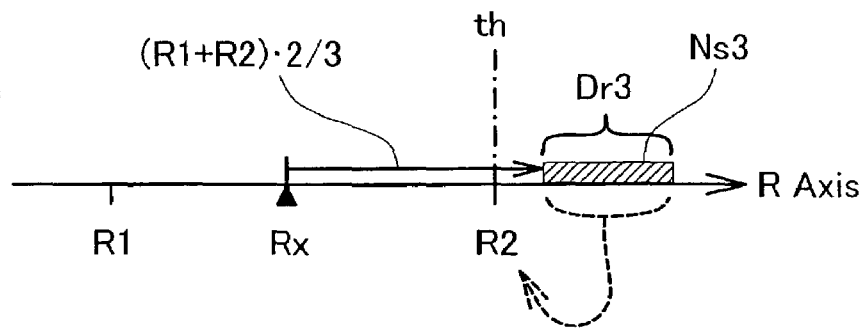

The process of allocating the image data Dx to the three lattice points by the pre-conversion process of the second embodiment is discussed concretely with reference to an example of FIG. 24. FIG. 24 conceptually shows allocation of the image data Dx to the three lattice points. FIGS. 24(a), 24(b), and 24(c) respectively show allocation of the image data Dx to the first lattice point, the second lattice point, and the third lattice point. For the simplicity of explanation, FIG. 24 regards the process of setting the coordinate values of only the R component at the respective lattice points. The explanation is naturally applicable to the other color components G and B.

Setting of the first lattice point is described with reference to FIG. 24(a). The closed triangle represents the position of the R component Rx of the image data Dx. R1 and R2 are tone values respectively corresponding to the lower coordinate value Glw and the upper coordinate value Gup adjoining to the image data Dx. In the example of FIG. 24, the R component of the image data Dx is substantially in the middle of the coordinate values R1 and R2 or more specifically in a range from a coordinate value $\{R1+(R2-R1)/3\}$ to a coordinate value $\{R1+((R2-R1)\cdot 2/3)\}$.

When the image data Dx is in the range from the coordinate value $\{R1+(R2-R1)/3\}$ to the coordinate value $\{R1+((R2-R1)\cdot 2/3)\}$, the first decision data Dr1 obtained by adding the first noise Ns1 to the image data Dx takes an arbitrary value in a hatched range of FIG. 24(a). As clearly shown in FIG. 24(a), the first decision data Dr1 never exceeds the threshold value th. The coordinate value R1 is thus constantly set to the R component of the first lattice point.

Setting of the second lattice point is described with reference to FIG. 24(b). The second decision data Dr2 obtained by adding the second noise Ns2 to the image data Dx may be smaller than the threshold value th or greater than the threshold value th according to the value of the second noise Ns2 as shown by a hatched range in FIG. 24(b). The coordinate value R1 is set to the R component of the second lattice point when the second decision data Dr2 is smaller than the threshold value th. The coordinate value R2 is set to the R component of the second lattice point when the second decision data Dr2 is greater than the threshold value th.

Setting of the third lattice point is described with reference to FIG. 24(c). The third decision data Dr3 obtained by adding the third noise Ns3 to the image data Dx is always greater than the threshold value th, regardless of the value of the third noise Ns3, as shown by a hatched range in FIG. 24(c). The coordinate value R2 is thus constantly set to the R component of the third lattice point.

Figures 25, 26:
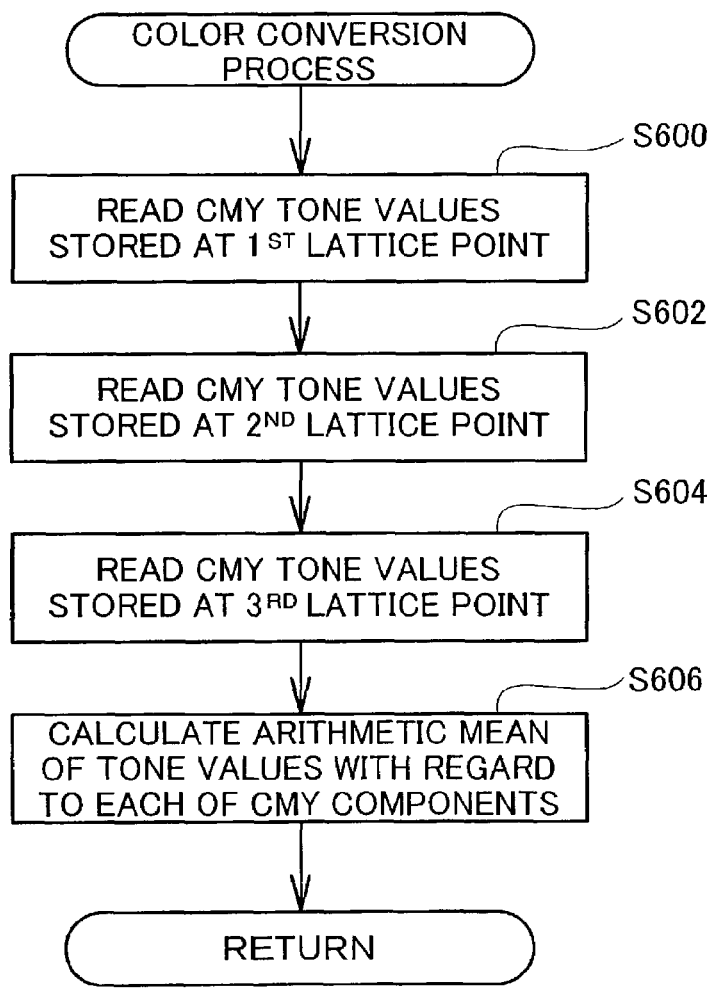
FIG. 25 shows allocation of image data to three lattice points according to the value of the image data in the pre-conversion process of the second embodiment.
FIG. 26 is a flowchart showing a processing routine of reading tone values from allocated lattice points and specifying color-converted image data in the pre-conversion/color conversion process of the second embodiment.

The coordinate values of the first lattice point, the second lattice point, and the third lattice point are set in a similar manner, when the image data Dx is in another range of the coordinate value. FIG. 25 shows settings of the R components of the three lattice points according to the value of the image data Dx. The upper most row shows the settings when the image data Dx is in a range from the coordinate value R1 to the coordinate value $\{R1+(R2-R1)/3\}$. The middle row shows the settings when the image data Dx is in the range from the coordinate value $\{R1+(R2-R1)/3\}$ to the coordinate value $\{R1+((R2-R1)\cdot 2/3)\}$, that is, in the case of FIG. 24. The lower most row shows the settings when the image data Dx is in a range from the coordinate value $\{R1+((R2-R1)\cdot 2/3)\}$ to the coordinate value R2.

D-2. Color Conversion Process of Second Embodiment

The procedure carries out a color conversion process subsequent to the allocation of the image data to the three lattice points. FIG. 26 is a flowchart showing a processing routine of the color conversion process, subsequent to the pre-conversion process, executed in the second embodiment. The pre-conversion process of the second embodiment allocates the image data to the three lattice points. The color conversion process of the second embodiment sequentially reads the tone values stored at the lattice points in the LUT, which are respectively set as the first lattice point, the second lattice point, and the third lattice point (steps S600, S602, and S604), and calculates the arithmetic mean of these tone values with regard to each color component so as to specify the tone values of the resulting color-converted image data (step S606). The second embodiment calculates the arithmetic mean as the simplest method, although another method may be applied for the color conversion.

Figures 27, 28:
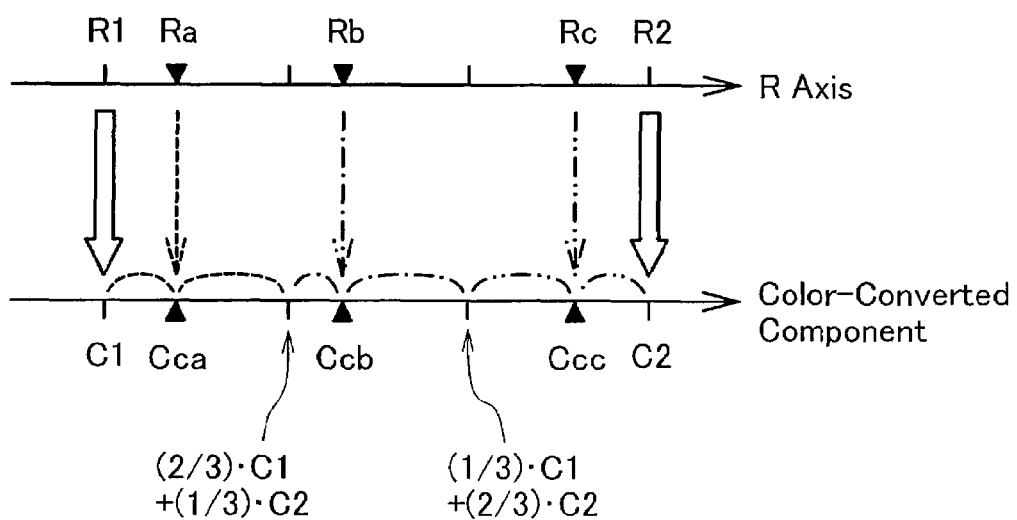
FIG. 27 shows settings of tone values of color-converted image data according to the value of the image data in the pre-conversion/color conversion process of the second embodiment.
FIG. 28 shows the effects of allocation of image data to three lattice points on reduction of the pre-conversion error in the pre-conversion/color conversion process of the second embodiment.

The image data Dx is defined by the tone values of the R, G, and B components, and the resulting color-converted image data is defined by the tone values of the C, M, and Y components. For the simplicity of explanation, the following description is focused on only the R component and the C component. A tone value C1 is stored as the color-converted tone value at the lattice point of the coordinate value R1 in the LUT. A tone value C2 is stored at the lattice point of the coordinate value R2 in the LUT. FIG. 27 shows the resulting tone values obtained by the color conversion of the three lattice points set by the pre-conversion process of the second embodiment.

As described previously with reference to FIG. 25, the first lattice point, the second lattice point, and the third lattice point are set according to the value of the image data Dx. The tone values of the color-converted image data are thus varied according to the value of the image data Dx. When the image data Dx is in the range from the coordinate value R1 to the coordinate value {R1+(R2−R1)/3}, the color converted image data has either the tone value C1 or a tone value {(⅔)·C1+(⅓)·C2}. When the image data Dx is in the range from the coordinate value {R1+(R2−R1)/3} to the coordinate value {R1+((R2−R1)·⅔)}, the color-converted image data has either the tone value {(⅔)·C1+(⅓)·C2} or a tone value {(⅓)·C1+(⅔)·C2}. When the image data Dx is in the range from the coordinate value {R1+((R2−R1)·⅔) to the coordinate value R2, the color-converted image data has either the tone value {(⅓)·C1+(⅔)·C2} or the tone value C2. The maximum pre-conversion error does not exceed a tone value (C2−C1)/3, regardless of the range of the image data Dx. This is described with reference to FIG. 28.

FIG. 28 shows an example of color conversion of the RGB image data to the tone values of the C, M, and Y color components. For the simplicity of explanation, the illustration is focused on only the R component of the RGB image data and the tone value of the C color component. The tone value C1 is stored at the lattice point of the coordinate value R1 in the LUT, and the tone value C2 is stored at the lattice point of the coordinate value R2. The image data has an R component Ra that is in the range from the coordinate value R1 to the coordinate value {R1+(R2−R1)/3}. The image data Ra is converted into a tone value Cca by color conversion based on the interpolation technique. The arrow of broken line extending from the coordinate value Ra of the image data on the R axis to the C component of the color-converted image data in FIG. 28 schematically shows conversion of the image data Ra into the tone value Cca by the color conversion based on the interpolation technique.

The pre-conversion/color conversion process of the second embodiment, on the other hand, converts the image data Ra into either the tone value C1 or the tone value {(⅔)·C1+(⅓)·C2}. In the case of conversion to the tone value C1, there is a pre-conversion error corresponding to the difference between the tone value Cca and the tone value C1. The arc of broken line between the tone value Cca and the tone value C1 in FIG. 28 shows the pre-conversion error arising due to allocation of the image data Ra to the coordinate value R1. In the case of conversion to the tone value {(⅔)·C1+(⅓)·C2}, there is a pre-conversion error corresponding to the difference between the tone value {(⅔)·C1+(⅓)·C2} and the tone value Cca. The arc of broken line between the tone value {(⅔)·C1+(⅓)·C2} and the tone value Cca in FIG. 28 shows the pre-conversion error arising due to allocation of the image data Ra to the coordinate value {R1+(R2−R1)/3}. The pre-conversion error arising by color conversion of the image data Ra is maximized (that is, the length of the arc of the broken line is maximized), when the color-converted image data has the tone value {(⅔)·C1+(⅓)·C2} while the image data Ra is approximate to the coordinate value R1 or when the color-converted image data has the tone value C1 while the image data Ra is approximate to the coordinate value {R1+(R2−R1)/3}. In either case, the maximum pre-conversion error is the tone value (C2−C1)/3.

The above explanation is also applicable to an R component Rb of the image data that is in the range from the coordinate value {R1+(R2−R1)/3} to the coordinate value {R1+((R2−R1)·⅔)}, as well as to an R component Rc of the image data that is in the range from the coordinate value {R1+((R2−R1)·⅔)} to the coordinate value R2. The image data Rb and the image data Rc are respectively converted into a tone value Ccb and a tone value Ccc by color conversion based on the interpolation technique. As shown in FIG. 27, the pre-conversion/color conversion process of the second embodiment, on the other hand, converts the image data Rb into either the tone value {(⅔)·C1+(⅓)·C2} or the tone value {(⅓)·C1+(⅔)·C2}, while converting the image data Rc into either the tone value {(⅓)·C1+(⅔)·C2} or the tone value C2. With regard to the image data Rb and Rc, in any case, the maximum pre-conversion error is the tone value (C2−C1)/3.

As described above, in the arrangement of allocating the image data Dx to the first lattice point, the second lattice point, and the third lattice point for color conversion, the maximum pre-conversion error is ⅓ of the interval between the coordinate values of the lattice points including the image data Dx, regardless of the value of the image data Dx. This arrangement thus significantly reduces the pre-conversion error, compared with the prior art pre-conversion technique.

The procedure of the second embodiment allocates the image data to the three lattice points. The image data may be allocated to a greater number of lattice points. The increase in number of lattice points, to which the image data is allocated, results in reducing the pre-conversion error. For example, when the image data is allocated to N lattice points, the maximum pre-conversion error is 1/N of the interval between the coordinate values of the lattice points including the image data.

The pre-conversion process of the second embodiment allocates the image data to the three lattice points, and the color conversion process is accordingly required to read the tone values stored at the three lattice points in the LUT. The increase in number of lattice points, from which the tone values are read, slightly extends the processing time required for color conversion. The arrangement of the second embodiment, however, still significantly shortens the total processing time, compared with the conventional color conversion method utilizing the interpolation technique. This is described with reference to FIG. 29.

Figure 29:
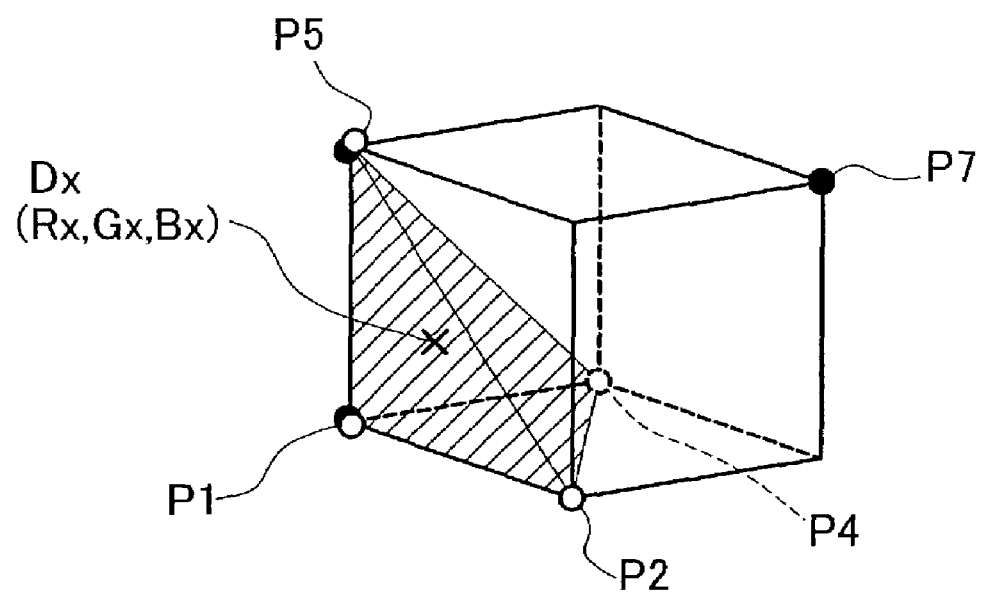
FIG. 29 shows a reason of higher-speed processing compared with a conventional interpolation technique.

FIG. 29 conceptually shows the image data Dx included in a rectangular parallelepiped in the LUT. The pre-conversion process of the second embodiment allocates the image data Dx to the three lattice points. The conventional color conversion method that utilizes the interpolation technique for color conversion of the image data Dx should refer to four lattice points P1, P2, P4, and P5 and read the tone values stored at these lattice points P1, P2, P4, and P5, even in the case of tetrahedral interpolation that has the less number of lattice points to be referred to. The number of lattice points to be referred to for reading the tone values is 3 in the pre-conversion/color conversion procedure of the second embodiment, but is 4 in the conventional color conversion method utilizing the interpolation technique. Namely the processing time required for color conversion in the pre-conversion/color conversion procedure of the second embodiment is shorter than that in the conventional color conversion method utilizing the interpolation technique.

The interpolation requires specification of the distances between the image data Dx and the four lattice points P1, P2, P4, and P5. The color conversion process of the second embodiment, on the other hand, may specify the color-converted image data by simply calculating the arithmetic mean of the tone values read from the multiple lattice points.

It is accordingly not necessary to specify the distances between the image data Dx and the respective lattice points. Even in the case of the increased number of lattice points, to which the image data is allocated, the pre-conversion/color conversion process of the second embodiment still significantly reduces the total processing time, compared with the conventional color conversion method utilizing the interpolation technique.

E. Third Embodiment

In the first and the second embodiments discussed above, N noises are used for allocation of the image data to N lattice points. For example, the procedure of the first embodiment uses the first noise Ns1 for setting the first lattice point and the second noise Ns2 for setting the second lattice point. The number of noises may, however, be different from the number of lattice points, to which the image data is allocated. Only one noise may be used for allocation of the image data to multiple lattice points. This application is discussed below as a pre-conversion process of a third embodiment.

E-1. Pre-Conversion Process of Third Embodiment

Figure 30:
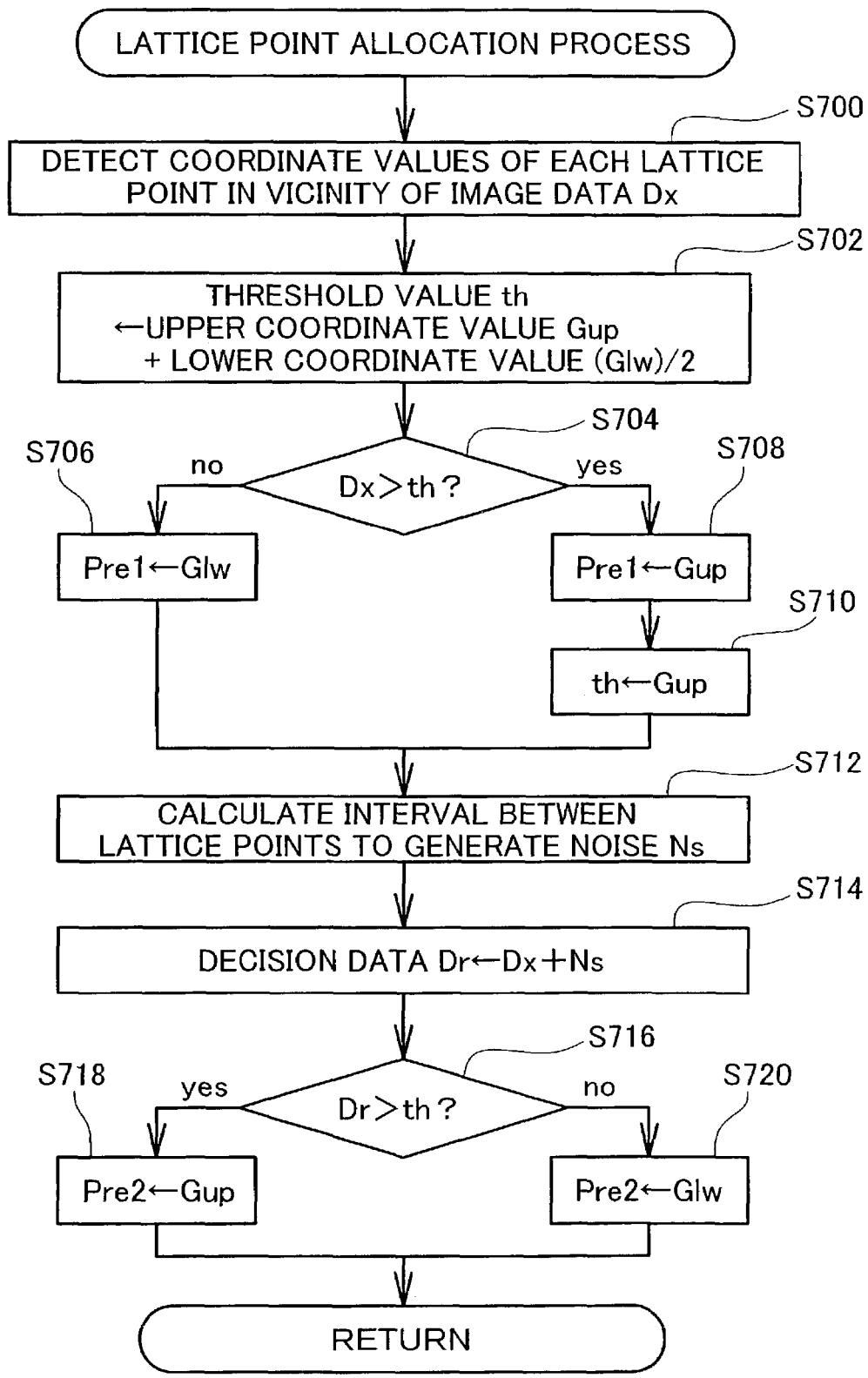
FIG. 30 is a flowchart showing a processing routine of allocating image data to two lattice points in a pre-conversion process of a third embodiment.

FIG. 30 is a flowchart showing a processing routine of the pre-conversion process carried out in the third embodiment.

When the program enters the pre-conversion process of the third embodiment, the printer driver 12 first detects the coordinate values of each lattice point in the vicinity of target image data Dx on the color space (step S700). The processing of step S700 is identical with that of step S300 in the first embodiment discussed previously with reference to the flowchart of FIG. 11, and is thus not specifically described here.

The printer driver 12 then calculates the mean of an upper coordinate value (Gup) and a lower coordinate value (Glw) and sets the calculated mean to a threshold value th (step S702). The upper coordinate value Gup corresponds to the greater tone value when the coordinate values of the lattice points detected at step S700 are grouped into the respective color components. The lower coordinate value Glw corresponds to the smaller tone value. The upper coordinate value Gup and the lower coordinate value Glw are present with regard to each color component of the image data Dx, and the threshold value th is also set for each color component. For convenience, the color component is not specified in the following description. The description is applicable to all the color components of the image data, unless otherwise specified.

The target image data Dx is compared with the setting of the threshold value th with regard to each color component (step S704). When the image data Dx is smaller than the threshold value th, the lower coordinate value Glw is set to a coordinate value Pre1 of the first lattice point (step S706). When the image data Dx is greater than the threshold value th, on the other hand, the upper coordinate value Gup is set to the coordinate value Pre1 of the first lattice point (step S708). This series of processing is carried out with regard to the respective color components, so as to specify the first lattice point. In the case where the image data Dx is greater than the threshold value th (in the case of an affirmative answer at step S704), subsequent to setting the coordinate value of the first lattice point (step S708), the program updates the threshold value th to the upper coordinate value Gup as a preparation for setting the second lattice point (step S710).

Figure 31A:
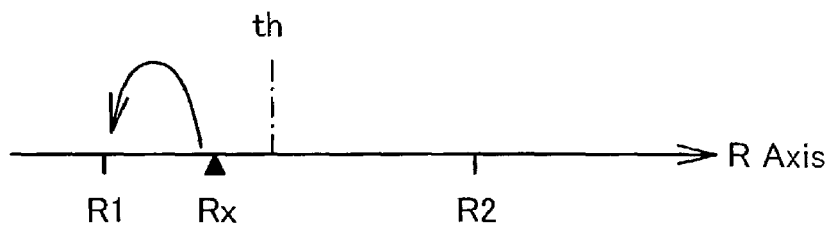
FIG. 31 shows allocation of image data to the first lattice point in the pre-conversion process of the third embodiment.
Figure 31B:
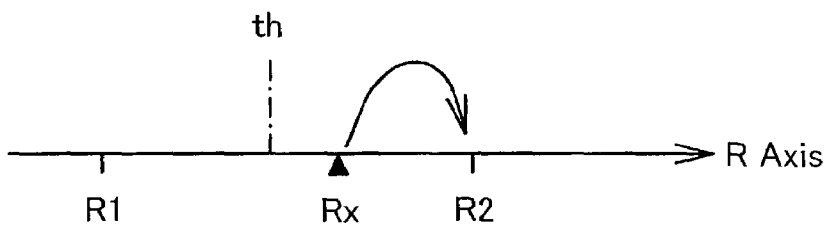

FIG. 31 conceptually shows setting of the first lattice point. Although the illustration of FIG. 31 regards only the R component, the same principle is applied for the other color components. FIG. 31(a) shows the setting when the R component Rx of the image data Dx is smaller than the threshold value th (=(R1+R2)/2). In this case, a tone value R1 corresponding to the lower coordinate value Glw is set to the R component of the first lattice point. The arrow of solid line in FIG. 31(a) schematically shows setting of the tone value R1 to the coordinate value of the first lattice point. FIG. 31(b) shows the setting when the R component Rx of the image data is greater than the threshold value th. In this case, a tone value R2 corresponding to the upper coordinate value Gup is set to the R component of the first lattice point. The pre-conversion process of the third embodiment compares each component of the image data Dx with the threshold value th in this manner to specify the first lattice point.

After setting the first lattice point, the program carries out the processing to set the second lattice point. The pre-conversion process of the third embodiment utilizes a noise to set the second lattice point. The process of setting the second lattice point first generates a noise Ns (step S712). The noise Ns may be identical with the first noise Ns1 used in the pre-conversion process of the first embodiment. In this embodiment, the noise Ns is calculated according to the following equation including a random digit:

$$Ns=(R2-R1) \cdot RD[0,1]/2$$

where RD[0,1] represents a function of generating a random digit in a division [0,1]. The noise Ns is calculated with regard to each of the R, G, and B color components, while the random digit generated by the function RD[0,1] may be an identical value for all the components R, G, and B. In the case where the rectangular parallelepiped including the coordinate point of the target image data is a cube, an identical value may be set to the noise Ns for all the color components. The noise may not be specified by using a random digit, but the error by the error diffusion method may be used for the noise as discussed in the modified example of the first embodiment.

The program adds the generated noise Ns to each component of the image data Dx to calculate decision data Dr (step S714), and compares the calculated decision data Dr with the threshold value th with regard to each component (step S716). When it is determined at step S704 that the image data Dx is greater than the threshold value th, the threshold value th is updated to the upper coordinate value Gup. In this case, the decision data Dr is compared with the upper coordinate value Gup at step S716. When the decision data Dr is greater than the threshold value th (that is, in the case of an affirmative answer at step S716), the upper coordinate value Gup is set to a coordinate value Pre2 of the second lattice point (step S718). Otherwise (that is, in the case of a negative answer at step S716), the lower coordinate value Glw is set to the coordinate value Pre2 of the second lattice point (step S720). This series of processing is carried out with regard to each color component to specify the second lattice point.

FIG. 32 conceptually shows setting of the second lattice point in the pre-conversion process of the third embodiment. Like FIG. 31, the illustration of FIG. 32 regards only the R component.

Figure 32A:
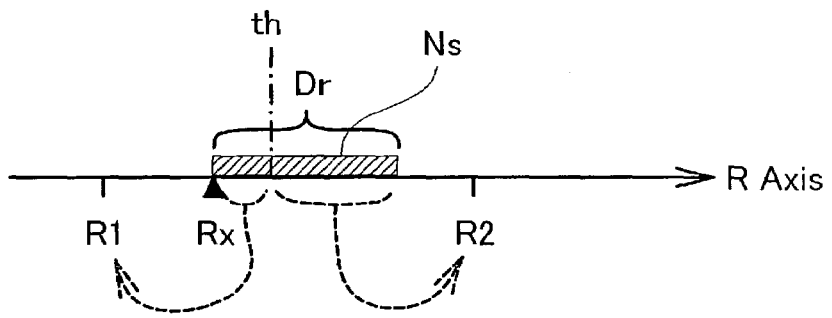
FIG. 32 shows allocation of the image data to the second lattice point in the pre-conversion process of the third embodiment.

FIG. 32(a) shows the setting of the R component of the second lattice point when the R component Rx of the image data is greater than the tone value (R1+R2)/2. The decision data Dr obtained by adding the noise Ns to the image data Rx takes an arbitrary value in a hatched range. When the decision data Dr is smaller than the threshold value th, the tone value R1 is set to the R component of the second lattice point. When the decision data Dr is greater than the threshold value th, on the contrary, the tone value R2 is set to the R component of the second lattice point. The arrow of broken line extending from a left side of the threshold value th in the hatched range to the coordinate value R1 in FIG. 32(a) schematically shows the setting of the tone value R1 to the R component of the second lattice point, when the decision data Dr is smaller than the threshold value th. The arrow of broken line extending from a right side of the threshold value th in the hatched range to the coordinate value R2 in FIG. 32(a) schematically shows the setting of the tone value R2 to the R component of the second lattice point, when the decision data Dr is greater than the threshold value th.

Figure 32B:
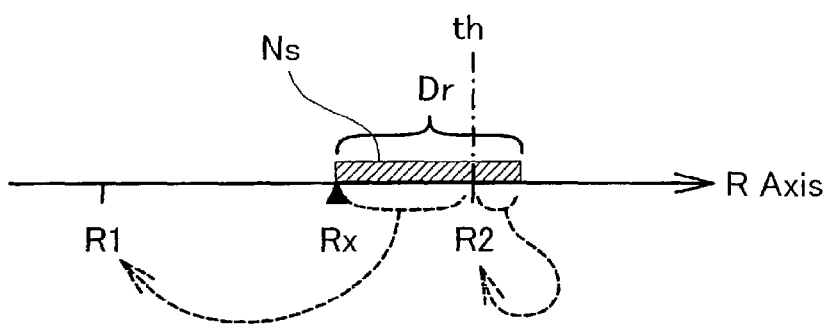

FIG. 32(b) shows the setting of the R component of the second lattice point when the R component Rx of the image data is greater than the tone value (R1+R2)/2. The decision data Dr takes an arbitrary value in a hatched range. The threshold value th has been updated to the tone value R2. When the decision data Dr is smaller than the threshold value th, the tone value R1 is set to the R component of the second lattice point. Otherwise the tone value R2 is set to the R component of the second lattice point. The processing of steps S714 through S720 in the flowchart of FIG. 30 is carried out to set the coordinate values of the respective components of the second lattice point and thereby specify the second lattice point.

The pre-conversion process of the third embodiment specifies the first lattice point and the second lattice point in the above manner and gives similar results to those obtained by the pre-conversion process of the first embodiment discussed previously. The pre-conversion process of the third embodiment uses only one noise to set the two lattice points. This arrangement simplifies the processing flow.

E-2. Modification

The pre-conversion process of the third embodiment allocates the image data Dx to the two lattice points. The number of the lattice points, to which the image data is allocated, however, is not restricted to 2. The pre-conversion process of the third embodiment is expandable to be applied for allocation of the image data to a greater number of lattice points. This application is discussed below as a pre-conversion process of a modified example.

FIG. 33 shows expansion of the pre-conversion process of the third embodiment to be applied for allocation of image data to three lattice points. The closed triangle represents the position of the R component Rx of the image data Dx. R1 and R2 are tone values respectively corresponding to the lower coordinate value Glw and the upper coordinate value Gup adjoining to the image data Dx. The pre-conversion process in the modified example of the third embodiment uses three threshold values th1, th2, and th3, which are respectively set equal to a tone value {R1+(R2−R1)/3}, a tone value {R1+(R2−R1)·⅔}, and a tone value R2. The settings of the three threshold values th1, th2, and th3 to divide the range between the tone values R1 and R2 into three equal parts corresponds to allocation of the image data to three lattice points. In general, when the image data is allocated to N lattice points, N threshold values are set to divide the range between the tone values R1 and R2 into N equal parts.

Figure 33A:
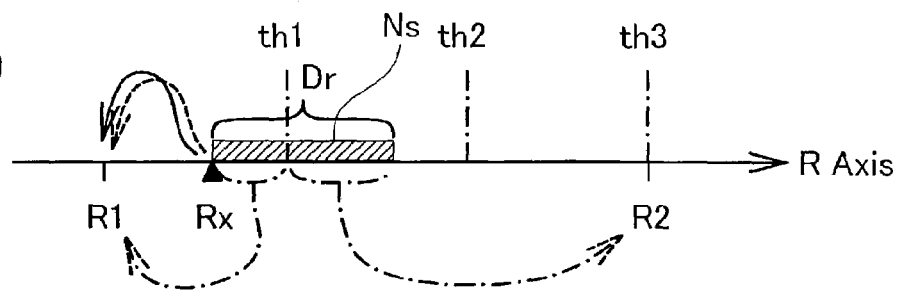
FIG. 33 shows expansion of the pre-conversion process of the third embodiment to allocate image data to three or more lattice points.
Figure 33B:
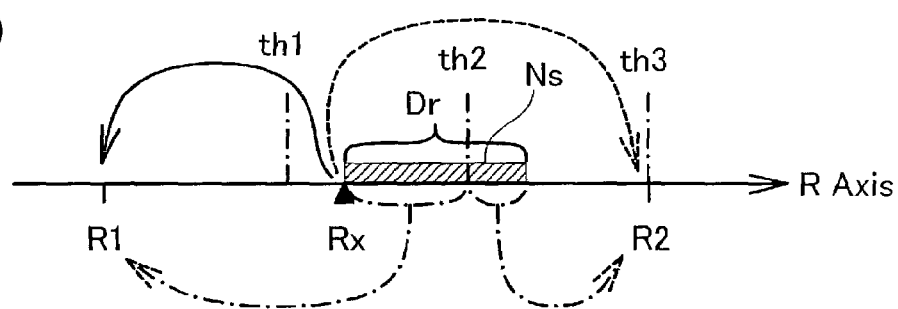
Figure 33C:
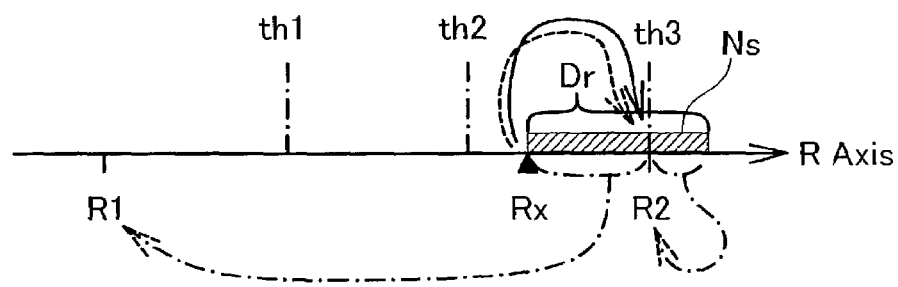

FIG. 33(a) shows the settings when the R component Rx of the image data Dx is in a range from the tone value R1 to the tone value {R1+(R2−R1)/3}. FIG. 33(b) shows the settings when the R component Rx of the image data Dx is in a range from the tone value {R1+(R2−R1)/3} to the tone value {R1+((R2−R1)·⅔)}. FIG. 33(c) shows the settings when the R component Rx of the image data Dx is in a range from the tone value {R1+((R2−R1)·⅔)} to the tone value R2. For the simplicity of explanation, FIG. 33 shows only the process of setting the coordinate values of the first through the third lattice points with regard to the R component. The principle of the setting is also applicable for the other components G and B.

The discussion below with reference to FIG. 33(a) regards the process of allocating the image data to the three lattice points, that is, the first lattice point through the third lattice points, when the R component Rx of the image data Dx is in the range from the tone value R1 to the tone value {R1+(R2−R1)/3}. The procedure first compares the image data with the three threshold values th1, th2, and th3, so as to determine whether the image data is in a range from the tone value R1 and the threshold value th1, in a range between the two threshold values th1 and th2, or in a range from the threshold value th2 to the tone value R2. In the case where the image data is in the range from the tone value R1 to the threshold value th1, the first lattice point and the second lattice point are set equal to the tone value R1 (corresponding to the lower coordinate value). The arrow of solid line and the arrow of broken line respectively extending from the image data Rx to the tone value R1 in FIG. 33(a) show the settings of the tone value R1 to the R components of the first lattice point and the second lattice point.

The procedure subsequently adds the noise Ns to the R component Rx of the image data Dx to calculate the decision data Dr, which is used for setting the R component of the third lattice point. Like the second embodiment discussed above, the noise Ns is calculated according to an equation of:

$$Ns = (R2-R1) \cdot RD[0,1]/3$$

where RD[0,1] represents a function of generating a random digit in a division [0,1]. The function RD[0,1] is divided by 3, since the image data Dx is allocated to three lattice points. In general, when the image data Dx is allocated to a number (N) of lattice points, the function RD[0,1] is divided by N. The decision data Dr is obtained by adding the noise Ns to the image data Dx. The calculated decision data Dr is compared with the threshold value th1. A hatched range in FIG. 33(a) shows a possible range of the decision data Dr. When the decision data Dr is smaller than the threshold value th1, the R component of the third lattice point is set equal to the tone value R1. Otherwise the R component of the third lattice point is set equal to the tone value R2. The arrows of one-dot chain line in FIG. 33(a) schematically show the setting of the R component of the third lattice point equal to either the tone value R1 or the tone value R2. This series of processing is carried out with regard to the respective color components, so as to specify the first lattice point, the second lattice point, and the third lattice point.

When the R component Rx of the image data Dx is in the range from the tone value {R1+(R2−R1)/3} to the tone value {R1+((R2−R1)·⅔)}, the R component of the first lattice point is set equal to the tone value R1 (corresponding to the lower coordinate value), and the R component of the second lattice point is set equal to the tone value R2 (corresponding to the upper coordinate value). The arrow of solid line extending from the image data Rx to the tone value R1 in FIG. 33(b) schematically shows the setting of the R component of the first lattice point equal to the tone value R1. The arrow of broken line extending from the image data Rx to the tone value R2 in FIG. 33(b) schematically shows the setting of the R component of the second lattice point equal to the tone value R2.

The procedure then adds the noise Ns to the R component Rx of the image data Dx to calculate the decision data Dr, which is used for setting the R component of the third lattice point, and compares the calculated decision data Dr with the threshold value th2. When the decision data Dr is smaller than the threshold value th2, the R component of the third lattice point is set equal to the tone value R1. Otherwise the R component of the third lattice point is set equal to the tone value R2. The arrows of one-dot chain line in FIG. 33(b) schematically show the setting of the R component of the third lattice point equal to either the tone value R1 or the tone value R2.

When the R component Rx of the image data Dx is in the range from the tone value {R1+((R2−R1)·⅔) to the tone value R2, that is, when the R component Rx is greater than the threshold value th2, the three lattice points are specified in a similar manner. The procedure is described briefly with reference to FIG. 33(c). When the R component Rx of the image data Dx is greater than the threshold value th2, the tone value R2 (corresponding to the upper coordinate value) is set to both the R components of the first lattice point and the second lattice point. The procedure then adds the noise Ns to the R component Rx of the image data Dx to calculate the decision data Dr, and compares the calculated decision data Dr with the threshold value th3. When the decision data Dr is smaller than the threshold value th3, the R component of the third lattice point is set equal to the tone value R1. Otherwise the R component of the third lattice point is set equal to the tone value R2. The arrows of one-dot chain line in FIG. 33(c) schematically show the setting of the R component of the third lattice point equal to either the tone value R1 or the tone value R2. This series of processing is carried out with regard to the respective color components, so as to specify the first lattice point, the second lattice point, and the third lattice point.

As described above, the pre-conversion process in the modified example of the third embodiment uses only one noise to allocate the image data to the three lattice points. This arrangement ensures the higher-speed pre-conversion process.

The process of allocating the image data to the three lattice points is readily expandable to the process of allocating the image data to a greater number of lattice points. The increase in number of lattice points, to which the image data is allocated, results in decreasing the pre-conversion error.

The above embodiments are to be considered in all aspects as illustrative and not restrictive. There may be many modifications, changes, and alterations without departing from the scope or spirit of the main characteristics of the present invention.

The embodiments discussed above regard the case of converting the image data expressed in the RGB color system into the image data expressed in the CMY color system. The technique of the invention is not restricted to conversion of image data in a certain color system into image data in a different color system. The principle of the invention is also applicable for correction of the image data in an identical color system.

In the respective embodiments discussed above, the target image data of the pre-conversion/color conversion process is three-dimensional data having the R, G, and B color components. The target image data, which is the object of conversion, is not restricted to the three-dimensional image data. The technique of the present invention is expandable to arbitrary N-dimensional image data by utilizing an N-dimensional conversion table and carrying out the required series of processing with regard to each of N components.

The scope and spirit of the present invention are indicated by the appended claims, rather than by the foregoing description.

What is claimed is:

1. An image processing apparatus that receives target color image data, which is expressed by a coordinate value in at least one-dimensional color space, makes the target color image data subjected to a preset series of correction, and outputs corrected color image data, said image processing apparatus comprising:
a correction table that stores corrected data, which is expressed by a coordinate value, at each of lattice points defined by division of the color space with regard to each dimension;
a lattice point selection module that selects N (where N is an integer of not less than 2) lattice points in an overlap-allowable manner among lattice points that have distances of not longer than a preset value from the coordinate value of the target color image data; and
a corrected data specification module that specifies corrected color image data corresponding to the target color image data, based on the corrected data stored at the selected N lattice points.

2. An image processing apparatus in accordance with claim 1, wherein said lattice point selection module selects the N lattice points in an undefined manner.

3. An image processing apparatus in accordance with claim 2, wherein said lattice point selection module selects N divisional tone values with regard to each dimension, which represent tone values of dividing each dimension of the color space, so as to specify the N lattice points, and
the selection of the divisional tone values is carried out in such a manner that a divisional tone value closer to the coordinate value of the target color image data is selected with a higher probability.

4. An image processing apparatus in accordance with claim 2, wherein said corrected data specification module calculates an arithmetic mean of the corrected data stored at the N lattice points and specifies the corrected color image data corresponding to the target color image data, based on the calculated arithmetic mean.

5. An image processing apparatus in accordance with claim 1, wherein said lattice point selection module, when the target color image data is expressed by a coordinate value in an M-dimensional color space (where M is an arbitrary positive integer), selects multiple but not greater than M lattice points as the N lattice points.

6. An image processing apparatus in accordance with claim 5, wherein said lattice point selection module selects the N lattice points in an undefined manner.

7. An image processing apparatus in accordance with claim 5, wherein said lattice point selection module selects multiple but not greater than M divisional tone values with regard to each dimension, which represent tone values of dividing each dimension of the color space, so as to specify the multiple lattice points, and
the selection of the divisional tone values is carried out in such a manner that a divisional tone value closer to the coordinate value of the target color image data is selected with a higher probability.

8. An image processing apparatus in accordance with claim 5, wherein said corrected data specification module calculates an arithmetic mean of the corrected data stored at the selected multiple lattice points and specifies the corrected color image data corresponding to the target color image data, based on the calculated arithmetic mean.

9. An image processing apparatus in accordance with claim 1, wherein said corrected data specification module reads the corrected data stored at the selected N lattice points from said correction table and calculates an arithmetic mean of the corrected data read from the selected N lattice points, so as to specify corrected color image data corresponding to the target color image data.

10. An image processing apparatus in accordance with claim 9, wherein said lattice point selection module selects the N lattice points in an undefined manner.

11. An image processing apparatus in accordance with claim 9, wherein said lattice point selection module selects N divisional tone values with regard to each dimension, which represent tone values of dividing each dimension of the color space, so as to specify the N lattice points, and
the selection of the divisional tone values is carried out in such a manner that a divisional tone value closer to the coordinate value of the target color image data is selected with a higher probability.

12. An image processing apparatus in accordance with any one of claims 2, 5, and 9, wherein said lattice point selection module selects K (where K is an integer of not less than 2) lattice points, such that a difference between an expected probabilistic value of each of the K lattice points and the coordinate value of the target color image data is not greater than a preset level.

13. An image processing apparatus in accordance with claim 12, wherein said lattice point selection module selects K divisional tone values with regard to each dimension, which represent tone values of dividing each dimension of the color space, so as to specify the K lattice points.

14. An image processing apparatus in accordance with claim 13, wherein said lattice point selection module comprises:
a decision data generation sub-module that adds a noise to the coordinate value of the target color image data to generate decision data with regard to each dimension; and
a divisional tone value selection sub-module that compares the decision data of each dimension with a predetermined threshold value, so as to select the K divisional tone values with regard to each dimension.

15. An image processing apparatus in accordance with claim 14, said image processing apparatus further comprising:
a divisional tone value specification module that specifies, with regard to each dimension, a first divisional tone value and a second divisional tone value out of the K divisional tone values, wherein said first divisional tone value is closest to the coordinate value of the target color image data among smaller divisional tone values than the coordinate value of the target color image data, and said second divisional tone value is closest to the coordinate value of the target color image data among greater divisional tone values than the coordinate value of the target color image data; and
a noise generation module that calculates an inter-lattice tone value difference between the first divisional tone value and the second divisional tone value and generates K noises of different expected values in a range from a tone value '0' to the inter-lattice tone value difference, with regard to each dimension,
wherein said decision data generation sub-module adds the K noises to the coordinate value of the target color image data, so as to generate K decision data with regard to each dimension, and
said divisional tone value selection module selects either of the first divisional tone value and the second divisional tone value based on a result of the comparison between each of the K decision data and the predetermined threshold value, so as to select the K divisional tone values.

16. An image processing apparatus in accordance with claim 15, wherein said noise generation module comprises:
a shift quantity calculation sub-module that calculates a tone value that is 1/K of the inter-lattice tone value difference as a shift quantity with regard to each dimension, a reference noise generation sub-module that generates noise in a range from a tone value '0' to the calculated shift quantity as a reference noise with regard to each dimension; and
a noise shifting sub-module that shifts the reference noise by the calculated shift quantity (K−1) times, so as to generate the K noises of different expected values.

17. An image processing apparatus in accordance with claim 14, said image processing apparatus further comprising:
a divisional tone value specification module that specifies, with regard to each dimension, a first divisional tone value and a second divisional tone value out of the K divisional tone values, wherein said first divisional tone value is closest to the coordinate value of the target color image data among smaller divisional tone values than the coordinate value of the target color image data, and said second divisional tone value is closest to the coordinate value of the target color image data among greater divisional tone values than the coordinate value of the target color image data; and
a threshold value setting module that sets the second divisional tone value and (K−1) tone values, which equally divide an interval between the first divisional tone value and the second divisional tone value, as K threshold values,
wherein said decision data generation sub-module adds a noise corresponding to a tone value difference between the first divisional tone value and the second divisional tone value to the coordinate value of the target color image data, so as to generate the decision data with regard to each dimension, and
said divisional tone value selection sub-module selects either of the first divisional tone value and the second divisional tone value based on a result of the comparison between the generated decision data and each of the K threshold values, so as to select the K divisional tone values.

18. An image processing apparatus in accordance with claim 12, wherein said lattice point selection module selects two lattice points.

19. An image processing apparatus in accordance with claim 12, said image processing apparatus further comprising:
a processing mode detection module that detects setting of a processing mode, which gives a priority to at least either of an execution speed of the preset series of correction and a correction accuracy of the target color image data, wherein said lattice point selection module selects a specified number of the lattice points according to the detected processing mode.

20. An image processing apparatus in accordance with claim 19, wherein said lattice point selection module selects a greater number of the lattice points in a certain setting of the processing mode that gives the priority to the correction accuracy over the execution speed than a number of lattice points in another setting of the processing mode that gives the priority to the execution speed over the correction accuracy.

21. An image processing apparatus in accordance with claim 12, wherein the target color image data is RGB image data expressed by coordinate values in a color space defined by a red (R) axis, a green (G) axis, and a blue (B) axis, and
said correction table stores tone values of at least cyan, magenta, and yellow as the corrected data.

22. An image processing method that receives target color image data, which is expressed by a coordinate value in at least one-dimensional color space, makes the target color image data subjected to a preset series of correction, and outputs corrected color image data, said image processing method comprising the steps of:
(A) storing corrected data, which is expressed by a coordinate value, at each of lattice points defined by division of the color space with regard to each dimension;
(B) selecting N (where N is an integer of not less than 2) lattice points in an overlap-allowable manner among lattice points that have distances of not longer than a preset value from the coordinate value of the target color image data; and
(C) specifying corrected color image data corresponding to the target color image data, based on the corrected data stored at the selected N lattice points.

23. An image processing method in accordance with claim 22, wherein said step (B) selects the N lattice points in an undefined manner.

24. An image processing method in accordance with claim 22, wherein said step (B), when the target color image data is expressed by a coordinate value in an M-dimensional color space (where M is an arbitrary positive integer), selects multiple but not greater than M lattice points as the N lattice points.

25. An image processing method in accordance with claim 22, wherein said step (C) reads the corrected data stored at the selected N lattice points from said correction table and calculates an arithmetic mean of the corrected data read from the selected N lattice points, so as to specify corrected color image data corresponding to the target color image data.

26. An image processing method in accordance with any one of claims 23 through 25, wherein said step (B) selects K (where K is an integer of not less than 2) lattice points, such that a difference between an expected probabilistic value of each of the K lattice points and the coordinate value of the target color image data is not greater than a preset level.

27. An image processing method in accordance with any one of claims 23 through 25, wherein said step (B) selects two lattice points.

28. A printing apparatus that receives target color image data, which is expressed by a coordinate value in at least one-dimensional color space, makes the target color image data subjected to a preset series of correction, and prints a resulting color image based on corrected color image data, said printing apparatus comprising:
a correction table that stores corrected data, which is expressed by a coordinate value, at each of lattice points defined by division of the color space with regard to each dimension;
a lattice point selection module that selects N (where N is an integer of not less than 2) lattice points in an overlap-allowable manner among lattice points that have distances of not longer than a preset value from the coordinate value of the target color image data;
a corrected data specification module that specifies corrected color image data corresponding to the target color image data, based on the corrected data stored at the selected N lattice points; and
a printing module that prints the resulting color image based on the corrected color image data.

29. A printing apparatus in accordance with claim 28, wherein said lattice point selection module selects the N lattice points in an undefined manner.

30. A printing apparatus in accordance with claim 28, wherein said lattice point selection module, when the target color image data is expressed by a coordinate value in an M-dimensional color space (where M is an arbitrary positive integer), selects multiple but not greater than M lattice points as the N lattice points.

31. A printing apparatus in accordance with claim 28, wherein said corrected data specification module reads the corrected data stored at the selected N lattice points from said correction table and calculates an arithmetic mean of the corrected data read from the selected N lattice points, so as to specify corrected color image data corresponding to the target color image data.

32. A printing apparatus in accordance with any one of claims 29 through 31, wherein said lattice point selection module selects K (where K is an integer of not less than 2) lattice points, such that a difference between an expected probabilistic value of each of the K lattice points and the coordinate value of the target color image data is not greater than a preset level.

33. A computer program product for actualizing an image processing method that receives target color image data, which is expressed by a coordinate value in at least one-dimensional color space, makes the target color image data subjected to a preset series of correction, and outputs corrected color image data,
said computer program product comprising:
a computer readable recording medium; and
a computer program stored in said recording medium,
said computer program causing a computer to attain the functions of:
(A) storing corrected data, which is expressed by a coordinate value, at each of lattice points defined by division of the color space with regard to each dimension;
(B) selecting N (where N is an integer of not less than 2) lattice points in an overlap-allowable manner among lattice points that have distances of not longer than a preset value from the coordinate value of the target color image data; and
(C) specifying corrected color image data corresponding to the target color image data, based on the corrected data stored at the selected N lattice points.

34. A computer program product in accordance with claim 33, wherein said function (B) selects the N lattice points in an undefined manner.

35. A computer program product in accordance with claim 33, wherein said function (B), when the target color image data is expressed by a coordinate value in an M-dimensional color space (where M is an arbitrary positive integer), selects multiple but not greater than M lattice points as the N lattice points.

36. A computer program product in accordance with claim 33, wherein said function (C) reads the corrected data stored at the selected N lattice points from said correction table and calculates an arithmetic mean of the corrected data read from the selected N lattice points, so as to specify corrected color image data corresponding to the target color image data.

37. A computer program product in accordance with any one of claims 34 through 36, wherein said function (B) selects K (where K is an integer of not less than 2) lattice points, such that a difference between an expected probabilistic value of each of the K lattice points and the coordinate value of the target color image data is not greater than a preset level.

* * * * *